United States Patent [19]

Magnussen, Jr. et al.

[11] Patent Number: 4,905,526

[45] **Date of Patent: * Mar. 6, 1990**

[54] PORTABLE AUTOMATED PIPETTE FOR ACCURATELY PIPETTING AND/OR TITRATING LIQUIDS

[75] Inventors: Haakon T. Magnussen, Jr., Orinda; Gary L. Smith, Walnut Creek; Stephen J. Ruskewicz, Kensington; Anthony K. Wingo, San Leandro, all of Calif.

[73] Assignee: Rainin Instrument Co., Inc., Emeryville, Calif.

[ * ] Notice: The portion of the term of this patent subsequent to Jun. 9, 2004 has been disclaimed.

[21] Appl. No.: 59,644

[22] Filed: Jun. 8, 1987

Related U.S. Application Data

[63] Continuation-in-part of Ser. No. 580,587, Feb. 16, 1984, Pat. No. 4,671,123.

[51] Int. Cl.[4] ............ G01N 1/14

[52] U.S. Cl. ............ 73/864.18; 422/100

[58] Field of Search ............ 73/864.16, 864.18, 864.11, 73/864.14, 864.13, 864.01; 436/180, 179, 51; 422/100

[56] References Cited

U.S. PATENT DOCUMENTS

| | | | |
|---|---|---|---|
| 3,991,616 | 11/1976 | Stahli | 73/864.16 X |
| 4,101,283 | 7/1978 | Sundstrom | 73/864.16 X |
| 4,345,483 | 8/1982 | Paletta et al. | 422/100 X |
| 4,369,665 | 1/1983 | Citrin | 73/864.18 |
| 4,399,711 | 8/1983 | Klein | 73/864.16 |
| 4,475,666 | 10/1984 | Bilbrey et al. | 73/864.16 X |
| 4,517,850 | 5/1985 | Wiseman et al. | 73/864.01 X |
| 4,519,258 | 5/1985 | Jakubowicz | 73/864.16 |
| 4,563,907 | 1/1986 | Johnson, Jr. et al. | 73/864.16 |
| 4,598,840 | 7/1986 | Burg | 73/864.16 X |
| 4,671,123 | 6/1987 | Magnussen, Jr. et al. | 73/864.16 |
| 4,821,586 | 4/1989 | Scordato et al. | 73/864.16 |

FOREIGN PATENT DOCUMENTS 3545 12/1981 PCT Int'l Appl. .

*Primary Examiner*—Tom Noland

*Attorney, Agent, or Firm*—Robert R. Meads

[57] ABSTRACT

A hand held self-contained automated pipette for portable operation having an electrically operated digital linear actuator. The actuator preferably includes a stepper motor driving a rotor. A threaded screw is coaxially positioned within the rotor and is connected to an actuator shaft having elongate grooves slidable in a guide for preventing shaft rotation so that precise linear motion is imparted to the shaft. A pipetting displacement assembly having one of various sizes is removably attached for actuation by a common actuator including programmed movement of a displacing piston in a displacement cylinder to optimize air interface volume, neutralize variations in vacuum pipette effects, and provide an accommodated stroke and readout for improved accuracy while pipetting and/or titrating different ranges of volumes. Upon calibration the piston undertakes immediate excursion to an end of travel limit and after motor slippage is retracted to a home position. This home position is chosen for optimum preservation of an air interface volume between drawn liquid and the piston tailored with particularity to the displacement assembly being used. Multiple precision modes, including pipetting, multiple dispensing, titration, dilution, and measurement, are provided. Other features are also disclosed.

11 Claims, 37 Drawing Sheets

PORTABLE AUTOMATED PIPETTE FOR ACCURATELY PIPETTING AND/OR TITRATING LIQUIDS

CROSS-REFERENCE TO RELATED PATENT APPLICATION

This is a continuation-in-part of a patent application of Haakon T. Magnussen, Jr., Gary L. Smith, Stephen J. Ruskewicz, and Anthony K. Wingo, entitled "Methods and Apparatus for Pipetting and/or Titrating Liquids Using a Hand Held Self-Contained Automated Pipette", U.S. Ser. No. 06/580,587, filed on Feb. 16, 1984, now U.S. Pat. No. 4,671,123, issued on June 9, 1987, and assigned to the same assignee as this application.

BACKGROUND OF THE INVENTION

This invention relates to pipettes and titrators and, more particularly, to pipettes and titrators having an electrically operated actuator. Specifically, the invention is directed to a self-contained automated air displacement pipette and titrator for portable operation having an electronically controlled digital linear actuator, which accommodates removably attachable displacement assemblies of various sizes and compensates for errors inherent in operation, thereby providing improved precision and accuracy.

Electrically operated linear actuators for controlling displacement piston movement in a pipette are known. However, in order to effectively use a pipette having an electrically operated linear actuator in a laboratory a portable instrument approaching the size shape and weight of known mechanically operated pipettes is desirable.

In this regard, the size and shape of the pipette is critical to portability. If the pipette is overly long or has a large diameter, the instrument is unwieldy. Heretofore, electrically operated pipettes have been configured so that a stepper motor is typically attached directly to and adds directly to the length of the linear actuator shaft, as disclosed in Nishi, U.S. Pat. No. 3,915,651, and Klein, U.S. Pat. No. 4,399,711. The automatic pipettes disclosed in these patents are configured so that a stepper motor is in piggyback relation to the actuator shaft with the drive shaft of the stepper motor connected to the end of the actuator shaft, which substantially increases the length of these pipettes. Such construction cannot be considered suitable to a portable hand-holdable application in which high dexterity is needed to perform rapid motions between wells on a tray used in medical diagnostic tests or between more distant test stations. The construction of these pipettes, furthermore, is not suitable to reach into test tubes.

Also, the automatic pipette disclosed in Citrin, U.S. Pat. No. 4,369,665, includes a threaded screw driven by a motor incorporated into the pipette in side-by-side relation to the piston, which increases the width or diameter of the pipette. Consequently, the pipette disclosed in this patent is bulky.

A further consideration of portability for pipettes is weight. However, considerable energy is required by known pipettes having a linear actuator driven by a stepper motor. For example, in order to hold stepper motors in position, continuous power is typically needed. Heretofore, electrically operated pipettes having a stepper motor, such as disclosed in Nishi, U.S. Pat. No. 3,915,651, and Klein, U.S. Pat. No. 4,399,711, have required such significant amounts of power that power has been supplied by a circuit which is separate from the other components of the instrument. Combination of the circuit and the remainder of the components into a self-contained instrument would result in a bulky instrument which would not be portable in any practical sense. Nor have the power demands of known stepper motor circuits heretofore enabled an electrically operated pipette to be battery powered.

Also, Citrin, U.S. Pat. No. 4,369,665, discloses a detector for sensing an overcurrent condition of a motor to cause the motor to be de-energized immediately when a piston engages a discharge stop. This causes a cessation of further discharge motion before a repeat of an intake strike is commenced with an initial drive of the piston against a gate element to establish the intake starting position. However, the detector can respond to resistance to piston movement caused by a clogged pipette tip, misalignment of the piston with the cylinder, or other impediments to the movement of the piston that occur during discharge of liquid, which can result in inaccurate initial positioning of the piston.

A further difficulty with the known pipette technology is that precise digital movement has not been applied to alleviate inaccuracies inherent in pipetting and/or titrating with an air displacement pipette having an electrically operated linear actuator, such as disclosed in Nishi, U.S. Pat. No. 3,915,651, Klein, U.S. Pat. No. 4,399,711, and Citrin, U.S. Pat. No. 4,369,665. For example, the configuration of the piston and cylinder mechanism provides accuracy only over a single limited range, which means that inaccuracy has resulted when the pipette is operated beyond the given range. Furthermore, inaccuracies resulting from surface tension, atmospheric pressure, and expansion and contraction of the air typically found in air displacement pipettes have heretofore not been addressed.

SUMMARY OF THE INVENTION

The present invention provides a self-contained automated pipette having an electronically controlled digital linear actuator with reduced power requirements for precisely pipetting and/or titrating liquids. The pipette in accordance with the invention has a size, weight, and shape so that the instrument is portable for facilitating extended use during pipetting and/or titrating while being held by a user. The pipette of the invention also accommodates different interchangeable pipetting displacement assemblies for different ranges and compensates for errors inherent in operation, so that accuracy is improved.

The invention provides a portable automated pipette having a digital linear actuator energized by an onboard control circuit for precisely controlling the actuator. In accordance with the invention, a pipette is provided, comprising: a pipette drive means, including a motor, an integral control circuit for supplying power to the motor, and a shaft having a connection to the motor for moving in precise lengthwise increments in response to power being supplied to the motor; and a displacement assembly, including a displacement cylinder, displacing piston within the cylinder means for communicating linear translation of the shaft to the piston when the displacement assembly is mounted to the pipette drive means, a displacement chamber within the cylinder having a first end in communication with the piston and having a second end with an aperture in communication with a tip for receiving liquid to be pipetted, and means for locking the piston and cylinder together in an assembly both when the displacement assembly is attached to the pipette drive means and when the displacement assembly is separated from the pipette drive means.

Preferably, the motor is a stepper motor supplied with pulsed current, and interior of the rotor of the stepper motor is a threaded screw. The screw connects to a shaft which includes grooves slidable in a guide for preventing shaft rotation, so that rotation of the rotor causes precise digital linear motion to be imparted to the shaft. The stepper motor does not add directly to the length of the pipette.

Furthermore, static friction is preferably employed in lieu of holding torque for maintaining the position of the stepper motor, so that the power demand of the stepper motor circuit is substantially reduced. As a result, the pipette can be battery powered for an extended period of time.

Preferably, the displacement assembly is removably attachable and is available in various sizes, for example, for pipetting full-scale volume ranges of zero to 2.5, 10, 25, 100, or 250 microliters and zero to 1, 2.5, or 10 milliliters, all interchangeably actuated by a common digital linear actuator. Different displacement assemblies for different full-scale volume ranges provide improved accuracy.

Movement of the linear actuator is programmed in order to optimize air interface volume or buffer, neutralize variations in vacuum pipette effects, and provide an accommodated stroke and readout. Preferably, the pipette drive means is initialized by an encoder means corresponding to the full-scale volume range of the displacement assembly. The pipette operates with extreme accuracy in a selected range by specific coordination between the particular displacement assembly being used and the motor drive mechanism, whose operation is determined by the cooperating encoder means. The encoder means is connected to the control circuit and automatically correlates piston movement to the given full-scale volume range of the particular displacement assembly being used without energizing the motor.

In accordance with the invention, a method for calibrating a motor driven linear actuator for a pipette having a displacement assembly including a displacing piston is provided. The calibrating method comprises the steps of: supplying power to energize the motor to drive the displacing piston to a travel limit and continuing to supply power as the motor slips: and then reversing the direction of the motor to cause the piston to move a predetermined distance away from the travel limit to a home position maintaining a predetermined air volume.

Preferably, upon being initialized with power, the linear actuator undertakes immediate excursion to a travel limit, the travel limit typically being defined by the piston engaging the end of a displacement chamber included in a removably attachable displacement assembly. After a complete cycle with intended motor slippage at the travel limit, the piston is retracted to a home position. This home position is chosen for preservation of an optimum air buffer between drawn liquid and the piston tailored with particularity to the removably attachable displacement assembly being used.

Multiple precision modes of operation of the portable automated pipette of the invention are provided for the convenience of the user, including pipetting multiple dispensing, titrating, diluting, and measuring in which compensation is provided for inaccuracies resulting from surface tension, atmospheric pressure, and expansion and contraction of the air typically found in air displacement pipettes. A number of factors, including liquid surface tension and the expansibility of the air buffer, resist pipetting. Accordingly, when liquid is drawn, initial movement is undertaken to provide the requisite offset for the beginning movement of liquid into the pipette. Also, air buffer compressibility and liquid surface tension absorb piston displacement and delay any liquid discharge. Accordingly, at the discharge location, a first movement occurs to provide the requisite offset for liquid movement to the point of discharge.

The overstrokes required to provide the offset or offsets vary dependent upon the range of the particular displacement assembly being used. The required overstrokes for the pickup and discharge of liquid are particularly and individually adjusted to the volume of the displacement assembly attached. A microprocessor program takes these changes in proportions into account based on the encoder means inserted into the automated pipette, thereby greatly improving the accuracy of pipetting and/or titrating.

In accordance with the invention, a method is provided for pipetting with a pipette having an electrically driven linear actuator and, connected to the linear actuator, a displacement assembly including a displacing piston movable within one end of a displacement cylinder having a displacement chamber and having another end with an aperture in communication with a tip communicable with liquid to be pipetted. The pipetting method comprises the steps of: retracting the displacing piston a predetermined first distance in the displacement cylinder to compensate for air pressure and surface tension effects to cause liquid to begin to move into the tip: and retracting the piston a second distance to draw in the volume to be pipetted, whereby the total volume of pipetted liquid taken in is less than the total displacement of the piston. The pipetting method preferably comprises the additional steps of: extending the piston into the cylinder a predetermined third distance to compensate for air pressure and surface tension effects to cause liquid to move towards discharge; and extending the piston a fourth distance to dispense the volume of liquid. Also, the pipetting method preferably further comprises the step of temporarily stopping movement of the piston prior to overdisplacement of the piston to blow remaining liquid from the tip.

A method is also provided in accordance with the invention for multiple dispensing. The multiple dispensing method comprises the steps of: retracting the displacing piston a predetermined first distance in the displacement cylinder to compensate for air pressure and surface tension effects to cause liquid to begin to move into the tip: retracting the piston a second distance to draw a volume of liquid in excess of a first volume of liquid into the tip: extending the piston into the cylinder a third distance to cause the excess volume of liquid to be dispensed so that the first volume of liquid remains in the tip; and repetitively extending the piston a fourth distance to dispense a second volume of liquid each repetition until a modulo remnant of liquid remains. The multiple dispensing method preferably comprises the additional step of extending the piston a fifth distance to dispense the modulo remnant. The multiple dispensing method in one modification can include the additional steps of preselecting a fixed residual volume and determining an integer n such that n equals the predetermined full-scale volume range of the pipetting displacement assembly divided by the second, or aliquot, volume and truncated to an integer. The first volume drawn into the tip then equals n times the aliquot volume, plus the fixed residual volume.

In accordance with the invention, a method is further provided for titrating. The titrating method comprises the steps of: retracting the displacing piston a predetermined first distance in the displacement cylinder to compensate for air pressure and surface tension effects to cause liquid to begin to move into the tip: retracting the piston a second distance to draw a volume of liquid in excess of a first volume of liquid into the tip; extending the piston into the cylinder a third distance to cause the excess volume of liquid to be dispensed so that the first volume of liquid remains in the tip; extending the piston into the cylinder a fourth distance to dispense a second volume of liquid; and incrementally extending the piston into the cylinder thereafter to successively dispense incremental volumes of liquid. Preferably, dispensing liquid from the tip is at a rate which is controllable by the user so as to expedite titrating.

A method is additionally provided in accordance with the invention for diluting. The diluting method comprises the steps of: retracting the displacing piston a predetermined first distance in the displacement cylinder to compensate for air pressure and surface tension effects to cause liquid to begin to move into the tip: retracting the piston a second distance to draw a first volume of liquid into the tip; retracting the piston a predetermined third distance to create an air gap in the tip; retracting the piston a predetermined fourth distance to compensate for air pressure and surface tension effects to cause liquid to begin to move into the tip: retracting the piston a fifth distance to draw a second volume of liquid into the tip: and extending the piston into the cylinder a sixth distance to dispense the second volume of liquid. air gap, and first volume of liquid.

In accordance with the invention, a method is also provided for measuring which enables drawing liquid into the tip at a rate which is controllable by the user so as to expedite pipetting. Preferably, the motor can be moved in accelerating increments to change the displacement of the piston within the cylinder included in the automated pipette in response to continued manual actuation of trigger means, whereby the rate of liquid movement into the pipetting tip changes, the accelerating increments not being dependent upon the inertial characteristics of the pipette and physical characteristics of the liquid.

Preferably, the invention also provides a method for mixing in association with the pipetting and diluting methods. This entails the additional steps of selecting a mix volume, and after pipetting or diluting, immersing the tip in dispensed liquid and cyclically drawing and dispensing a volume of liquid equal to the mix volume. Additionally, a method for volume sequencing is preferably provided in association with the pipetting, multiple dispensing, and diluting methods. This entails the additional step of selecting a plurality i of sequential volumes corresponding to: (a) a series of first volumes drawn and dispensed during a pipetting series; or (b) a series of volumes, the sum of which equals the volume drawn during multiple dispensing, the volume drawn being later dispensed as discrete sequential volumes: or (c) a series of volumes of liquid or air drawn discretely and later collectively dispensed during diluting.

Unlike known automated pipettes having electrically operated linear actuators, the length of the pipette in accordance with the invention is not appreciably longer than that of known mechanically operated pipettes. Furthermore, the pipette can be battery powered. The pipette is self-contained and has a reduced weight so that portable operation is feasible.

BRIEF DESCRIPTION OF THE DRAWINGS

The above and other features of the invention and the concomitant advantages will be better understood and appreciated by those skilled in the art in view of the description of the preferred embodiments given below in conjunction with the accompanying drawings. In the drawings.

DETAILED DESCRIPTION OF THE PREFERRED EMBODIMENTS

Figure 1A:
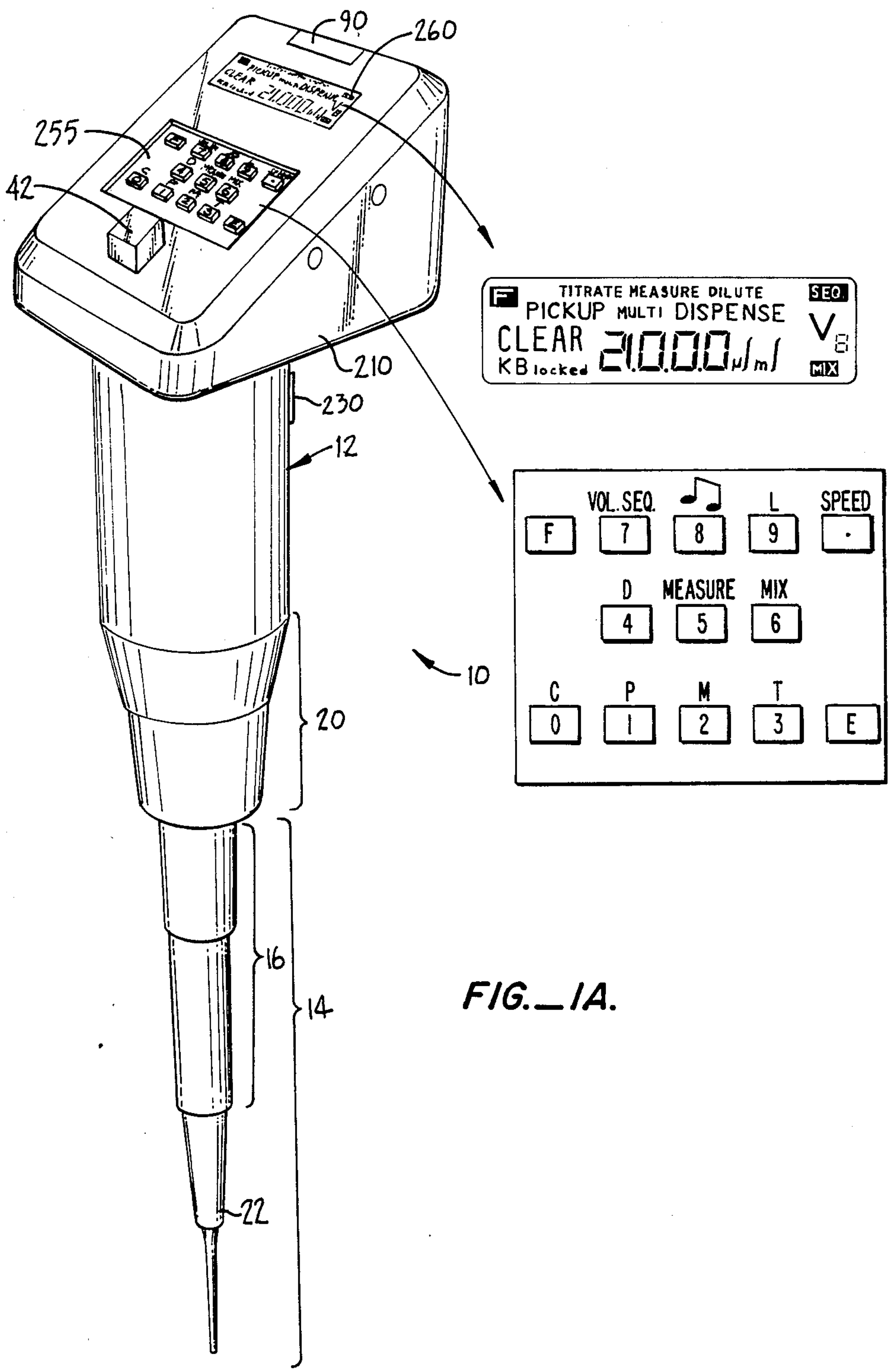
FIG. 1A is a perspective view of a pipette including an electronically controlled digital linear actuator and removable displacement assembly in accordance with an embodiment of the invention, a display being shown in an enlarged section of the figure.
Figure 1B:
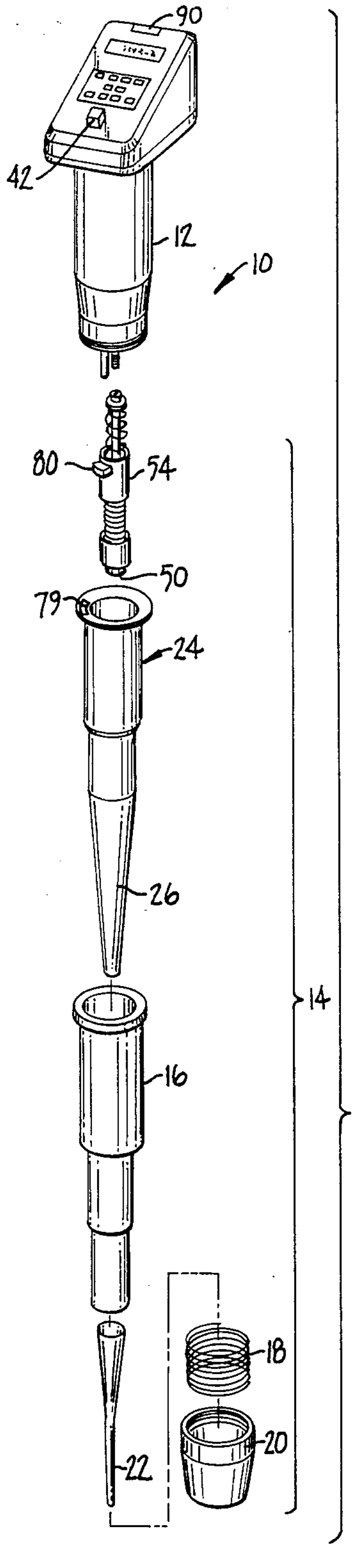
FIG. 1B is a perspective view of the pipette shown in FIG. 1A, the displacement assembly being shown in exploded form.

An assembled portable automated electrically operated pipette 10 in accordance with an embodiment of the invention is shown in FIG. 1A. The pipette 10 is separable into a digital linear actuator drive module 12 and a pipetting displacement assembly 14, as shown in FIG. 1B.

Figure 2:
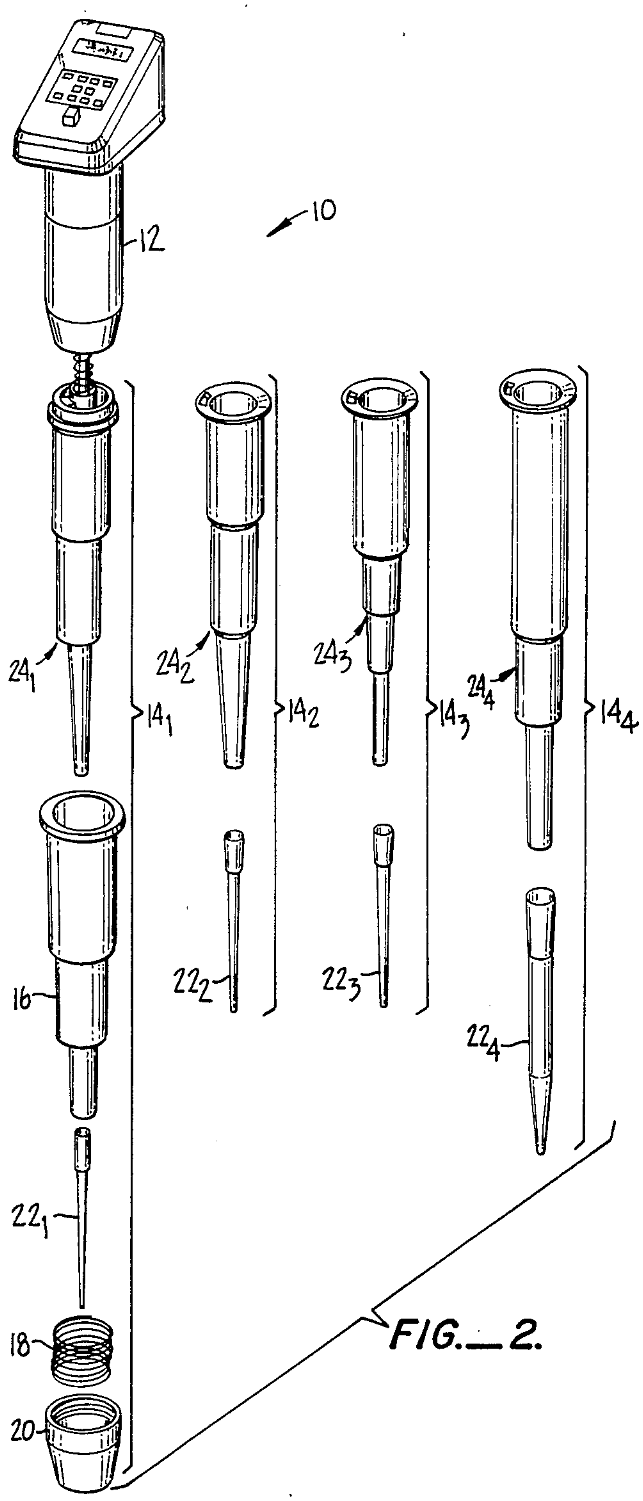
FIG. 2 shows a single digital linear actuator with various sizes of interchangeable displacement assemblies.

One of various interchangeable displacement assemblies $14_1$, $14_2$, $14_3$, $14_4$, etc., is removably attachable to the drive module 12, as shown in FIG. 2. According to this aspect of the invention, the displacement assembly 14 has a construction which includes coupling means for interlocking a displacing piston, displacement cylinder, sleeve, and tip in an assembly. This assembly is in turn mounted to the drive module 12. As a result, the pipette 10 has a common drive module 12 which can be used for pipetting and/or titrating any one of many different ranges of volumes for improved accuracy.

Figure 1D:
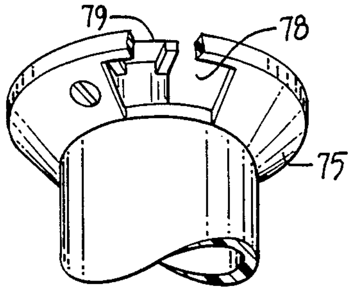
FIGS. 1D–1G are cutaway views of details of the displacement assembly included in the pipette shown in FIG. 1A.
Figure 1C:
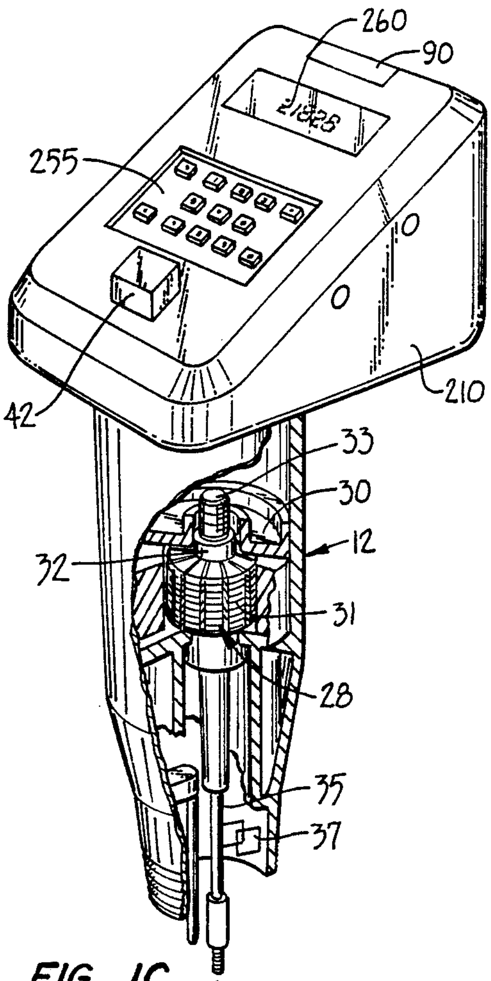
FIG. 1C is a cutaway section of the digital linear actuator included in the pipette shown in FIG. 1A.
Figure 1F:
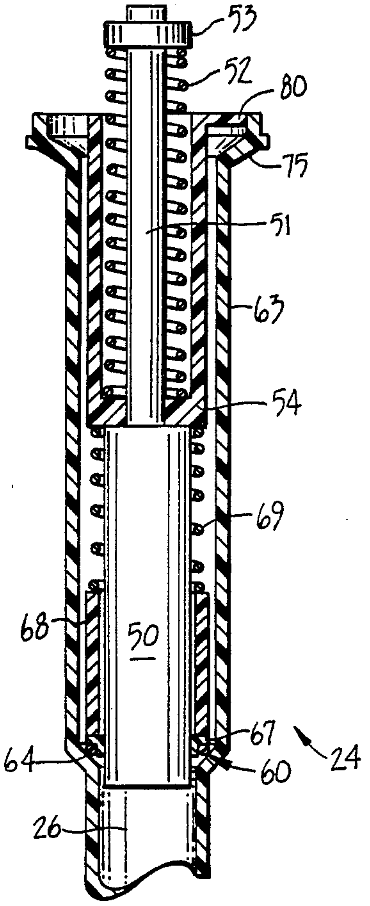

Considered in more detail, the displacement assembly 14 includes a displacement cylinder 24 and a displacing piston 50, as shown in FIG. 1F. The piston 50 is held by a spring housing 63 formed in a first end of the cylinder 24. The piston 50 and a connected piston rod 51, both preferably constructed from chromeplated stainless steel, are biased upwardly by a compressed coil spring 52 acting between a ring 53 and a casing 54. This prevents backlash of the piston 50 and biases the piston rod 51 against the linear actuator included in the drive module 12 (FIG. 1C). This also facilitates disconnection of the displacement assembly 14 from the drive module 12.

Figure 1G:
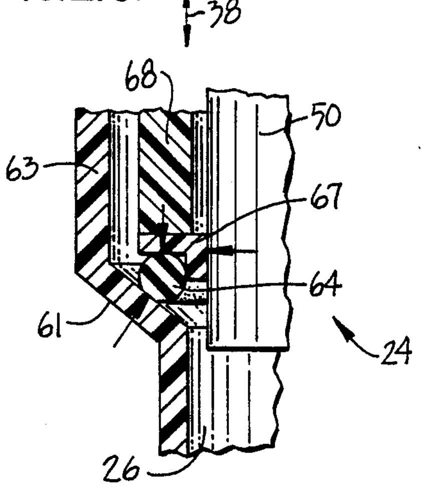

The piston 50 slides past an O-ring seal assembly 60 disposed in the cylinder 24 into one end of a displacement chamber 26 at the second end of the cylinder. A compressed coil spring 69 presses a sleeve 68 and hence a right angle collar 67 down onto an O-ring 64. Three boundaries, indicated by arrows shown in FIG. 1G, assure that the seal around the piston 50 is airtight. The first boundary is between the collar 67 and the O-ring 64. The second boundary is between the O-ring 64 and a frustrum 61 which connects the wall of the displacement chamber 26 with the spring housing 63. The third boundary is between the collar 67 and the piston 50.

Figure 1E:
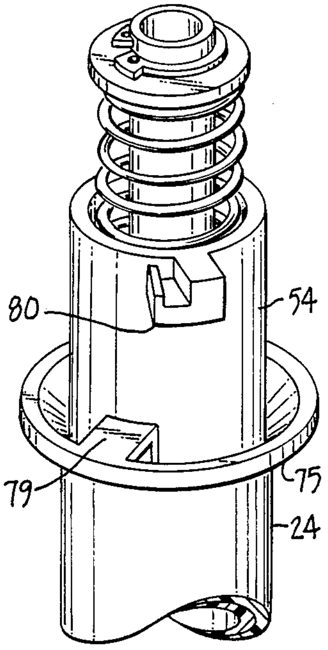

The top of the cylinder 24, as indicated by the numeral 75, is preferably flared, as shown in FIGS. 1D, 1E, and 1F, and includes a slot 78 and first coupling means which preferably comprises a downward facing first latch 79. The casing 54 preferably includes second coupling means which preferably comprises an upward facing second latch 80 (FIG. 1E). The cylinder 24 and the piston 50 are assembled by registering the second latch 80 with the slot 78, pressing the casing 54 down into the cylinder, twisting the casing, and releasing the second latch 80 under the first latch 79.

A sleeve 16 is slid onto the cylinder 24 and can be retained by a disposable pipetting tip 22 which slips onto the second end of the cylinder and is held by friction. The tips $22_1$, $22_2$, $22_3$, $22_4$, etc., have one of various full-scale volumes in the range from zero to 2.5 microliters (μl) through zero to 10 milliliters (ml) and are respectively attached to a corresponding displacement assembly $14_1$, $14_2$, $14_3$, $14_4$, etc., as shown in FIG. 2. As shown in FIGS. 1A and 1B, a retainer ring 20 secures the displacement assembly 14 to the drive module 12. The displacement assembly 14 remains unitary whether or not attached to the drive module 12.

An ejector means is preferably provided for detaching the tip 22. The ejector means includes an actuable ejector pushbutton 42 connected to an ejector shaft 44 as shown in FIG. 1I. The ejector shaft 44 is in turn connected to an ejector plate 46. Actuation of the ejector pushbutton 42 transfers through the ejector shaft 44, ejector plate 46, and sleeve 16 (FIG. 1A) to detach the tip 22. The sleeve 16, ejector plate 46, ejector shaft 44, and ejector pushbutton 42 are biased upwardly by a compressed coil spring 18 acting between the retainer ring 20 and sleeve, as shown in FIG. 1B.

The pipette 10 includes a digital linear actuator adapted for positively stepped precise linear actuation of the piston 50 included in the displacement assembly 14. The digital linear actuator is preferably driven by a stepper motor 28, as shown in FIG. 1C.

Figure 1H:
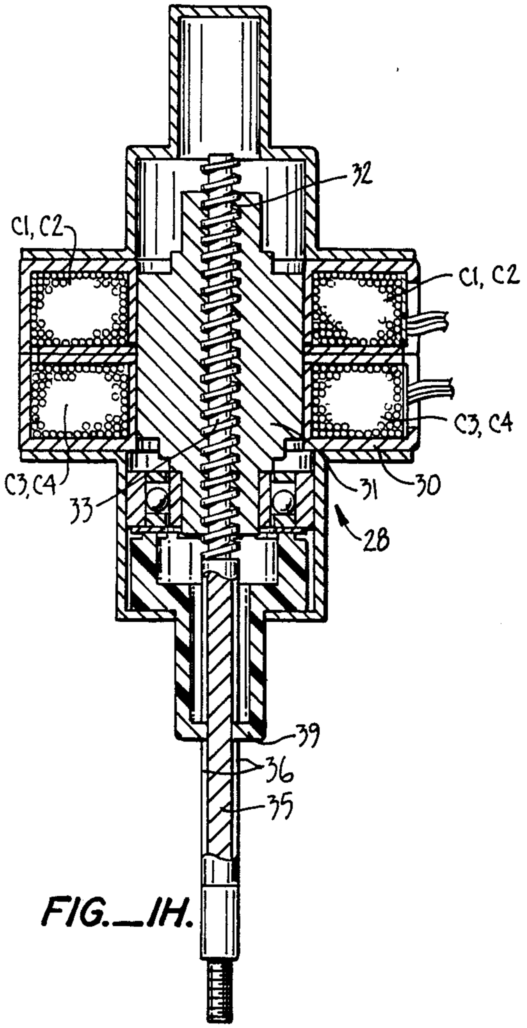
FIGS. 1H and 1I are cutaway views of details of the digital linear actuator included in the pipette shown in FIG. 1A.
Figure 1I:
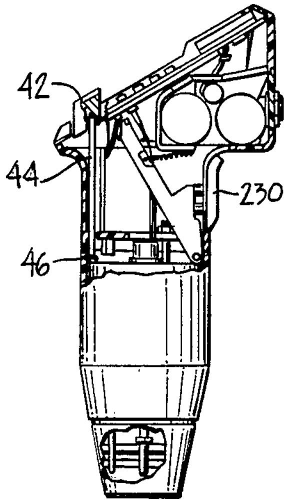
Figure 3:
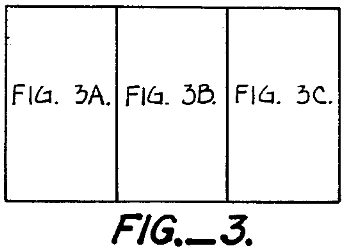
FIG. 3 illustrates how schematic circuit diagrams shown in FIGS. 3A, 3B, and 3C are related.
Figure 3A:
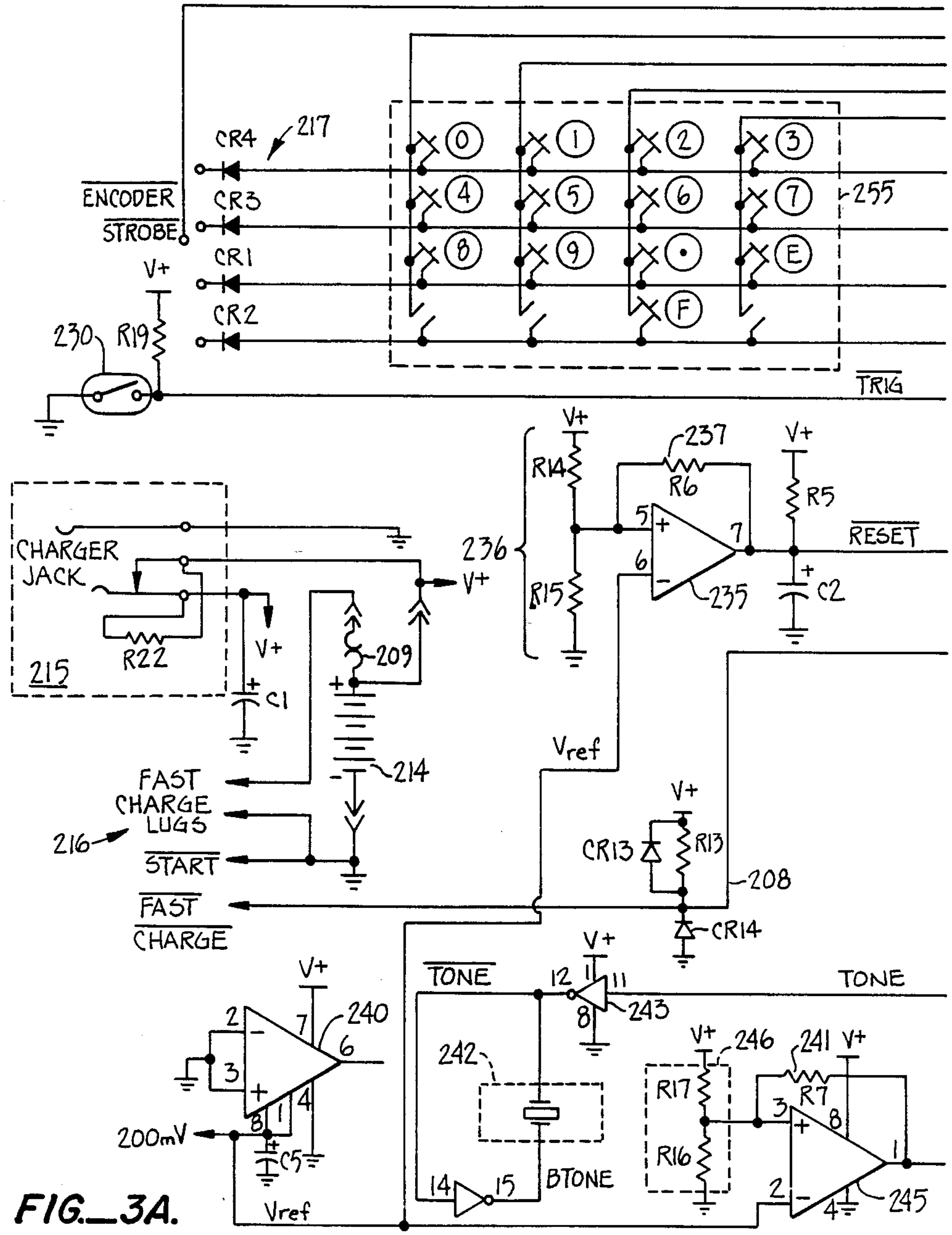
FIG. 3A shows power supply and keyboard circuits which provide signals to a microprocessor circuit.
Figure 3B:
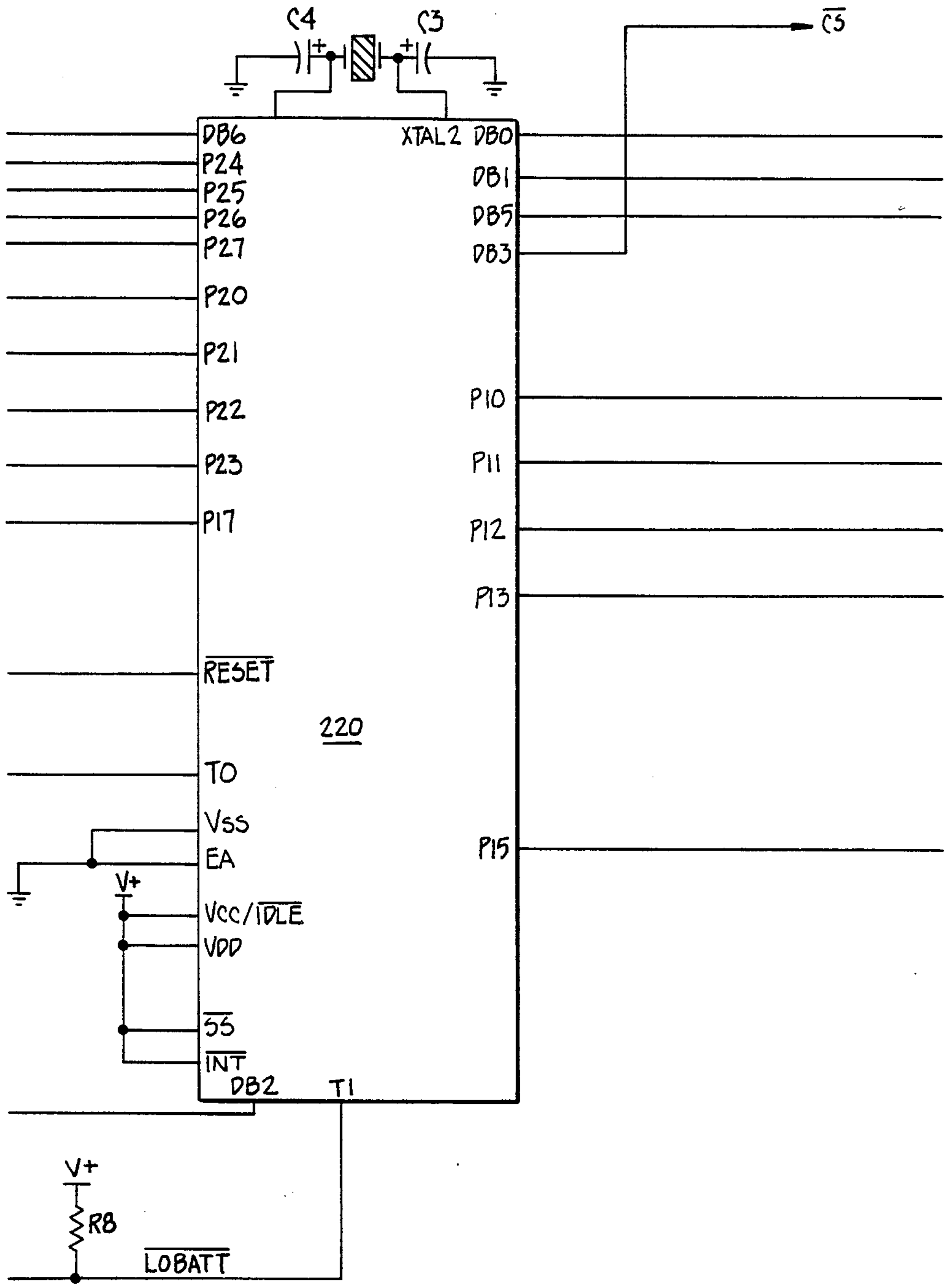
FIG. 3B shows the microprocessor circuit.
Figure 3C:
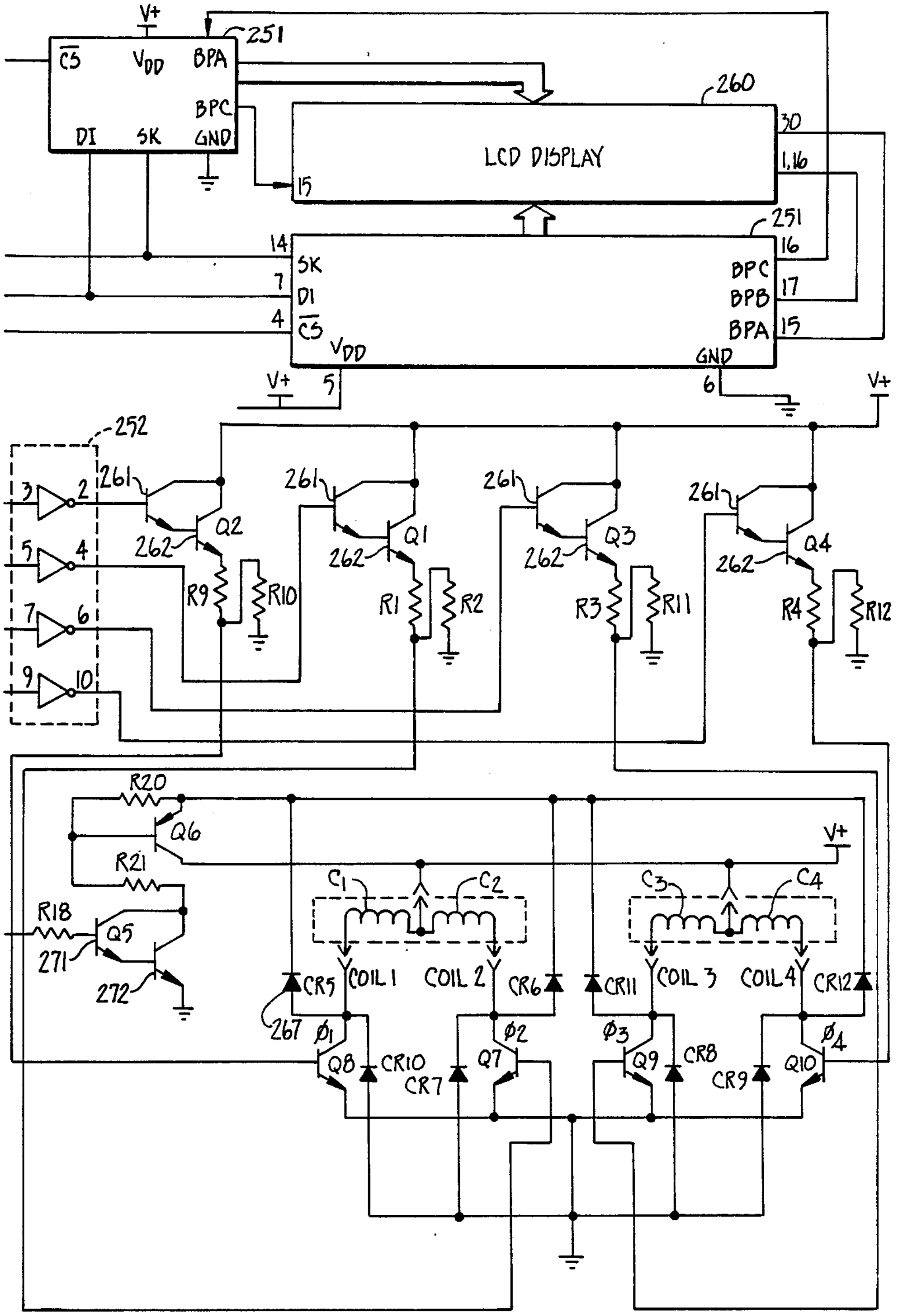
FIG. 3C shows display and motor control circuits to which the microprocessor circuit provides control signals.

Considered in more detail, the stepper motor 28 can include an outside stator 30 with bipolar wound center tapped coils, as shown in FIG. 3C at C1, C2, C3, and C4 and in FIG. 1H. An internal rotor 31 includes a threaded central bore 32 into which is threaded a screw 33 connected to an actuator shaft 35. Since the screw 33 extends through the rotor 31, the physical dimensions of the pipette 10 are reduced. The actuator shaft 35 includes grooves 36 which are confined in a guide 39 secured to the stator 30 for preventing joint rotation of the rotor 31 and screw 33, thereby imparting linear motion to the actuator shaft, indicated by a double arrow 38, as shown in FIG. 1C.

There are preferably 96 discrete half steps per rotation of the rotor 31, or approximately 3.75 degrees of rotor rotation per half step. These defined motor increments are adjacently discernible from one another in order to permit precisely recoverable rotational position. There are preferably 1,000 half steps per half inch of travel of the actuator shaft 35, so that each 3.75-degree arc constitutes 0.0005 inch of advancement of the actuator shaft.

The drive module 12 includes a control circuit which adapts the digital linear actuator to the particular displacement assembly 14 being used. Therefore, an air buffer and required offsets for the accurate pickup and discharge of liquid can be particularly and individually adjusted to the volume of the displacement assembly 14 attached.

As described earlier, the drive module 12 can be used with displacement assemblies $14_1$, $14_2$, $14_3$, $14_4$, etc., of different volumes, as shown in FIG. 2. Depending upon the quantity of liquid to be pipetted and/or titrated, an appropriately sized displacement assembly 14 is attached by the retainer ring 20 to the drive module 12.

The displacement assemblies $14_1$, $14_2$, $14_3$, $14_4$, etc. (FIG. 2) preferably include different size pistons 50. This affects the size of the air buffer 105 (FIG. 6C) preferably formed in the displacement chamber 26 and requires individual alteration of the stroke of the actuator shaft 35, and therefore the control circuit must be appropriately programmed.

The drive module 12 can be fitted with an encoder means corresponding to the particular displacement assembly 14 being used. The encoder means can be placed in a particularly conspicuous location on the drive module 12. In this location, the encoder means can be labeled with the full-scale volume range of the displacement assembly 14. The encoder means is preferably affixed to a discrete location on the drive module 12 which is either coupled to or uncoupled from the displacement assembly 14. The control circuit can be conformed by the encoder means to the full-scale volume range of the particular displacement assembly 14 attached.

For each of the various sizes of the displacement assembly 14, the encoder means preferably comprises an encoder plug 90 (FIG. 1A) inserted into the head 210 of the drive module 12 to contact a diode array 217 (FIG. 3A). The encoder plug 90 informs the control circuit as to which displacement assembly 14 is mounted. If the encoder plug 90 is removed, "---" appears in a liquid crystal display (LCD) 260, and all functions are disabled. When an encoder plug 90 is reinserted, the control circuit assumes that the displacement assembly 14 has been changed, and reinitializes itself as for the initial power up. Preferably, the pipette 10 only checks the encoder plug 90 when a "locked" annunciator on the LCD 260 is off. Therefore, removing or changing the encoder plug 90 when a keyboard 255 is locked has no effect.

The encoder plug 90 encodes the full-scale volume range of the displacement assembly 14 being used. Therefore, the movement of the piston 50 is correlated to the given full-scale volume range of the displacement assembly 14 attached. For example, if the full stroke of the piston 50 corresponds to 1000 steps of the stepper motor 28, the encoder plug 90 informs a microprocessor circuit 220 (FIG. 3B) that each step with a 2.5 μl displacement assembly 14 corresponds to 0.0025 μl, each step with a 10 ml displacement assembly corresponds to 0.01 ml, etc.

The microprocessor circuit 220 (FIG. 3B) preferably times out all power to the stepper motor 28 in any selected short interval of time, preferably 12.4 milliseconds. This time out causes power to be removed from the coils C1–C4 of the stepper motor 28, which means that the coil magnetic field dissipates, and consequently there is no holding torque on the rotor 31. Once motor rotation ceases, however, resident static friction in the screw 33 included in the digital linear actuator prevents movement of the actuator shaft 35. Static friction has been found to be adequate in preventing undue movement of the actuator shaft 35. By using static friction, no power is required for supplying holding torque, and therefore power requirements are reduced.

The control circuit shown in FIG. 3 is housed in the head 210 of the drive module 12 for providing a self-contained pipette. The circuits provide power, control the movement of the digital linear actuator and perform data input and output (I/O).

As shown in FIG. 3A, power is either supplied by a battery 214 or from a regulated six-volt direct current power source connected to a charger jack 215. Typically, rechargeable batteries of the nickel-cadmium variety are used. In view of the reduced power requirements, these batteries can be of small size. Using the charger jack 215, the battery 214 can be slow charged from the regulated power source in about 14 hours. Alternatively, the battery 214 can be fast charged through lugs 216 in about 1½ hours using a rapid charge stand (not shown). The control circuit preferably monitors that the battery 214 is being fast charged through a line 208. The temperature is monitored by means of a temperature switch 209 to safeguard against overcharging. Rapid charging allows the pipette 10 to be used for approximately 200 cycles with a lightweight battery and used again after 1½ hours.

As shown in FIG. 3A, an operational amplifier 240 supplies a constant 200 millivolt (mV) reference voltage $V_{ref}$. A comparator 235 uses $V_{ref}$ and a voltage divider 236 to monitor the power supply voltage V+. When V+ falls unacceptably, for example, below 3.5 volts, the comparator 235 transmits a low voltage signal to a RESET pin of the microprocessor circuit 220 (FIG. 3B) to initiate resetting the drive module 12. A hysteresis determined by a resistor 237 delays the reset until V+ reaches 5 volts, whereupon the comparator 235 transmits a high voltage signal to the microprocessor circuit 220 (FIG. 3B).

A comparator 245 uses $V_{ref}$ and a voltage divider 246 to provide a low battery signal to a T1 pin of the microprocessor circuit 220 (FIG. 3B) at about 4.8 volts and, in turn, to the LCD 260. A resistor 241 hysteresis delays the low battery display reset until V+ rises to about 5 volts.

Whenever the pipette 10 is waiting for keyboard input or a trigger 230 to be pulled, the instrument checks for a low battery condition or rapid charge signal. The low battery signal from the comparator 245 is monitored only during times when the coils C1–C4 of the stepper motor 28 are not being energized. If a low battery condition is detected, the pipette 10 warbles and the message "Lob" is displayed in the LCD 260. This message continues for as long as the low battery condition is present, but not less than 250 milliseconds. While this message is displayed, all keyboard and trigger functions are disabled. When the low battery condition disappears, the display is restored, and operation continues, unless the battery 214 had discharged enough to cause a reset, in which case the pipette 10 reinitializes itself. If the rapid charge signal is detected. indicating that the pipette 10 has been connected to the rapid charger, the instrument displays "FC" in the LCD 260, and all functions are disabled until the signal goes away, at which time the instrument recovers as in the low battery situation.

The movement of the actuator shaft 35 (FIG. 1C) and the readout which appears in the LCD 260 are controlled by the microprocessor circuit 220 shown in FIG. 3B, which can be a type 80C51 CMOS integrated circuit manufactured by the OKI Corp. of Tokyo, Japan. Pipetting and titrating modes selected through the keyboard 255 are initiated by the trigger 230 which transmits a start signal to a port P17 of the microprocessor circuit 220 to activate successive program sequences.

Various offsets are stored in a look up table stored in the read only memory resident in the microprocessor circuit 220. These offsets preferably compensate for second order nonlinearity inherent in operation of the pipette 10 due to surface tension and air pressure effects encountered during pipetting and titrating. The full scale volume range for each of the displacement assemblies $\mathbf{14}_1$, $\mathbf{14}_2$, $\mathbf{14}_3$, $\mathbf{14}_4$, etc. (FIG. 2) has a different offset or offsets corresponding to a particular predetermined percentage or percentages of the full stroke of the piston 50.

A duty-cycled recirculating chopper drive signal can be used in conjunction with the digital linear actuator included in the pipette 10. In one embodiment, power to the coils C1–C4 of the stepper motor 28 is supplied in a two-part duty cycle. After a sufficient time interval to build up the magnetic field in the coils C1–C4 of the stepper motor 28, a recirculating mode is switched into operation. This recirculating mode duty cycles with the power mode to provide an increased average current flow in the stator 30 of the stepper motor 28. Advantageously, a predictable torque with minimum consumption of power results. Upon commutation of the coils C1–C4 of the stepper motor 28, the recirculating mode is switched off.

The microprocessor circuit 220 provides square wave pulse trains to control energization of the coils C1–C4 of the stepper motor 28. Appropriate control signals are applied by ports P10–P13 of the microprocessor circuit 220 to inverting buffers 252, as shown in FIG. 3C, which can be integrated circuit type 4049 from National Semiconductor Corp. of Santa Clara, Calif. The buffers 252 invert the control signals and assure that the power transistors are off if the microprocessor circuit 220 is in a reset state to avoid inadvertent connection or short circuit of the coils C1–C4 of the stepper motor 28 directly across the power supply V+. The buffers 252 also prevent damaging current backflow from the power supply V+ to the microprocessor circuit 220.

Figure 4:
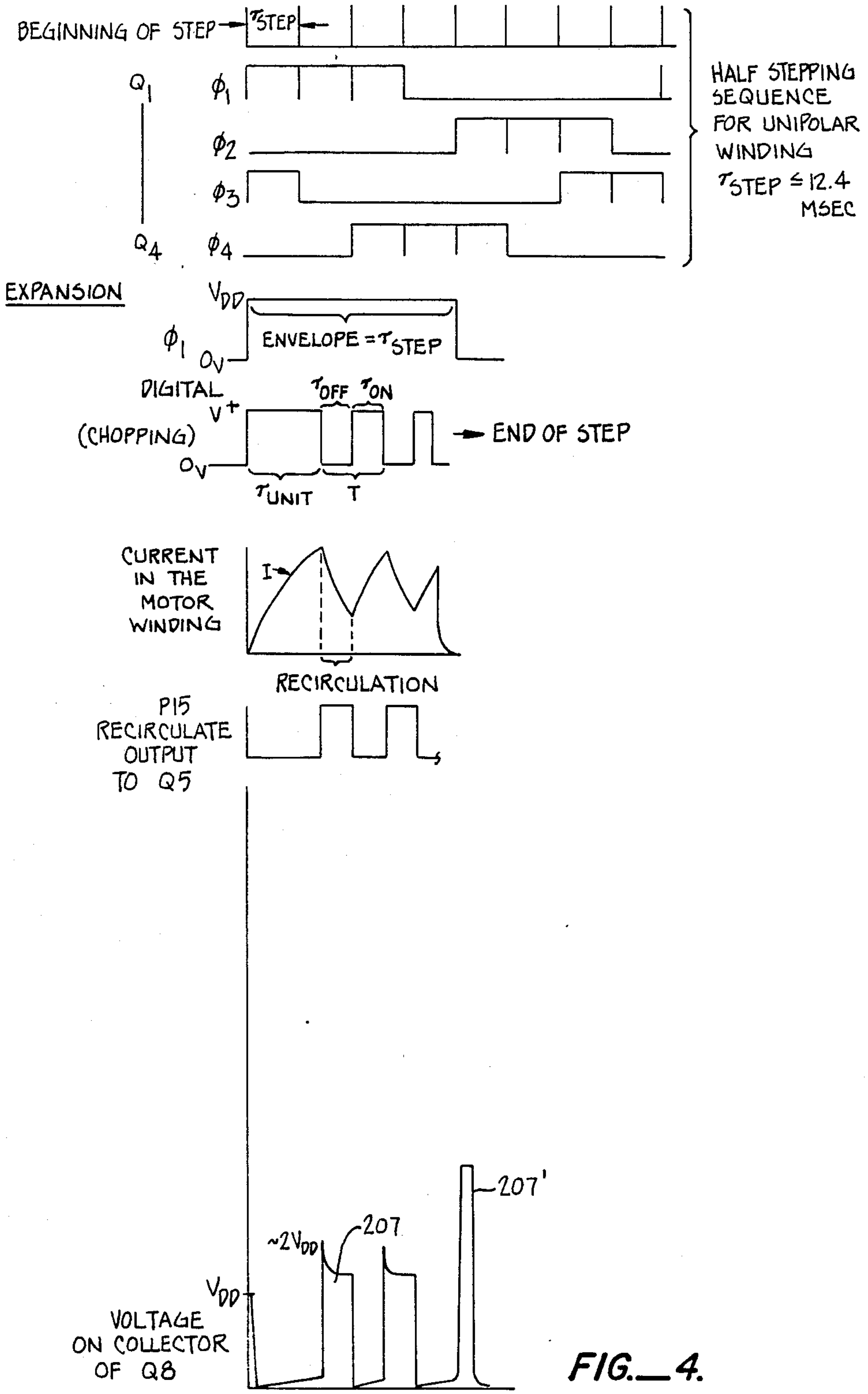
FIG. 4 is a timing diagram of the operation of the control circuit shown in FIG. 3.

Darlington pairs of transistors 261, 262 provide gain by a factor in the range of 10,000. The Darlington pairs 261, 262 control the bases of power transistors Q7–Q10 in accordance with the sequence of the control signals $\phi$1–$\phi$4, as shown in FIG. 4. The transistors Q7–Q10 switch current through the respective coils C2, C1, C3, and C4 of the stepper motor 28.

The current pulses supply power greater than the rated capacity of the coils C1–C4. To prevent the coils C1–C4 from overloading the microprocessor circuit 220 (FIG. 3B) chops the pulse into $\tau_{unit}$, $\tau_{off}$, and $\tau_{on}$, as shown in FIG. 4.

Initially, the duty cycle of the power supplied to a coil immediately following energization as a result of commutation is preferably of a period $\tau_{unit}$, as shown in FIG. 4. The period $\tau_{unit}$ can have a longer duration than the subsequent periods $\tau_{on}$ during which power is supplied to the coil. This more rapidly builds up the magnetic field in the coil immediately following energization as a result of commutation, thereby producing greater torque and improving response. The period $\tau_{unit}$, for example, can be 300 microseconds, whereas the period $\tau_{on}$ for example, can be 100 microseconds and the period $\tau_{off}$ can be, for example, 60 microseconds in the case where one of the coils C1–C4 of the stepper motor 28 is energized. Furthermore, the period $\tau_{unit}$, for example, can be 140 microseconds, whereas the period $\tau_{on}$, for example, can be 60 microseconds and the period $\tau_{off}$ can be, for example, 60 microseconds in the case where two coils C1–C4 of the stepper motor 28 are energized.

When the transistors Q7–Q10 open during the periods $\tau_{off}$, the voltage on the collectors (connected to the coils C1–C4 to which duty-cycled power is being applied) flies up and overcomes the threshold of the transistor Q6, as will be described shortly. Consequently, current recirculates through the coils C1–C4, the respective diodes CR5, CR6, CR11, and CR12, and the transistor Q6 for increasing efficiency and reducing power consumption at all speeds of the stepper motor 28.

For example in a typical case of energizing a coil, such as the coil C1 the microprocessor circuit 220 (FIG. 3B) applies a low voltage at the port P10, which is inverted by the top inverter 252 and applied to the left Darlington pair 261, 262. This provides a large current to the base of the transistor Q8 which closes and conducts current from one power supply terminal, namely, V+ through the coil C1 to the other power supply terminal, namely, common, and causes a half step rotation of the rotor 31.

The control signal provided by the microprocessor circuit 220 (FIG. 3B) at the port P10 is preferably an eight kilohertz square wave which, through the respective Darlington pair 261, 262, turns the transistor Q8 on and off. This produces a current in the coil C1, as shown by the sawtooth wave in FIG. 4. When the transistor Q8 opens, the voltage across the coil C1 flies up, as indicated by the numeral 207 shown in FIG. 4, sufficiently to cause a recirculating current through the diode CR5, transistor Q6, and coil C1 during periods when a transistor pair 271, 272 is on.

Preferably, interruption of the recirculation occurs during operation of the stepper motor 28 except periods $\tau_{off}$ when power is not being supplied to an otherwise energized coil by the control circuit after a sufficient magnetic field has been built up in the coil following energization as a result of commutation. Consequently, gateable recirculation is provided during operation of the stepper motor 28. Interruption of the recirculating current path during periods $\tau_{on}$, when power is being applied to an energized coil by the control circuit, reduces losses. The recirculating current path is immediately opened for the previously energized coil upon commutation of the coils C1–C4 to cause movement of the rotor 31 between adjacent steps. The voltage in disconnected coils rapidly rises, thereby causing rapid magnetic field collapse. Consequently, the magnetic field from the coil active in the previous step does not offset the torque induced by the coil energized for the present step, and movement of the rotor 31 to adjacent coil magnetic dispositions is facilitated. As a result, no appreciable impediment to high speed movement is encountered.

The control circuit includes the transistor Q6 and the transistor pair 271, 272 for providing gateable recirculation. During the periods $\tau_{on}$, the microprocessor circuit 220 (FIG. 3B) applies a control signal from a port P15 to cause the transistor pair 271, 272 to open, in turn opening the transistor Q6 and prohibiting current recirculation, thereby reducing losses which would appear if a resistor was present instead of the transistor Q6. This prolongs battery power.

With regard to the coil C1, for example, during the periods $\tau_{off}$, the microprocessor circuit 220 (FIG. 3B) applies a control signal from the port P15 to cause the transistor pair 271, 272 to close, in turn closing the transistor Q6 and allowing current recirculation through the coil C1, diode CR5, and emitter-collector circuit of the transistor Q6. The back EMF of the coil C1 causes recirculating current when power is not being applied to the coil C1 from the power supply during the periods $\tau_{off}$ of the control circuit duty cycle, which maintains current flowing in the coil C1. thereby conserving the energy stored in the magnetic field. This can be a problem when it is desired to commutate the coils C1–C4 of the stepper motor 28 rapidly. The problem is addressed by programming the microprocessor circuit 220 (FIG. 3B) to apply a control signal from the port P15 to cause the transistor pair 271, 272 to open, in turn opening the transistor Q6 and cutting off the recirculating current when the coils C1–C4 of the stepper motor 28 are commutated. With the transistor Q6 open, the back EMF in the coil C1 flies up, as shown at 207 in FIG. 4, and the magnetic field in the coil collapses very rapidly while a magnetic field is built up in the next coil or coils.

When the stepper motor 28 is being single stepped at slow speeds, current is provided in timed voltage envelopes of up to 12.4 milliseconds, after which the transistor pair 271, 272 is opened to collapse the magnetic field rapidly. The microprocessor circuit 220 (FIG. 3B) applies a control signal to close the transistor pair 271, 272 for disabling current recirculation at the end of the voltage envelope in the control signal to the transistor Q2 and for maintaining the transistor pair 271, 272 open to prevent recirculation of current when the coil C1 is commutated.

In the half step environment, the duty cycle can be controlled to provide both at the full step and half step the same amount of displacement. By the expedient of making the duty cycle longer in the energizing of a single coil (on the order of 60%) and shorter in the energizing of dual coils (on the order of 50%). uniform torque and constant movement occur in the half stepped motor, which provides smoother operation.

A further advantage of the control circuit is that the stepper motor 28 moves in discrete movements of adjacently discernible programmable half steps. Where the rotor 31 comes to rest at a position that is slightly off of the precise half step position, correction to the precise and called for half step position occurs on the next called for step. A high degree of rotational reliability in response to stepper motor count and consequent precise linear actuation result.

Generally, over-movements are negligible since the static friction of the screw 33 is sufficient to provide reliable braking to the actuator shaft 35. Current through the coils C1–C4 of the stepper motor 28 to provide holding torque braking is not necessary which preserves battery power.

Tone signals preferably provide the user of the pipette 10 an acoustical sense of the operating instrument. As shown in FIG. 3A, a piezoelectric tone generator or bender 242 is connected through an amplifier 243 to generate tone sequences in response to appropriate signals from the microprocessor circuit 220 (FIG. 3B).

Referring to FIGS. 1A and 1C, the keyboard 255 includes keys numbered 0–9 and a decimal key in three rows for entry of information. The upper row also includes an "F" key for designating function selection and the lower row includes an "E" key for storing entered keyboard data in random access memory and displaying the data in the readout which appears in the LCD 260.

Various additional symbols are imprinted on the panel adjacent the keys, including a musical note for turning on and off sound; an "L" for locking the keyboard 255; a "C" which serves a dual function, namely, clearing a displayed keyboard entry, and, when the "F" key is depressed followed by "0" while liquid is being or ready to be dispensed, the liquid is dispensed immediately and the piston 50 returns to a home position; a "P" for selecting a pipette mode; an "M" for selecting a multiple dispense mode: a "T" for selecting a titrate mode; a "D" for selecting a dilute mode; "Measure" for selecting a measurement mode: "Mix" for choosing an optional mixing method associated with various modes; "Vol. Seq." for choosing a volume sequencing method associated with various modes; and "Speed" for selecting one of a plurality of piston stroke velocities. Modes and optional methods, or a different speed, can be changed whenever the keyboard 255 is active by pressing the function key "F" followed by the appropriately labeled mode key.

The LCD 260 can be driven by two triplexed display drivers 251 (FIG. 3C) available from National Semiconductor Corp. Referring to the expanded view of FIG. 1A, the LCD 260 includes four digits and a number of other symbols called annunciators. The digits generally display a volume in μl or milliliters (ml). The LCD 260 operates with a movable decimal point and displays the symbol "μl" to indicate microliters and "ml" to indicate milliliters. Occasionally, a short text message is displayed in the digits.

In an alternative implementation of the control circuit shown in FIG. 3, the microprocessor circuit 220 (FIG. 3B) can be a type M50930 CMOS integrated circuit manufactured by Mitsubishi Electric Corp. of Japan. This integrated circuit includes a built-in LCD controller, which obviates the need for the dual triplexed display drivers 251 for the LCD 260.

Also, the duty-cycled recirculating chopper drive with center tapped coils C1–C4 described above can be replaced by a conventional H-bridge bipolar drive utilizing the full coils of thestepper motor 28 and MOSFET transistors used in a bipolar mode. This alternative H-bridge bipolar drive is preferred in a modified embodiment in which the energy source is a primary battery (lithium). Such a modified embodiment can provide approximately 10,000 cycles (full scale) with a single battery.

The annunciators describe the state of the pipette 10 at any given time. "KB" appears when the piston 50 is at the home position to indicate that the keyboard functions are enabled. When the piston 50 is not in the home position, the keyboard 255 is disabled. and the LCD 260 does not display "KB". Also, "locked" indicates that all the keyboard functions except "F,0", "F,8", and "F,9" are disabled. "PICKUP" indicates that the pipette 10 is ready to pick up liquid. "DISPENSE" indicates that the pipette 10 is ready to dispense liquid. "MULTI" indicates that the pipette 10 is in the multiple dispense mode. "$V_1$" and "$V_2$" turn on in conjunction with "PICKUP", "DISPENSE", or during numeric entry to indicate which volume is being picked up dispensed, or entered. These annunciators are not used in the pipette mode, since there is only one volume. "MEASURE", "TITRATE", and "DILUTE" turn on individually to indicate that the pipette 10 is in, respectively, measurement, titrate, or dilute mode. If none of these or "MULTI" is displayed the pipette 10 is in the pipette mode. An inverse or negative annunciator "SEQ." indicates volume sequencing is in use, while a similar annunciator "MIX" indicates mixing is operative. "CLEAR" turns on at the conclusion of a multiple dispense cycle and commands the user to enter "F,0" or "0" (clear). An inverse or negative letter "F" turns on whenever the "F" (function) key is depressed and to indicate that a two-key sequence is in progress.

The "F" key is enabled at all times the stepper motor 28 is not moving (except when the entire pipette 10 is disabled, i.e., when the encoder plug 90 is missing, when the instrument is on the fast charger, or when a low battery condition is detected). When the "F" key is depressed, the "F" annunciator is turned on, thereby indicating that the pipette 10 is in the middle of a two-key function sequence. When the next key is depressed, the pipette 10 turns off the "F" annunciator and then checks to see if a valid function has been selected. If so, the pipette 10 performs the specified function. If not, nothing happens. The microprocessor circuit 220 (FIG. 3B) treats the trigger 230 as another button on the keyboard 255, and therefore the sequence "F,trigger" does nothing.

There are three special keyboard functions which are implemented by depressing the "F" key followed by a digit. The functions "F,8" and "F,9" are enabled only when the "KB" annunciator is on, "F,0" is enabled except when the "KB" annunciator is on. These functions are not disabled by keyboard lock.

Whenever the piston 50 is not at the home position and is waiting for a trigger pull, an "F,0" sequence causes the pipette 10 to blow out the remaining liquid and return to the home position. If the pipette 10 is already at home, this sequence has no effect. An "F,8" sequence turns off all tones except the error and low battery warbles. Entering this sequence again turns the tones back on. An "F,9" sequence locks the keyboard 255 and turns on the "locked" annunciator. Entering this sequence again unlocks the keyboard 255 and turns off the annunciator. When the keyboard 255 is "locked", the numeric keys (including "E") and the mode selection functions are disabled.

Whenever the "KB" annunciator is on, and the "locked" annunciator is off, the set volume(s) can be changed. This is done by simply entering the number on the keyboard 255. When the first digit is entered, the digits in the LCD 260 flash. If an error is made, entering the sequence "F,0" causes the LCD 260 to flash the previous value, allowing the user to re-enter a correct value. When the desired value is flashing in the LCD 260, the user depresses "E" (enter), and the number is stored. If the pipette 10 is in the pipette or measurement mode, the LCD 260 stops flashing at this point, and the instrument is ready to pick up the set volume $V_1$. In any other mode, the pipette 10 flashes the second volume $V_2$, giving the user the opportunity to change the second volume. If the second volume $V_2$ needs no change, the user merely depresses "E". At this point, the LCD 260 stops flashing and displays the first volume $V_1$, and the pipette 10 is ready to pick up the first volume. If the user wants to change the second volume $V_2$ without changing the first volume $V_1$, he depresses "E" to get directly to the second volume $V_2$. Pressing "E" twice allows the user to review the set volumes $V_1$ and $V_2$ without changing anything.

If the value the user attempts to enter is invalid, the pipette 10 warbles, displays the message "err" for approximately three quarters of a second, and continues to flash the LCD 260. At this point the user re-enters a legal value.

The rules for numeric values are as follows. No value can be larger than the nominal full-scale volume of the attached displacement assembly 14. In the multiple dispense and titrate modes, the volume $V_2$ must be less than or equal to the volume $V_1$. In the dilute mode, the sum of the volume $V_1$ and the volume $V_2$ must not exceed 101% of the nominal full-scale volume. With the exception of the volume $V_2$ in the titrate mode and the volume $V_1$ in the measurement mode, all volumes must be greater than zero.

In accordance with the invention, calibration of the digital linear actuator is also provided, as shown in FIGS. 5A–5D taken together. According to this aspect of the invention, calibration is initiated upon either powerup or restoration of power after power loss, as indicated by the numeral 122. Also, in the case where interchangeable displacement assemblies $14_1$, $14_2$, $14_3$, $14_4$, etc. (FIG. 2) are available, initiation of calibration requires insertion of a displacement assembly 14 and encoder plug 90, as indicated by the numeral 124. When calibration is initiated, the digital linear actuator undergoes full extension, as indicated by the numeral 126. Typically, the digital linear actuator reaches full extension with the piston 50 contacting a travel limit interior of the displacement chamber 26 of the attached displacement assembly 14. Thereafter, the stepper motor 28 electrically slips, as indicated by the step 126. Electrical slippage of the stepper motor 28 continues until the control circuit has commanded all steps required for a full extension. Upon completion of the full extension, a programmed retraction to the home position (the physical position of the piston 50 when ready to pick up liquid) occurs, as indicated by the numeral 128. This programmed retraction preferably introduces an interstitial air space within the displacement chamber 26 particular to the size of displacement assembly 14 attached to the digital linear actuator. Furthermore, the pipette 10 is set in the pipette mode, as indicated by the numeral 130, and various default values for the volumes $V_1$ and $V_2$ are entered. as indicated by the numeral 132. If interchangeable displacement assemblies $14_1$, $14_2$, $14_3$, $14_4$, etc. (FIG. 2) are available and the displacement assembly 14 and encoder plug 90 are replaced, reinitialization takes place, as indicated by the numeral 134. Preferably, during the calibration process, which takes about eight seconds, the digits in the LCD 260 are blanked, and all functions are disabled.

Figures 6A, 6B, 6C, 6D, 6E:
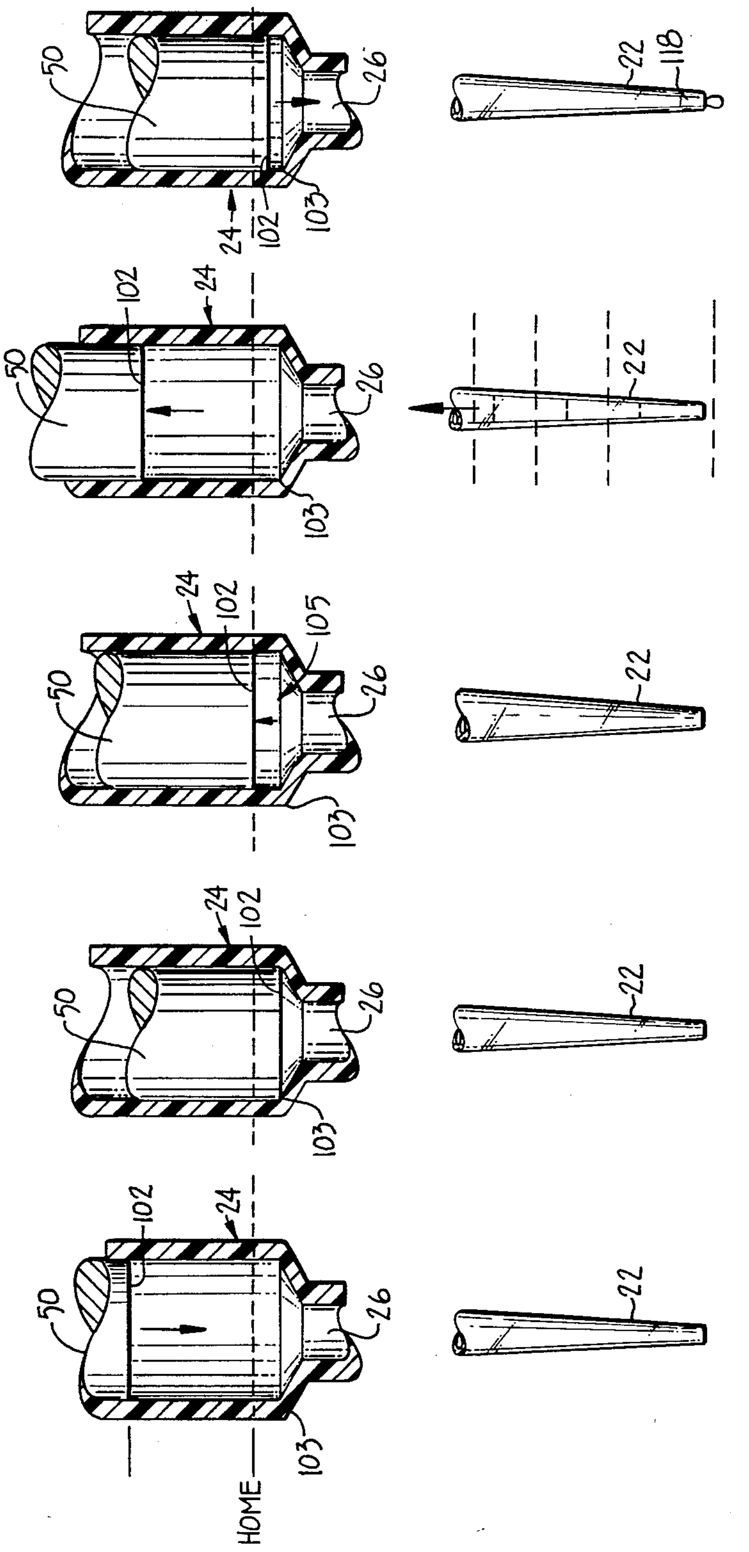
FIGS. 6A–6E taken together illustrate calibration of the pipette shown in FIG. 1A, as well as drawing and dispensing liquid with the pipette.

Movement of the piston 50 upon calibration is shown in FIGS. 6A, 6B, and 6C. First, assume that the digital linear actuator has stopped, leaving the piston 50 in a random position, as shown in FIG. 6A. The microprocessor circuit 220 (FIG. 3B) energizes the stepper motor 28 to extend the piston 50 as far as possible into the cylinder 24. The travel limit is where the face 102 of the piston 50 strikes a shoulder 103 at the lower end of the displacement chamber 26, as shown in FIG. 6B, which blocks further advancement.

The microprocessor circuit 220 (FIG. 3B) continues to energize the stepper motor 28 after the piston face 102 is seated against the shoulder 103, thereby causing the stepper motor to slip. Preferably, the microprocessor circuit 220 (FIG. 3B) then reverses the stepping sequence to move the piston 50 away from the shoulder 103 a predetermined number of steps to the home position. This draws in an interstitial air volume 105, as shown in FIG. 6C, which buffers and prevents liquid from contacting the piston face 102 in order to avoid contamination of liquid subsequently pipetted. However, an air buffer need not be provided (i.e., the air buffer can be zero). In an alternate and less preferred embodiment, an optical flag 37 (FIG. 1C) connected to the actuator shaft 35 can be used to determine the home position of the piston 50.

An advantage of calibration in accordance with the invention is that the stroke of the digital linear actuator can be individually adjusted to the particular displacement assembly 14 being used. Thus, a precisely determined air buffer 105 can be provided at the interface between the piston 50 and the liquid being handled during pipetting.

Considered in more detail, when power is first applied (i.e., dead batteries recharged, batteryless instrument is connected to wall power outlet, new batteries installed. etc.) or when the encoder plug 90 is initially inserted, or removed and re-inserted, the pipette 10 further initializes itself as follows. Not only is the piston 50 relocated to the home position, but the pipette 10 is set in the pipette mode, as indicated by the step 130, and sets default volumes for all modes, as indicated by the step 132. Also, in addition to default values being set, the keyboard 255 is unlocked; the tone generator 242 (FIG. 3A) is enabled; the speed is set at 8; the mix volume is set to the nominal full-scale volume; and the sequential volumes are set to zero.

The pipette 10 preferably has five operating modes: pipette, multiple dispense, titrate, dilute, and measurement, which are described in detail below. When the pipette 10 is initially calibrated, the instrument is set in the pipette mode, as indicated by the step 130. The mode can be changed whenever the "KB" annunciator is on and the "locked" annunciator is off by entering the following sequences: "F,2" for multiple dispense; "F,3" for titrate: "F,4" for dilute; and "F,5" for measurement. The microprocessor circuit 220 (FIG. 3B) scans the keyboard 255, as indicated by the numeral 301, for determining any change in mode entered by the user. Entry of "F,1" for pipette returns the pipette 10 to the pipette mode. The pipette 10 maintains a separate volume memory for each mode, so that when the user switches, for example, from pipette mode to dilute mode and back, the volume setting for the pipette mode has not changed, regardless of what settings were used while in the dilute mode.

Figure 7:
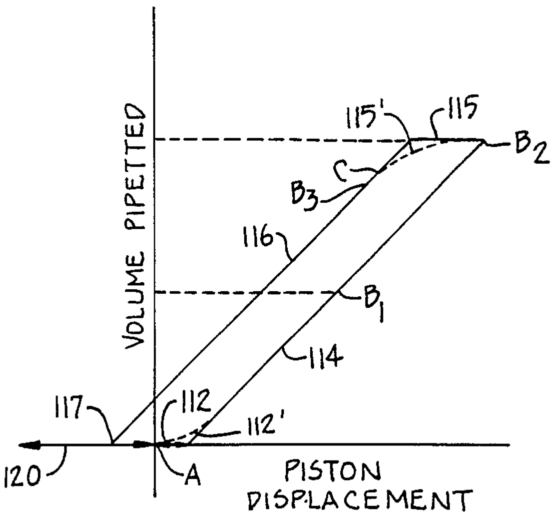
FIG. 7 is a graph which shows the volume of liquid displaced through a displacing piston cycle of the pipette shown in FIG. 1A.

A complete operational cycle of the pipette 10 is illustrated in the FIG. 7 graph which shows piston displacement on the horizontal axis and pipetting volume on the vertical axis. The proportions of the graph vary with the displacement size of the piston 50 and the volume of the displacement chamber 26 and tip 22. Thus, there is a family of curves similar to FIG. 7 for the various displacement assemblies $14_1$, $14_2$, $14_3$, $14_4$, etc.

A number of factors, including liquid surface tension and the expansibility of the air buffer 105. resist pipetting. Consequently, there must be an initial stroke, or offset, from the home position A as illustrated by an interval 112 shown in FIG. 7 before liquid begins to be taken in. Piston displacement stops at a position $B_1$, if a liquid volume $B_1$ is desired, or at a position $B_2$ for a volume $B_2$, as shown in FIG. 7.

There is a reverse problem at the beginning of discharge. Air buffer compressibility and liquid surface tension absorb piston displacement and delay any liquid discharge.

The initial movement of liquid can be tapered, as illustrated by the path 115', where air buffer compressibility and surface tension, as well as liquid viscosity, affect pipetting and/or titrating performance. The graph is for a liquid having the viscosity and surface tension properties of water.

Whenever an amount of liquid less than the total volume pipetted is to be initially dispensed, such as when predetermined amounts are serially dispensed in the multiple dispense mode or amounts are dispensed in the titrate mode, an additional procedure is preferably followed. When liquid is initially taken into the pipette 10, a volume in excess of the total needed is taken into the instrument, as represented by the volume $B_2$ in FIG. 7. Thereafter, at the completion of the initial liquid intake a small amount of discharge is effected by extending the piston 50 slightly beyond the point C shown in the FIG. 7 graph, which neutralizes the air buffer spring force and neutralizes surface tension and discharges a small amount of liquid so that only a volume $B_3$ of liquid is contained. Consequently, the liquid is ready for immediate accurate discharge in a desired volume.

Furthermore, the liquid discharge is not complete at the home position A shown in FIG. 7. The piston 50 must move slightly beyond the home position A to an offset position, as indicated at 117 in FIG. 7, to complete the discharge. The pipette 10 preferably stops for a programmed period of time, on the order of one second, while liquid flows down the interior wall of the tip 22 and accumulates in a drop 118, as shown in FIG. 6E. A blowout stroke 120 (FIG. 7) dislodges the accumulated drop 118. Any liquid clinging to the outside of the tip 22 can then be flicked, or "tipped", off by tapping the tip 22 against the inside wall of the target receptacle.

The volume enclosed and the offsets and overstrokes required vary. However, the microprocessor program takes these changes in proportions into account based on the encoder plug 90 inserted, thereby greatly improving the accuracy of pipetting and/or titrating.

Many factors affect the accuracy of an air displacement pipetting and titrating device. Factors such as piston diameter accuracy, linear actuator accuracy and linearity, the physical geometry of the pipetting tip (such as orifice size and taper of inside surface), the material from which the tip is made, the quality of the tip surface, the volume of liquid being pipetted, the type of liquid being pipetted, the size of the air buffer between the liquid-piston interface, the rate of piston movement, as well as repetition rate between pipette cycles, temperature of the liquid, temperature of the pipette, and temperature of the room air, all have an impact in determining pipetting accuracy. To obtain maximum accuracy from a pipetting device, each of these factors must be dealt with by the configuration and construction of the pipetting device, or by user technique.

Error attributable to the surface tension and air buffer expansion and contraction effects referred to previously, is caused by a complex set of factors involving the specific tip geometry and the material from which it is made, type and amount of liquid being pipetted, and the size of the air buffer. When liquid is first drawn into the tip, the relative pressure difference between the air buffer and atmospheric pressure must be sufficient to produce a force large enough to overcome the surface tension of the liquid, as well as the wetting characteristics between the liquid and the surface of the tip. The diameter of the tip opening and the taper above the opening are also important factors in determining the magnitude of the initial pressure difference required to initially transport liquid inside the tip. This effect is illustrated by the curve 112, shown in FIG. 7.

Once liquid is inside the tip, the pressure difference between the air buffer and atmosphere must also be sufficient to hold the liquid against the effects of gravity. The density of the liquid, and the height of the liquid in the tip are the primary factors that contribute to the gravity effect. Since the tip is tapered inside, the liquid height is a nonlinear function of the volume contained. Likewise surface tension effects are a nonlinear function of the liquid volume contained. The pressure difference between the air buffer and the atmosphere causes the air buffer volume to expand according to the gas law ($PV=nRT$).

The amount of volume the air buffer expands in order to provide sufficient force to lift a given volume of liquid into the tip against surface tension and gravity effects produces a corresponding error or deviation from the volume displacement of the piston. Because of the factors just described, this error or deviation in pipette volume from piston displacement volume is a nonlinear function of pipette volume.

Figure 16A:
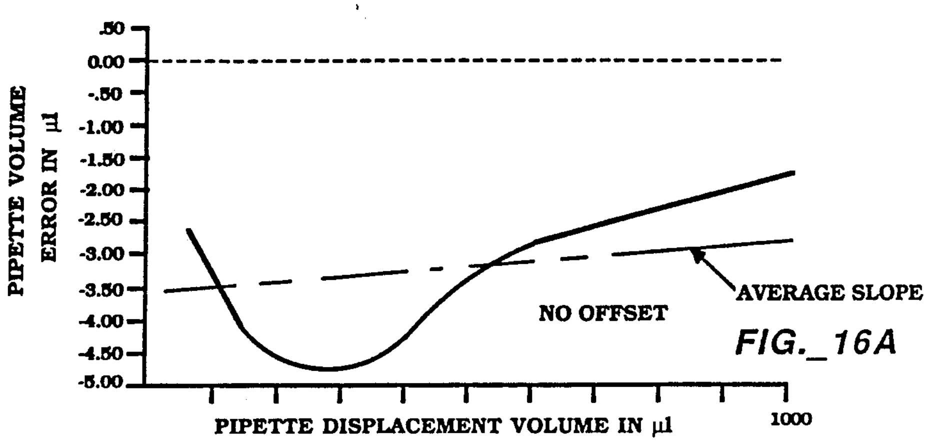
FIGS. 16A-16C, taken together shows errors attributable to air pressure and surface tension effects and compensation for such errors by the use of an offset or offsets.

If the factors that determine piston displacement accuracy and linearity (i.e., piston diameter and linear actuator accuracy) are controlled to be insignificant, then the surface tension and air buffer volume pressure effects dominate. FIG. 16A is a plot that illustrates these conditions for a displacement assembly 14 with a 1000 μl full-scale volume range pipetting water. The horizontal axis represents piston displacement volume from 0 to 1000 μl while the vertical axis represents the error in pipette volume (i.e., liquid volume drawn into the tip minus piston displacement volume). As can be seen from the curve, a nonlinear relation exists with the error being from approximately −4.5 μl to −1.5 μl. The average slope of the curve is a function of the piston diameter. A slope of zero indicates that the piston diameter has no contribution to error.

Figure 16B:
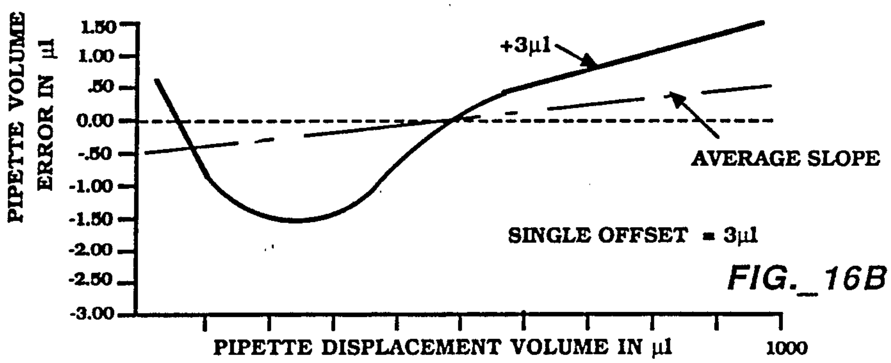

The average error over the entire volume range in FIG. 16A is approximately −3 μl. With a 3 μl fixed offset added to every volume setting, the error varies between approximately −1.5 82 l and +1.5 μl, as illustrated in FIG. 16B. This reduces the worst case error by a factor of 3, and makes the average error over the entire range close to zero. If multiple offsets are used for a given range, then the pipetting error due to surface tension and air buffer volume effects can be further minimized as illustrated in FIG. 16C.

Figure 16C:
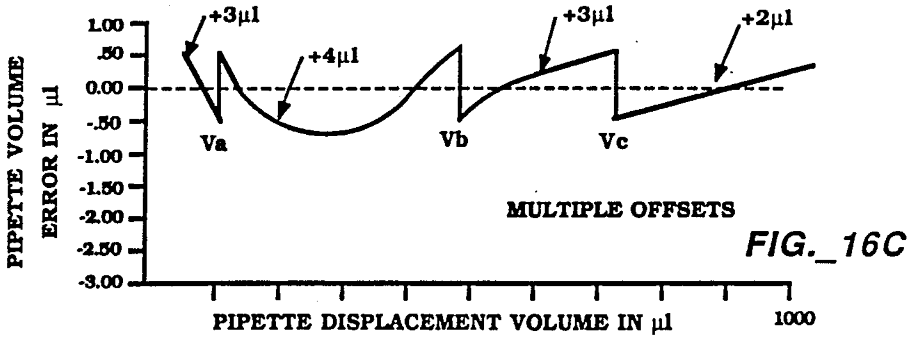

As shown in FIG. 16C an offset of 3 μl is used for volume settings from 0 to $V_a$ (approximately 0 to 100 μl); an offset of 4 μl is used from $V_a$ to $V_b$ (approximately 100 to 450 μl); an offset of 3 μl is used from $V_b$ to $V_c$ (approximately 450 to 700 μl); and an offset of 2 μl is used from $V_c$ to full-scale (700 to 1000 μl). With these offsets the maximum error never exceeds plus or minus 0.5 μl which is a factor of 3 improvement over using a single offset for the entire range, and a factor of 9 improvement over using no offset at all.

Error plots similar to FIG. 16A vary as a function of a full-scale volume range of the displacement assembly in use. Therefore, a unique set of points with corresponding offsets ($V_a$, $V_b$, $V_c$ as shown in FIG. 16C) exist for each range. The encoder means determines which set of offsets are used by the microprocessor circuit 220 (FIG. 3B).

When the pipette 10 is initialized, or when the user enters the sequence "F,1", the instrument enters the pipette mode. This is indicated by all of the mode annunciators on the LCD 260 being off. The microprocessor circuit 220 (FIG. 3B) determines that the pipette 10 is in the pipette mode, as indicated by the numeral 302.

Figure 8A:
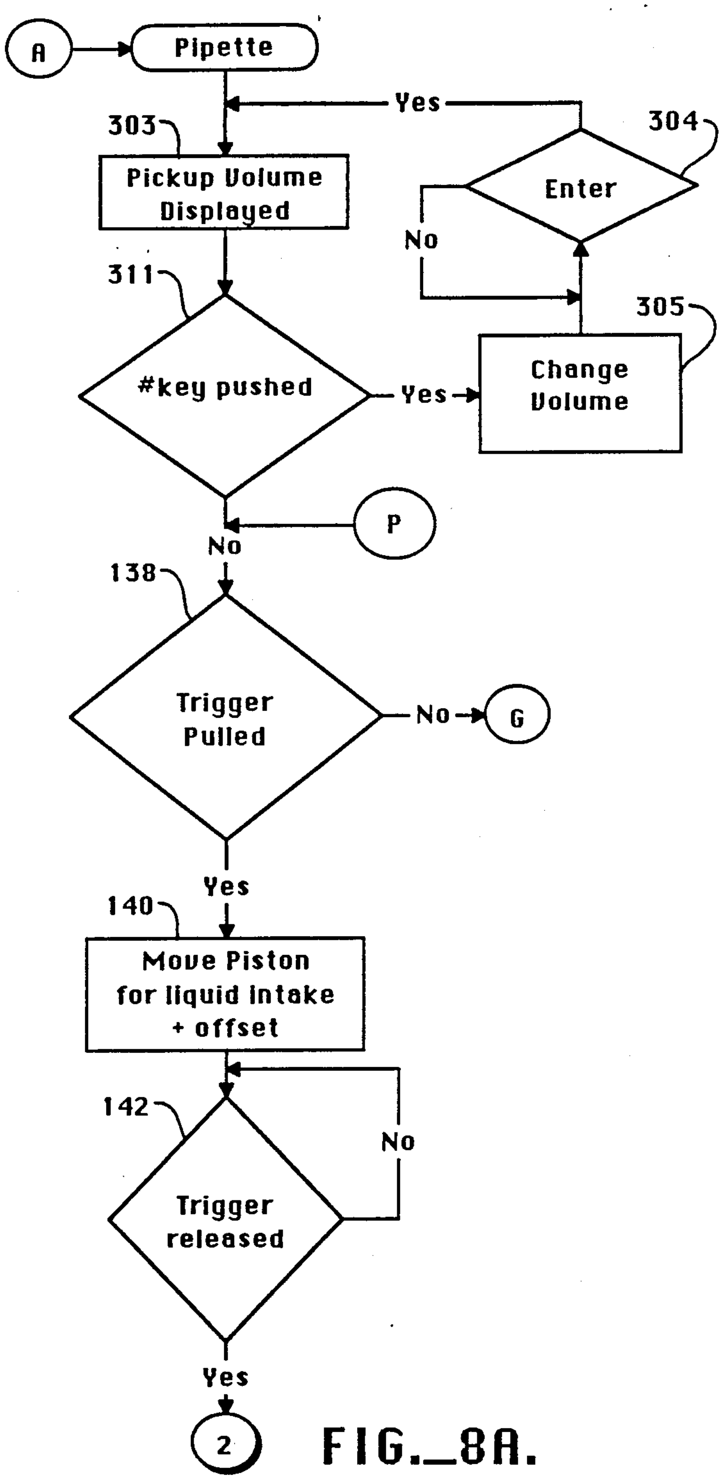
FIGS. 8A–8B, taken together illustrate a method for pipetting in accordance with the invention.
Figure 8B:
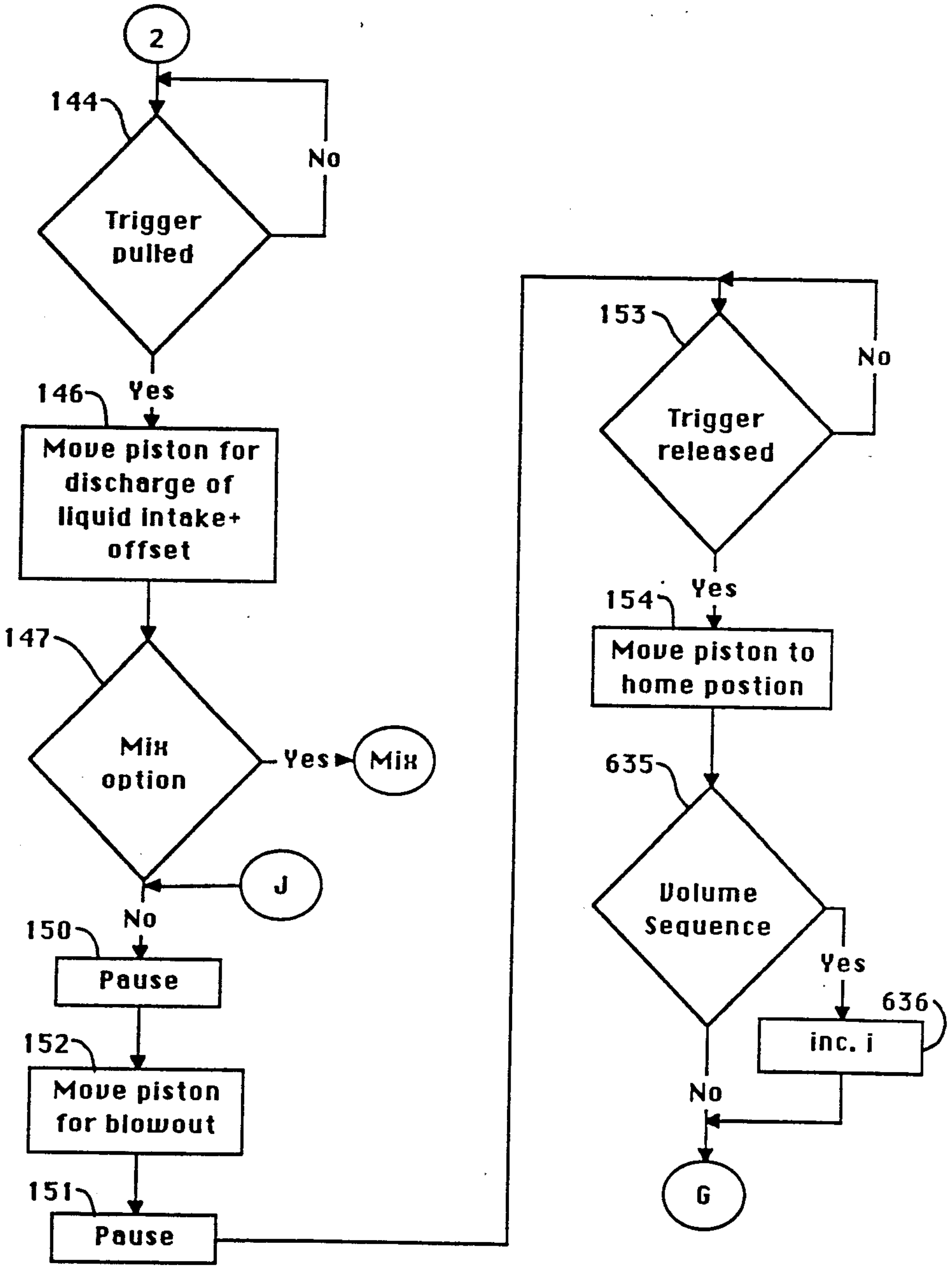

An automated pipette mode is provided in accordance with the invention, as shown in FIGS. 8A and 8B. According to this aspect of the invention, pipetting occurs from the home position determined during the calibration process shown in FIGS. 5A–5D, that is, the position optimally chosen from the travel limit of the piston 50 to preserve the desired air buffer 105. When the pipette 10 is in the pipette mode, as indicated by the step 302 (FIG. 5C), the pickup volume $V_1$ is displayed in the LCD 260, as indicated by the numeral 303. Initially, the volume $V_1$ is the default value-set during the calibration process shown in FIGS. 5A–5D, which is the nominal fullscale volume of the attached displacement assembly 14. The user can change the volume $V_1$ to a desired volume by keying a number on the keyboard 255, as indicated by the numerals 311 and 305. Any number entered is assumed to be a new volume. The new volume flashes in the LCD 260. When the desired volume is flashing, the user depresses "E" (enter), as indicated by the numeral 304, and the new volume $V_1$ is stored. If an entry is out of range, an error message appears, a beep sounds, and the entry continues to flash until a valid volume is entered.

Intake movement occurs in response to pulling the trigger 230, as indicated by the numeral 138, with initial movement being undertaken to provide the requisite offset dependent upon the volume to be drawn, as indicated by the numeral 140, for the beginning movement of liquid into the tip 22. Movement of the piston 50 continues, as indicated by the step 140, and the particular programmed volume to be drawn into the tip 22 occurs.

After the trigger 230 is released, as indicated by the numeral 142, and movement of the piston 50 has ceased, the pipette 10 is moved to the discharge location. At this location, in response to pulling the trigger 230, as indicated by the numeral 144, an initial movement occurs providing the offset required for liquid movement to the point of discharge, as indicated by the numeral 146. Additional movement for the discharge of the called for pipetted amount causes the contained volume to be discharged, as indicated by the step 146. Assuming that a mixing mode is not enabled, as indicated by the numeral 147, and total discharge is desired, this movement is followed by a programmed pause in the operation of the pipette 10, as indicated by the numeral 150. During this programmed pause, for example, one second, liquid within the tip 22 drips to a discharge position at or near the end and accumulates. Upon completion of this accumulation, movement of the piston 50 past the home position occurs, as indicated by the numeral 152. A complete blowout of the pipetted contents results. The piston 50 remains in the blowout position for at least a predetermined time, for example, one second, as indicated by the numeral 151, or until the trigger 230 is released, as indicated by the numeral 153. Thereafter, the piston 50 is returned to the home position, as indicated by the numeral 154.

Considered in more detail, initially the "PICK-UP" annunciator is on, indicating that the pipette 10 is ready for a pickup/dispense cycle. When the trigger 230 is pulled, the piston 50 moves up the specified amount. At the end of the stroke, the "PICKUP" annunciator goes off, the "DISPENSE" annunciator goes on, and the pipette 10 beeps. With the next pull of the trigger 230, the piston 50 moves down to expel the liquid. At the bottom of the stroke, the pipette 10 pauses for one second, then moves down to blow out any remaining liquid in the tip 22. The piston 50 can pause for a minimum of one second at the bottom of the blowout stroke before returning to the home position. This pause can preferably be extended by holding the trigger 230 down, in which case the piston 50 does not return to the home position until the trigger is released.

Figure 9A:
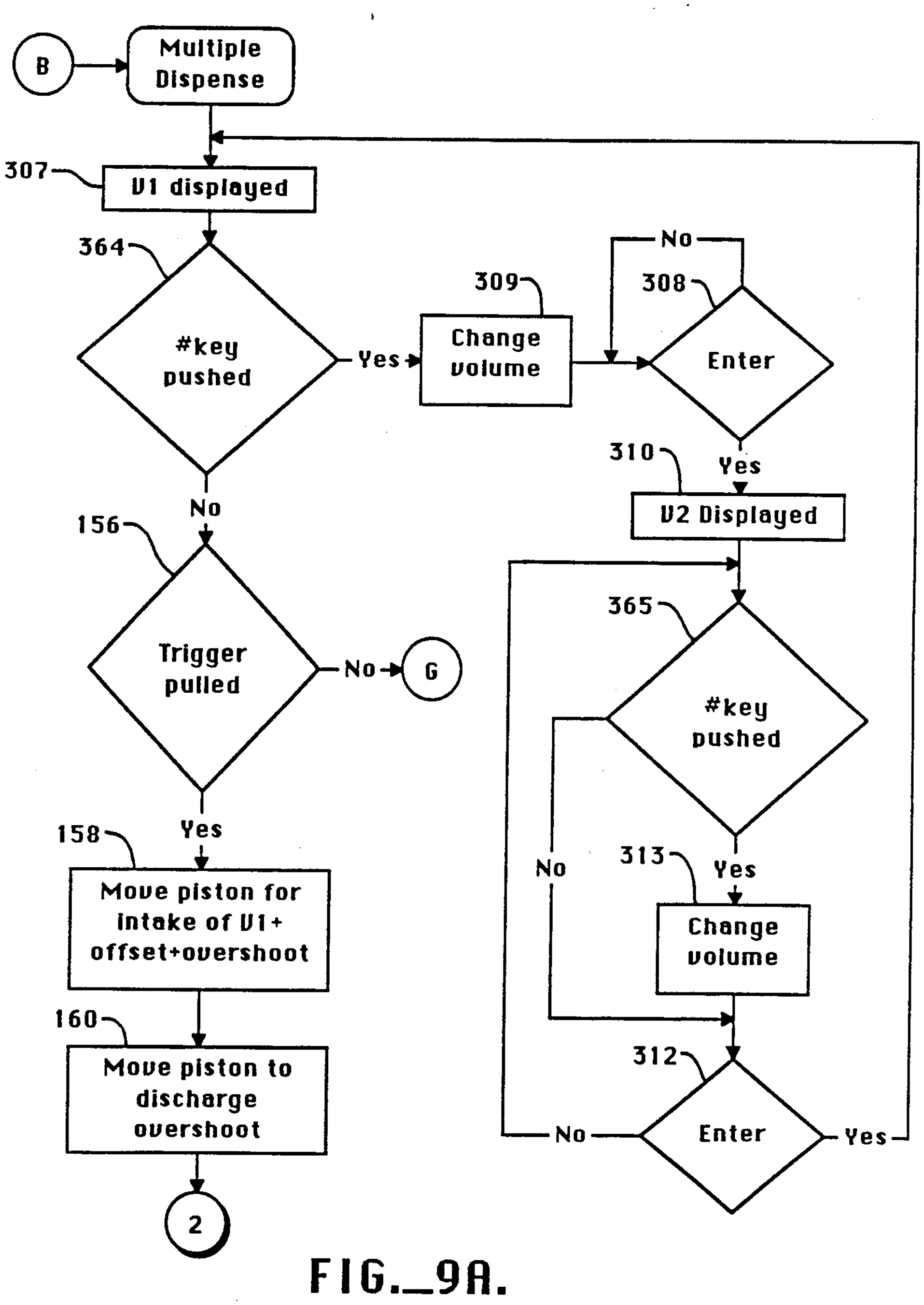
FIGS. 9A–9C, taken together illustrate a method for multiple dispensing in accordance with the invention.
Figure 9B:
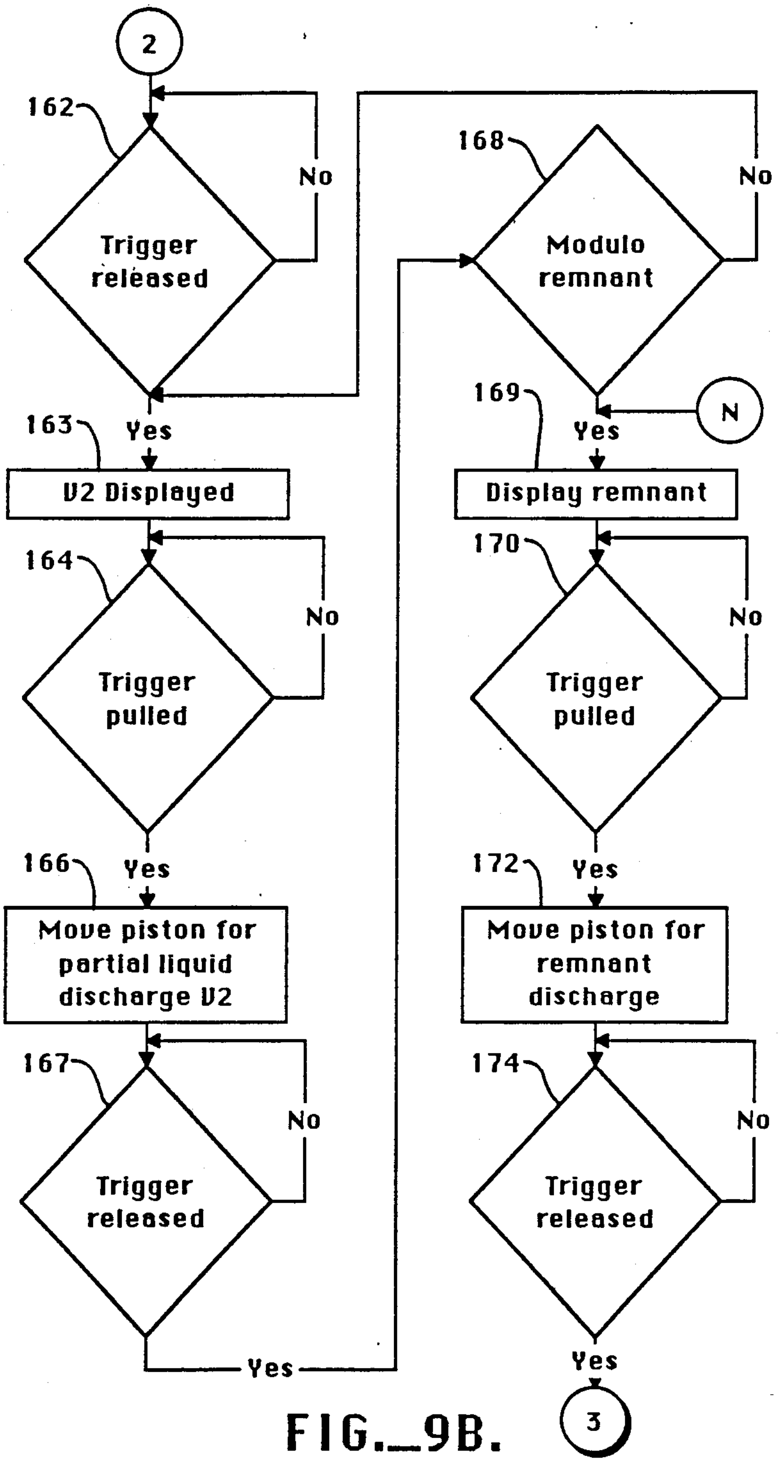
Figure 9C:
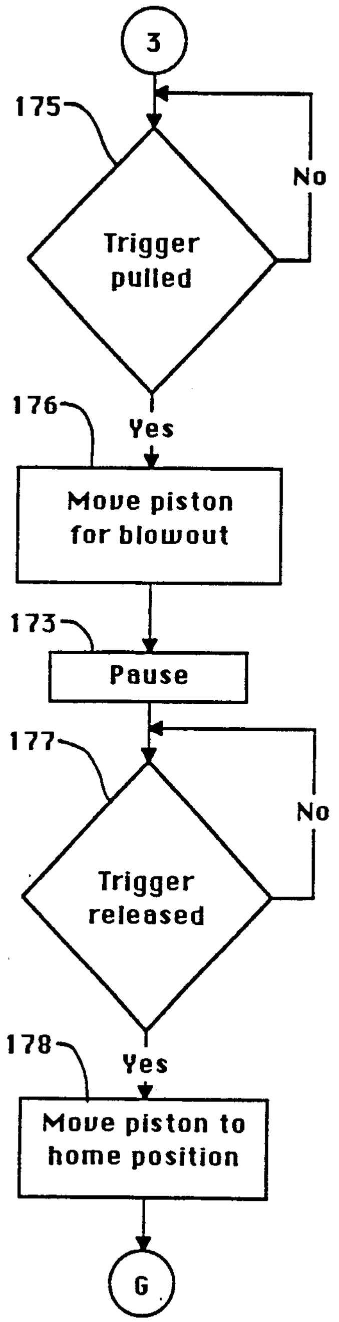

A multiple dispense mode is additionally provided in accordance with the invention, as shown in FIGS. 9A–9C taken together. When the user enters the sequence "F,2", the pipette 10 enters the multiple dispense mode, as determined by the step 306 (FIG. 5C), and the "MULTI" annunciator is displayed. The pickup volume $V_1$ is displayed in the LCD 260, as indicated by the numeral 307. Initially, the volume $V_1$ is the default value set during the calibration process shown in FIGS. 5A-5D, which is the nominal full-scale volume of the attached displacement assembly 14. The user can change the pickup volume $V_1$ to a lesser desired volume by keying a number on the keyboard 255, as indicated by the numerals 364 and 309. Any number entered is assumed to be a new volume. The new volume $V_1$ flashes in the LCD 260. When the desired volume is flashing, the user depresses "E", as determined by the step 308, and the new volume $V_1$ is stored. If a entry is out of range, an error message appears, a beep sounds, and the entry continues to flash until a valid volume is entered.

The aliquot volume $V_2$ to be repetitively dispensed is then displayed in the LCD 260, as indicated by the numeral 310. Initially, the volume $V_2$ is the default value set during the calibration process shown in FIGS. 5A-5D, which is one percent of the nominal full-scale volume of the attached displacement assembly 14. This volume $V_2$ flashes in the LCD 260. The user can enter the default value, as indicated by the numeral 312, by depressing the "E" key. Alternatively the user can change the volume $V_2$ to a desired volume by keying a number on the keyboard 255, as indicated by the numerals 365 and 313. Any number entered is assumed to be a new volume. The new volume $V_2$ flashes in the LCD 260. When the desired volume is flashing the user depresses "E", as indicated by the step 312, and the new volume $V_2$ is stored. If an entry is out of range, an error message appears, a beep sounds, and the entry continues to flash until a valid volume s entered.

Thereafter, the pickup volume $V_1$ is displayed, as indicated by the step 307. Upon pulling the trigger 230, as indicated by the numeral 156, an initial draw of the liquid to be pipetted occurs, as indicated by the numeral 158, including movement to provide the requisite offset for the beginning movement of liquid into the tip 22. Also, when liquid is initially taken into the tip 22, there is an overshoot so that a volume in excess of the volume $V_1$ needed is taken into the tip, as indicated by the step 158. Thereafter, at the completion of the initial liquid intake, a small amount of discharge occurs, as indicated by the numeral 160, which leaves the desired pickup volume $V_1$. This small amount of discharge neutralizes the air buffer spring force and neutralizes surface tension.

Upon release of the trigger 230, as indicated by the numeral 162, and withdrawal of the pipette 10 from the intake reservoir the instrument is fully readied for liquid discharge. The aliquot volume $V_2$ is then displayed, as indicated by the numeral 163. Thereafter, and when the pipette 10 is moved to a discharge location, a subsequent pulling of the trigger 230, as indicated by the numeral 164, causes the discharge of the initial aliquot volume $V_2$ of the called for multiple pipetted amount, as indicated by the numeral 166. When the user releases the trigger 230, as indicated by the numeral 167, a determination is made whether or not a final discharge volume, or modulo remnant, remains, as indicated by the numeral 168. The volume $V_2$ continues to be discharged every time that the trigger 230 is pulled until a modulo remnant remains, as indicated by the steps 163, 164, 166, 167, and 168.

When only the modulo remnant remains, as indicated by the step 168, the modulo amount is displayed, as indicated by the numeral 169. Thereafter, the modulo remnant is discharged upon the next pull of the trigger 230, as indicated by the numerals 170 and 172.

The user releases the trigger 230 after the modulo remnant is discharged, as indicated by the numeral 174. Subsequent actuation of the trigger 230 by the user, as indicated by the numeral 175, initiates a blowout cycle during which the piston 50 moves past the home position, as indicated by the numeral 176. After a predetermined time, as indicated by the numeral 173, and upon release of the trigger 230, as indicated by the numeral 177, the piston 50 is returned to the home position, as indicated by the numeral 178.

Considered in more detail, initially the "MULTI", "PICKUP", and "$V_1$" annunciators are on indicating that the pipette 10 is ready to pick up the volume $V_1$ of liquid. When the trigger 230 is pulled, the piston 50 moves up the specified distance. At the end of the pickup stroke, the pipette 10 beeps, turns off the "PICKUP" and "$V_1$" annunciators, turns on the "MULTI", "DISPENSE", and "$V_2$" annunciators, and displays the aliquot volume $V_2$. When the trigger 230 is pulled, the pipette 10 dispenses the displayed aliquot volume $V_2$. This volume is dispensed with each trigger pull, until just before the final dispense. At the end of the next to last dispense, the pipette 10 beeps, turns off the "$V_2$" annunciator, and displays the amount of liquid remaining in the tip 22. This happens even if the amount remaining is equal to the specified aliquot volume $V_2$. This is because the accuracy of the final volume is not certain. Preferably, if the dispense volume $V_2$ exactly equals the pickup volume, the pipette 10 beeps twice at the end of the pickup stroke, once to indicate the end of the pickup, and once to indicate that the last volume is about to be dispensed. At the end of the final dispense, the pipette 10 beeps again and turns off the "DISPENSE" annunciator. After the next pull of the trigger 230, the pipette 10 executes a blowout cycle, as described above.

Figure 17A:
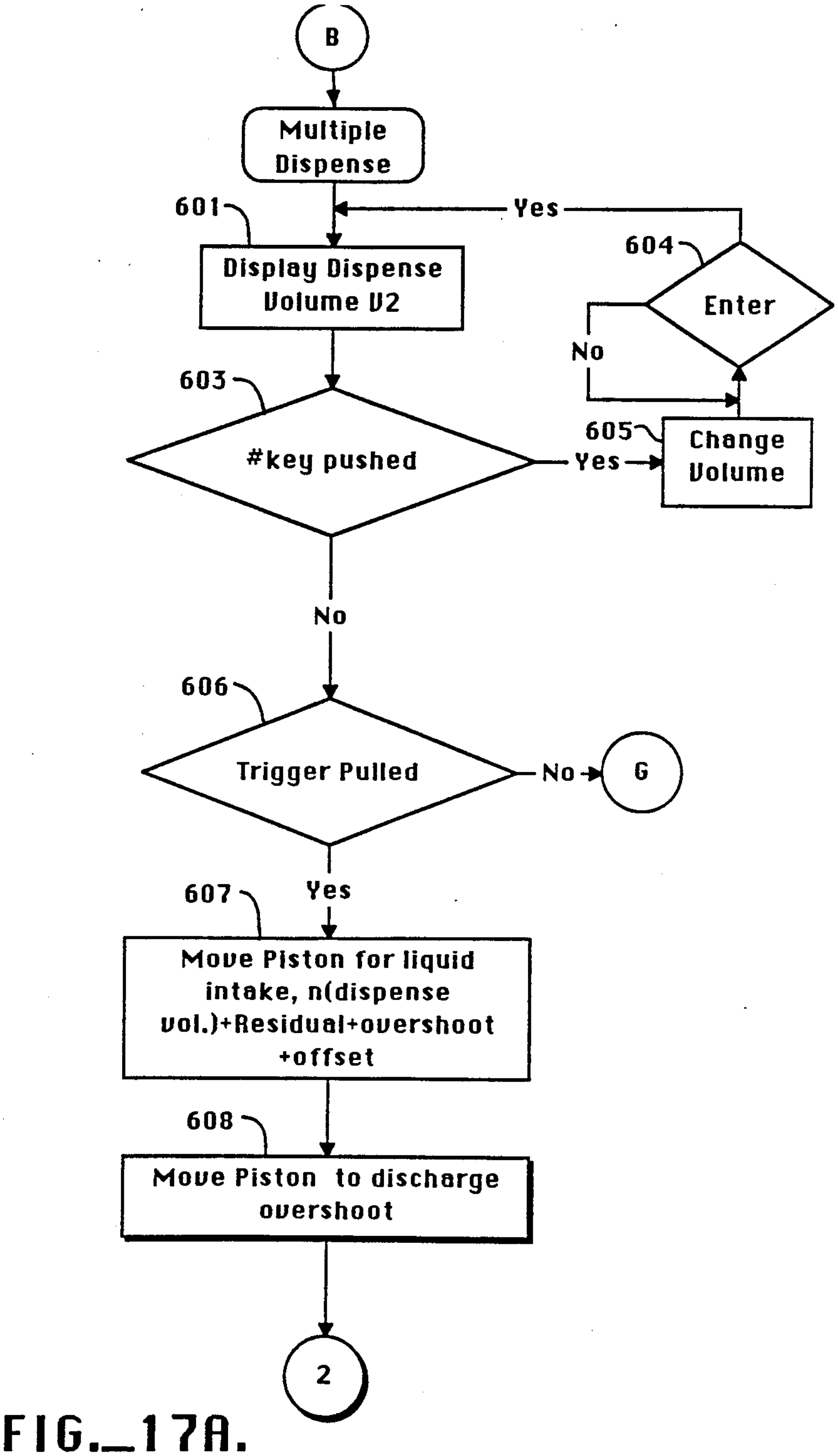
Figure 17B:
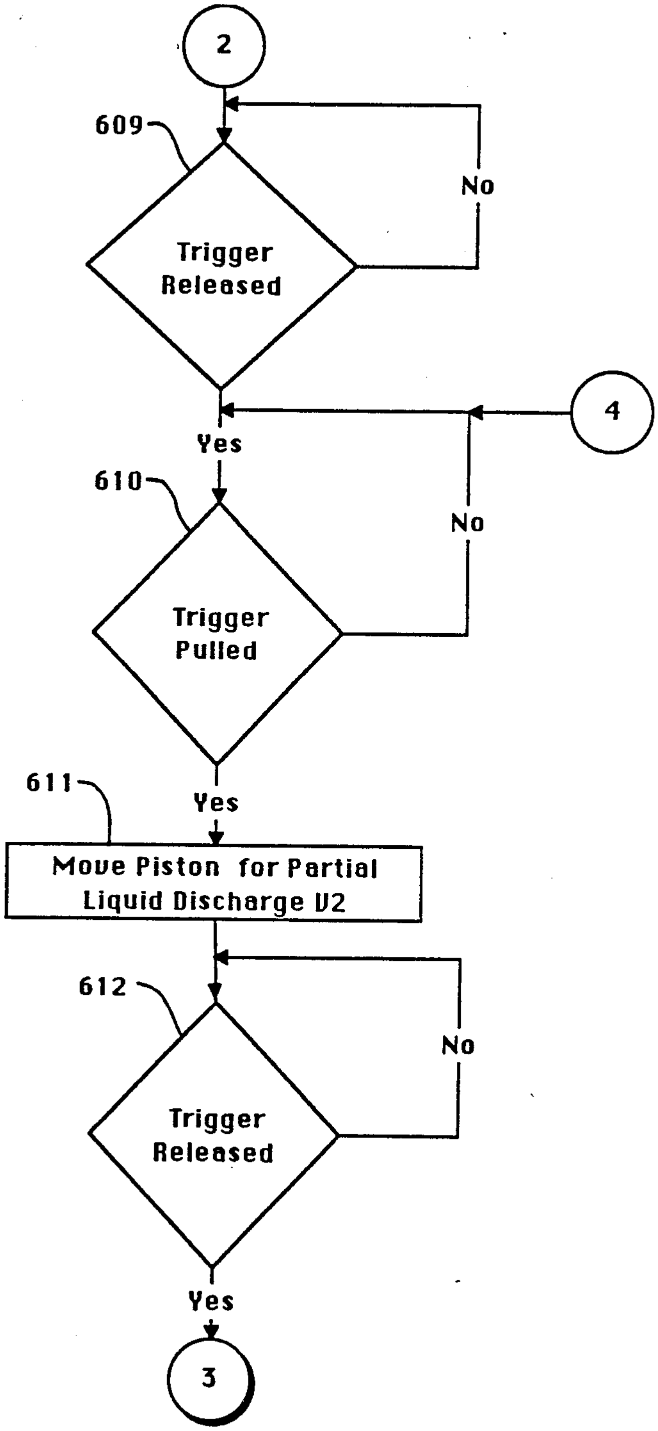
Figure 17C:
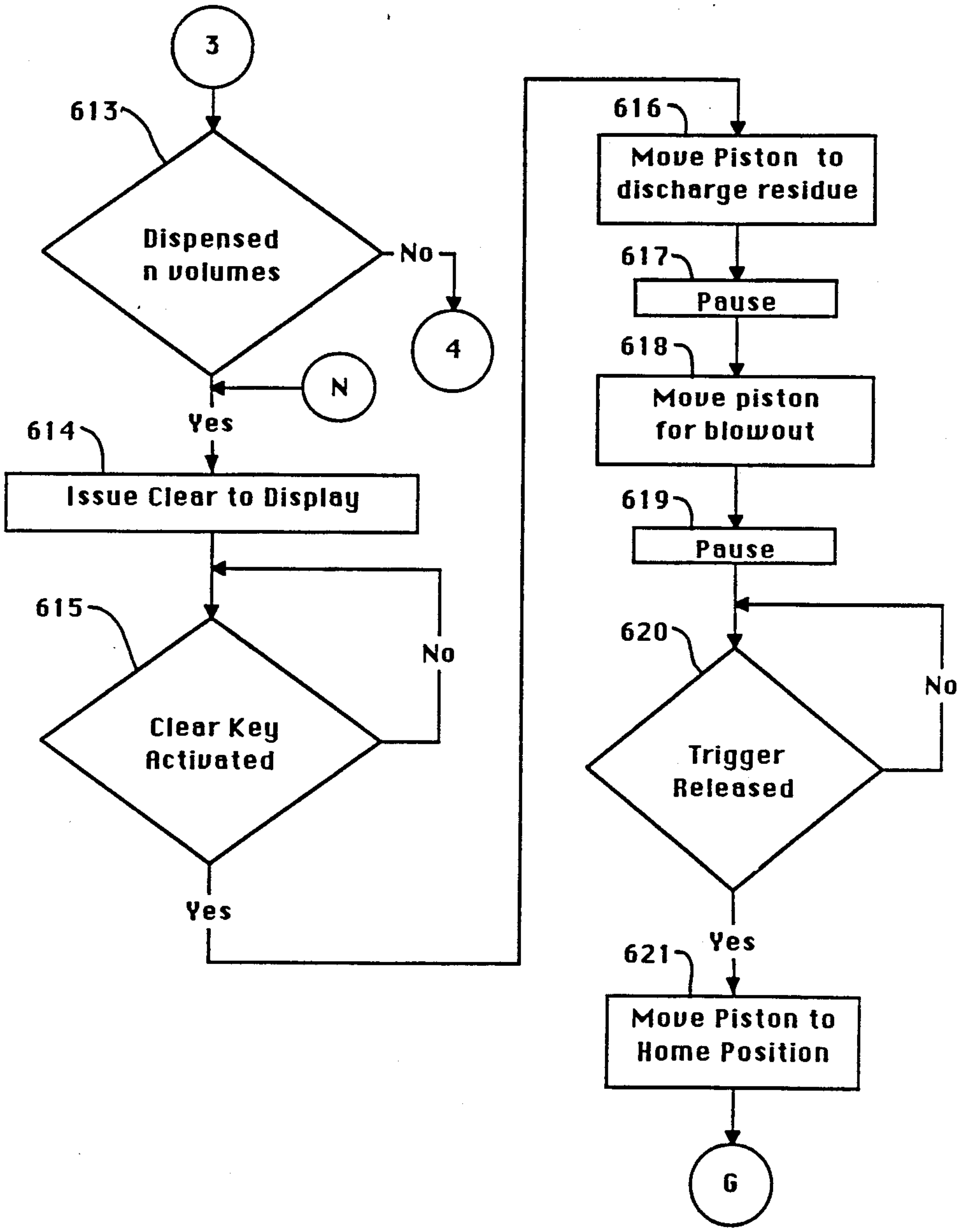

A modified multiple dispense mode is shown in FIGS. 17A-17C taken together. The pickup volume $V_1$ is not displayed, but the aliquot volume $V_2$ is displayed, as indicated by the numeral 601. Initially, the default value for the volume $V_2$ is the nominal full-scale volume of the attached displacement assembly 14, set during the calibration process shown in FIGS. 5A-5D. The user can change this volume to a lesser desired value by keying a number on the keyboard 255, as indicated by the numerals 603 and 605. Any number entered is assumed to be a new volume The new volume $V_2$ flashes in the LCD 260. When the desired volume is flashing, the user depresses "E", as indicated by the numeral 604, and the new volume $V_2$ is stored. If the entry exceeds the nominal full scale volume range, an error message appears, a beep sounds, and the entry continues to flash until a valid volume is entered.

After the desired aliquot volume $V_2$ is stored, the user actuates the trigger 230, as indicated by the numeral 606. The microprocessor circuit 220 (FIG. 3B) then determines a maximum integer n of aliquots having a volume $V_2$ which, when added to a fixed residual volume $V_{res}$, dependent upon the given nominal full scale volume range, is less than or equal to the nominal full-scale volume range plus $V_{res}$. This determines the pickup volume $V_1$. Stated differently, Pickup Volume $V_1=(n)(V_2)+V_{res}$, where $V_{res}$ equals a fixed residual volume (per range), and n is the maximum integer value such that Pickup Volume $V_1 \leqq$ nominal full-scale range $+ V_{res}$.

Upon pulling the trigger 230, as indicated by the step 606, an initial draw of the liquid to be pipetted also occurs, as indicated by the numeral 607, including movement to provide the requisite offset for the beginning movement of liquid into the tip 22. Also, when liquid is initially drawn into the tip 22, there is an overstroke so that a volume in excess of the pickup volume $V_1$ (i.e., $(n)(V_2)+V_{res}$) needed is taken into the tip 22, as indicated by the step 607. Thereafter, at the completion of the initial liquid intake, a small amount of discharge occurs, as indicated by the numeral 608, which leaves the desired pickup volume $V_1$. This small amount of discharge neutralizes the air buffer spring force and neutralizes surface tension. Upon release of the trigger 230, as indicated by the numeral 607, and withdrawal of the pipette 10 from the intake reservoir, the instrument is fully readied for liquid discharge.

Thereafter, and when the pipette 10 is moved to a discharge location, a subsequent pulling of the trigger 230, as indicated by the numeral 610, causes discharge of the initial aliquot volume $V_2$ of the called for pipetted amount, as indicated by the numeral 611. When the user releases the trigger 230, as indicated by the numeral 612, a determination is made whether or not n aliquots have been dispensed, as indicated by the numeral 613. The aliquot volume $V_2$ continues to be discharged every time that the trigger 230 is pulled until n aliquots have been dispensed, as indicated by the steps 610, 611, 612, and 613.

The fixed residual volume $V_{res}$ provides a defined amount of liquid to compensate for cumulative error due to air expansion as the air above the liquid in the tip 22 warms while the n aliquots are dispensed. This assures that the volume of the nth aliquot is as accurate as the first.

When n aliquots have been dispensed, as indicated by the step 613 "CLEAR" is displayed in the LCD 260, as indicated by the numeral 614. In response, the user transports the pipette 10 to the intake reservoir or to a disposal site. Thereafter, entry by the user of "F,O", or, alternatively, "0" on the keyboard 255 is determined, as indicated by the numeral 615 and the fixed residual volume $V_{res}$ is dispensed, as indicated by the numeral 616. After a predetermined time, as indicated by the numeral 617, a blowout cycle is executed, as indicated by the numeral 618, during which the piston 50 moves past the home position. After a predetermined time as indicated by the numeral 619, and upon release of the trigger 230, as indicated by the step 620, the piston 50 is returned to the home position, as indicated by the numeral 621.

Figure 10A:
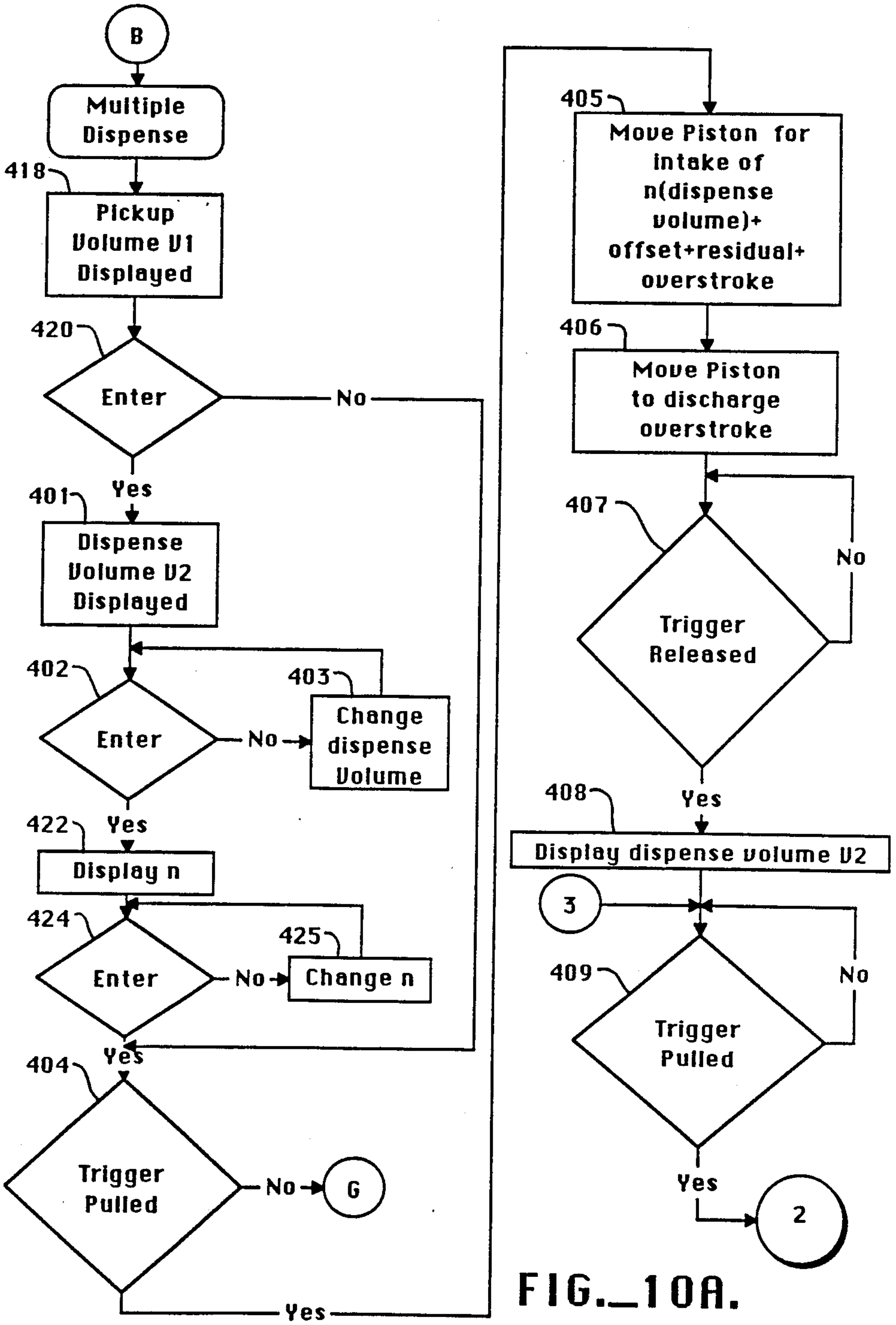
FIGS. 10A–10B taken together, and FIGS. 17A–17C taken together, illustrate modified multiple dispensing methods in accordance with the invention.

In accordance with another modification of the multiple dispense mode, the integer n can be set by the user, The multiple dispense mode starts with the pickup volume $V_1$ appearing in the LCD 260, as indicated by the numeral 418, shown in FIG. 10. An enter ("E") causes the display to shift to the aliquot volume $V_2$, as indicated by the numerals 420 and 401. At this point, a new aliquot volume $V_2$ can be entered, as indicated by the numerals 402 and 403. When an aliquot volume $V_2$ is entered, the microprocessor circuit 220 (FIG. 3B) calculates:

Pickup Volume $V_1=(n)(V_2)+V_{res}$, where $V_{res}$ equals a fixed residual volume (per range), and n is the maximum integer value such that Pickup Volume $V_1 \leqq$ nominal full-scale range $+ V_{res}$.

A flashing n is then displayed in the LCD 260, as indicated by the numeral 422. This integer n can be entered by depressing the "E" key, as indicated by the numeral 424, or decreased by entering a smaller integer on the keyboard 255 followed by depressing the "E" key, as indicated by the numeral 425 and the step 424, respectively. The user can modify n to assure it is small enough so that the initially displayed pickup volume $V_1$ does not exceed the observed amount of liquid remaining in the liquid reservoir. After a valid $n_{new}$ is entered, the pipette 10 displays in the LCD 260 and is ready to pick up according to:

Pickup Volume $V_{1new}=(n_{new})(V_2)+V_{res}$.

Upon pulling the trigger 230, as indicated by the numeral 404, the pipette 10 picks up its calculated pickup volume $V_1$, and the piston 50 overshoots and returns to its proper pickup, indicated by the numerals 405 and 406. This assures that the first aliquot dispensed is accurate.

Upon release of the trigger 230, as indicated by the numeral 607, and withdrawal of the pipette 10 from the intake reservoir, the instrument is fully readied for liquid discharge.

Thereafter, and when the pipette 10 is moved to a discharge location, a subsequent pulling of the trigger 230, as indicated by the numeral 610, causes discharge of the initial aliquot volume $V_2$ of the called for pipetted amount, as indicated by the numeral 611. When the user releases the trigger 230, as indicated by the numeral 612, a determination is made whether or not n aliquots have been dispensed, as indicated by the numeral 613. The aliquot volume $V_2$ continues to be discharged every time that the trigger 230 is pulled until n aliquots have been dispensed, as indicated by the steps 610, 611, 612, and 613.

When n aliquots have been dispensed, as indicated by the step 613, "CLEAR" is displayed in the LCD 260, as indicated by the numeral 614. In response, the user transports the pipette 10 to the intake reservoir or to a disposal site. Thereafter, entry by the user of "F,0", or, alternatively, "0" on the keyboard 255 is determined, as indicated by the numeral 615, and the fixed residual volume $V_{res}$ is dispensed, as indicated by the numeral 616. After a predetermined time, as indicated by the numeral 617, a blowout cycle is executed, as indicated by the numeral 618, during which the piston 50 moves past the home position. After a predetermined time, as indicated by the numeral 619, and upon release of the trigger 230, as indicated by the step 620, the piston 50 is returned to the home position, as indicated by the numeral 621.

Figure 11A:
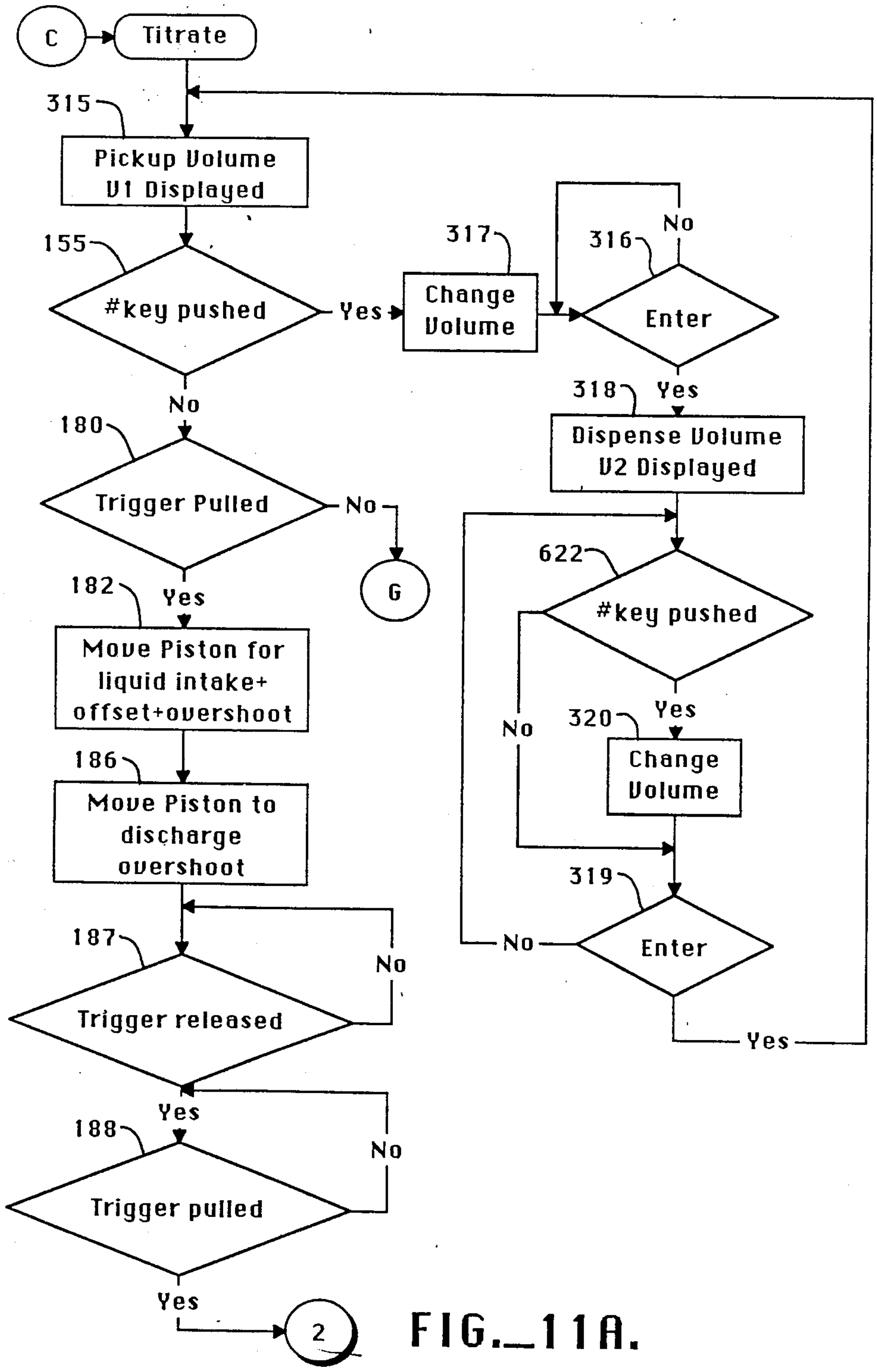
FIGS. 11A–11C, taken together illustrate a method for titrating in accordance with the invention.
Figure 11B:
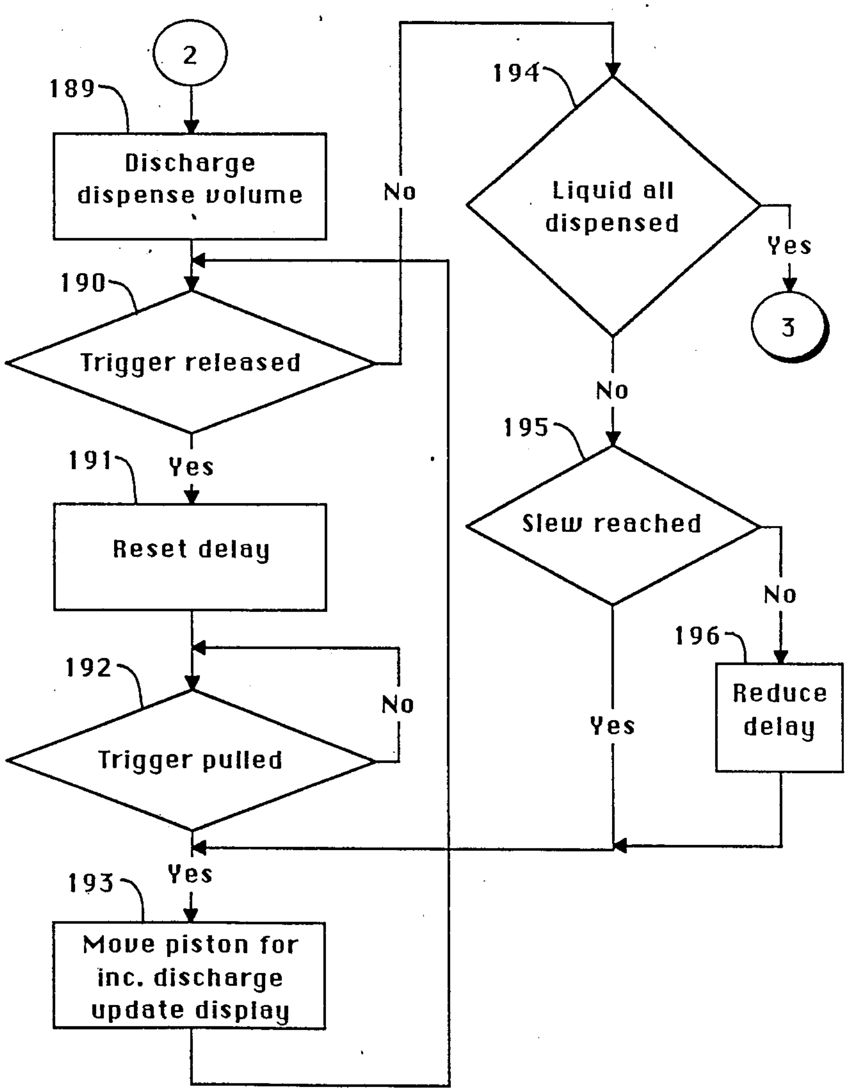
Figure 11C:
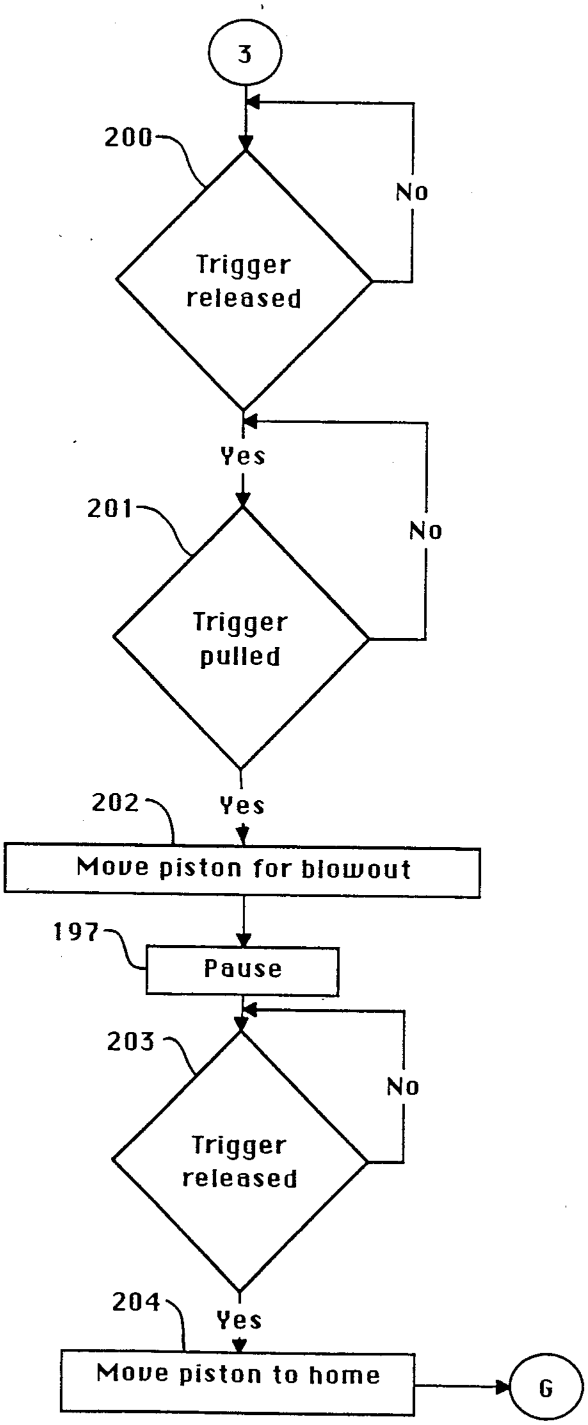

In accordance with the invention, a titrate mode is also provided, as shown in FIGS. 11A-11C taken together. When the user enters the sequence "F,3", the pipette 10 enters the titrate mode, as determined by the step 314 (FIG. 5C), and the "TIRATE" annunciator is displayed. The pickup volume $V_1$ is displayed in the LCD 260, as indicated by the numeral 315. Initially, the volume $V_1$ is the default value set during the calibration process shown in FIGS. 5A-5D, which is the nominal full-scale volume of the attached displacement assembly 14. The user can change the pickup volume $V_1$ to a lesser desired volume by keying a number on the keyboard 255, as indicated by the numerals 155 and 317. Any number entered is assumed to be a new volume. The new volume $V_1$ flashes in the LCD 260. When the desired volume is flashing, the user depresses "E", as indicated by the step 316, and the new volume $V_1$ is stored. If the entry is out of range, an error message appears, a beep sounds, and the entry continues to flash until a valid volume is entered.

Once the pickup volume $V_1$ is set, an initial dispense volume $V_2$ is then displayed in the LCD 260, as indicated by the numeral 318. Initially, the volume $V_2$ is the default value set during the calibration process shown in FIGS. 5A-5D, which is zero. This volume $V_2$ flashes in the LCD 260. The user can enter the default value, as indicated by the numeral 319, by depressing the "E" key. Alternatively, the user can change the initial dispense volume $V_2$ to a desired volume by keying a number on the keyboard 255, as indicated by the numerals 622 and 320. Any number entered is assumed to be a new volume. The new volume $V_2$ flashes in the LCD 260, When the desired volume is flashing, the user depresses "E", as indicated by the step 319, and the new volume $V_2$ is stored. If an entry is out of range, an error message appears, a beep sounds, and the entry continues to flash until a valid volume is entered.

Upon pulling the trigger 230, as indicated by the numeral 180, an initial draw of the pickup volume $V_1$ occurs, as indicated by the numeral 182, including movement to provide the requisite offset for the beginning movement of liquid into the tip 22. Also when liquid is initially taken into the pipette 10, there is an overstroke so that a volume in excess of the volume $V_1$ is taken into the tip 22, as indicated by the step 182. Thereafter, at the completion of the initial liquid intake, a small amount of discharge occurs, as indicated by the numeral 186, which leaves the desired pickup volume $V_1$. This small amount of discharge neutralizes the air buffer spring force and neutralizes surface tension.

Upon release of the trigger 230, as indicated by the numeral 187, and withdrawal of the pipette 10 from the intake reservoir, the instrument is fully readied for liquid discharge. Then, at the discharge location, the trigger 230 is pulled, as indicated by the numeral 188, and the initial dispense volume $V_2$ of titrating liquid is discharged, as indicated by the numeral 189. When the user releases the trigger 230, as indicated by the numeral 190, a dispense delay interval is reset, as indicated by the numeral 191. Thereafter, when the user pulls the trigger 230, as indicated by the numeral 192, titrating liquid is incrementally discharged with the time interval between discharged increments preferably being gradually decreased to provide an overall accelerated flow, as indicated by the numerals 193, 190, 194, 195, and 196. During the entire dispense cycle, the LCD 260 displays the total volume dispensed. At any point, entry of "F,0" causes the pipette 10 to execute a blowout cycle and return the piston 50 to the home position. These increments of discharge cease their accelerating flow upon reaching a pipette speed determined by a speed select function, as determined by the step 195. Releasing the trigger 230, as determined by the step 190, causes titration to stop, and the dispense delay interval is reset, as indicated by the step 191. Upon repulling the trigger 230, the described acceleration begins anew. Dispensing can continue until complete discharge occurs, as determined by the step 194.

After the entire pickup volume $V_1$ has been totally dispensed, as determined by the step 194, the pipette 10 beeps, and then stops. When the trigger 230 is released and then repulled, as indicated by the numerals 200 and 201, respectively, blowout of the remaining contents is performed, as indicated by the numeral 202, After a predetermined time, as indicated by the numeral 197, and upon release of the trigger 230, as indicated by the numeral 203, the piston 50 is returned to the home position, as indicated by the numeral 204.

Considered in more detail, initially the "PICK-UP" and "$V_1$" annunciators are on, and the LCD 260 displays the pickup volume $V_1$. When the trigger 230 is pulled, the piston 50 draws the specified volume $V_1$. At the end of the pickup stroke, the pipette 10 beeps, turns off the "PICKUP" and "$V_1$" annunciators, turns on the "DISPENSE" annunciator, and displays "0".

At this point, the action depends on whether the second volume $V_2$ is zero or non-zero. If the volume $V_2$ is zero, both the "$V_1$" and "$V_2$" annunciators are off, and when the trigger 230 is pulled, the pipette 10 starts the titrate sequence. If the second volume $V_2$ is non-zero, the "$V_2$" annunciator turns on, indicating that there is an initial dispense volume. When the trigger 230 is pulled, the pipette 10 dispenses this amount. At the end of this dispense the "$V_2$" annunciator is turned off, the amount dispensed is displayed, and the pipette 10 waits for the trigger 230 to be pulled again. If the trigger 230 is held, the pipette 10 does not wait at the end of the dispense but proceeds directly to titration.

The titration sequence proceeds as follows. When the trigger 230 is pulled, the pipette 10 takes a few steps at a slow rate, then takes a few steps at a faster rate, and so on until the instrument is running at full titrate speed. After each step, the LCD 260 is updated to reflect the total volume of liquid dispensed. When the trigger 230 is released, the pipette 10 stops stepping. When the trigger 230 is pulled again, the cycle is repeated from the slow speed. Therefore, the user can modulate the speed of the pipette 10 by pulling and releasing the trigger 230. When the entire volume $V_1$ has been dispensed the pipette 10 beeps, turns off the "DISPENSE" annunciator, and waits for the user to release the trigger 230 and pull the trigger again. At this point the pipette 10 proceeds through the blowout cycle described above.

Figure 12A:
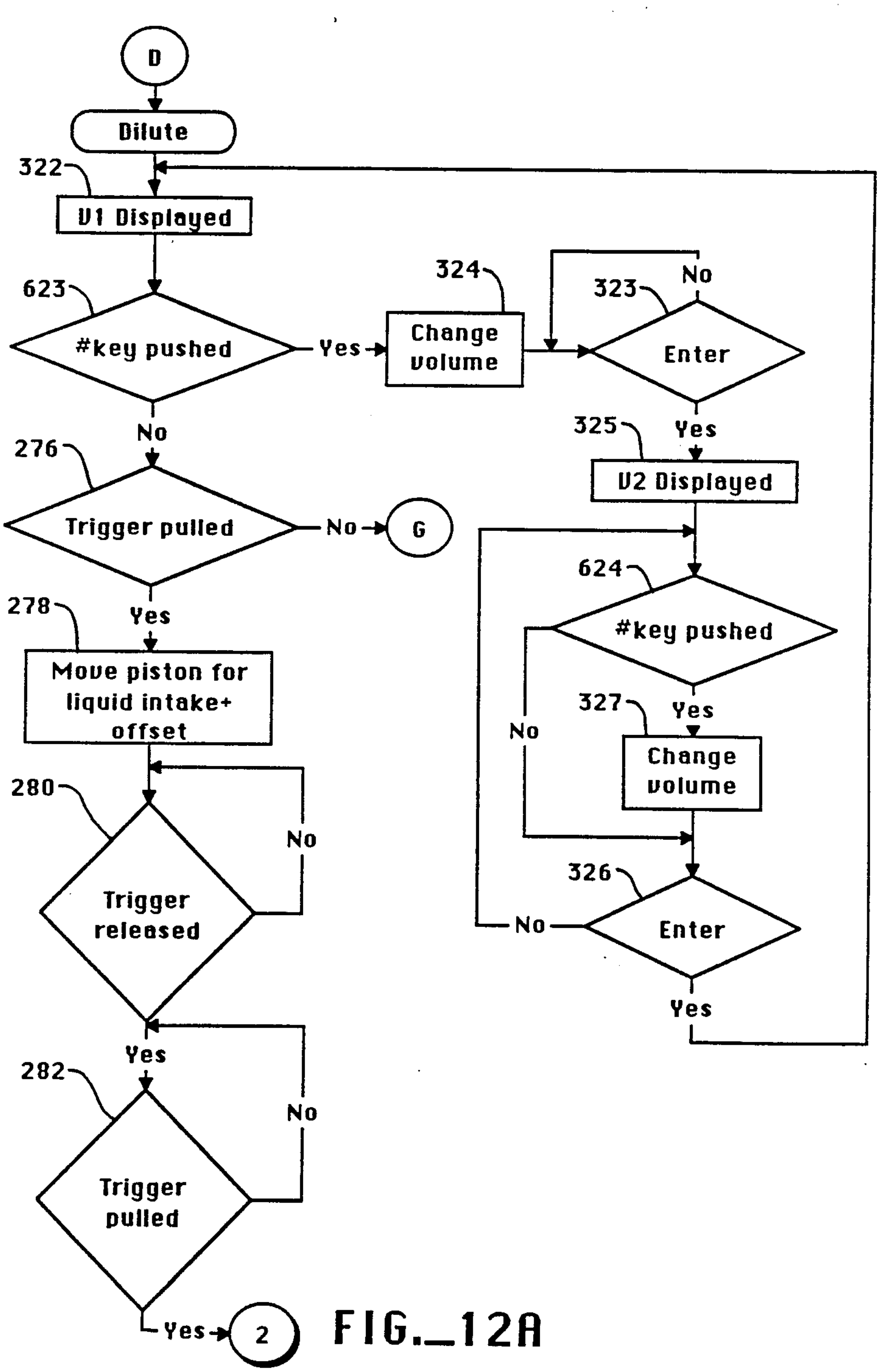
FIGS. 12A–12B, taken together illustrate a method for diluting in accordance with the invention.
Figure 12B:
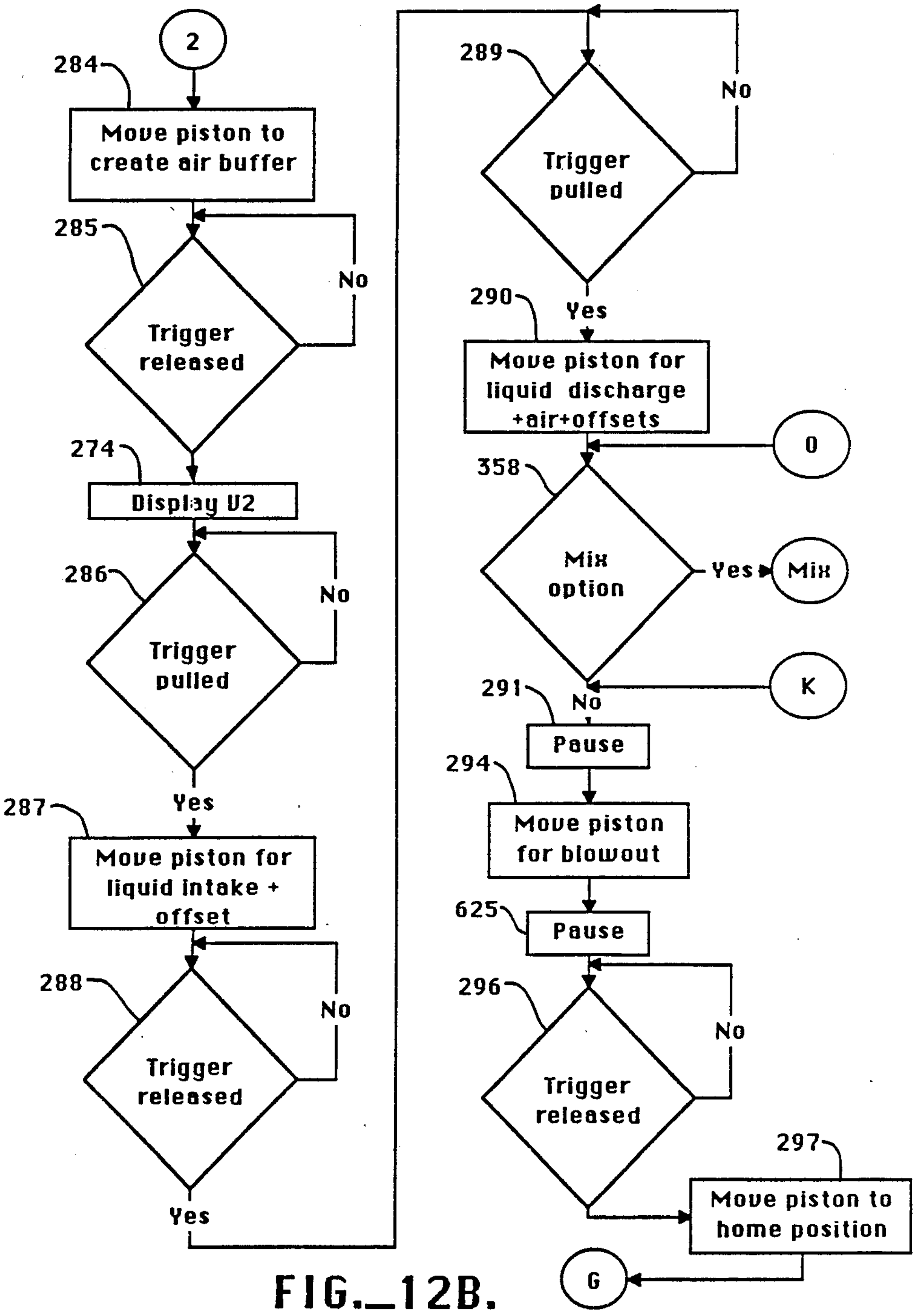

In accordance with the invention, a dilute mode is also provided, as shown in FIGS. 12A and 12B taken together. When the user enters the sequence "F,4", the pipette 10 enters the dilute mode, as determined by the step 321 (FIG. 5D), and the "DILUTE" annunciator is displayed. Two pickup volumes $V_1$ and $V_2$ (solvent and diluent) can be entered by means of the keyboard 255. The solvent pickup volume $V_1$ is displayed in the LCD 260, as indicated by the numeral 322. Initially, the volume $V_1$ is the default value set during the calibration process shown in FIG. 5A-5D, which is the nominal full-scale volume of the attached displacement assembly 14. The user can change the solvent pickup volume to a lesser desired volume by keying a number on the keyboard 255, as indicated by the numerals 623 and 324. Any number entered is assumed to be a new volume. The new volume $V_1$ flashes in the LCD 260. When the desired volume is flashing the user depresses "E", as indicated by the step 323, and the new volume $V_1$ is stored. If the entry is out of range, an error message appears, a beep sounds, and the entry continues to flash until a valid volume is entered.

Once the solvent pickup volume $V_1$ is set, a diluent pickup volume $V_2$ is then displayed in the LCD 260, as indicated by the numeral 325. Initially, the volume $V_2$ is the default value set during the calibration process shown in FIGS. 5A-5D, which is one percent of the nominal full-scale volume of the attached displacement assembly 14. This volume $V_2$ flashes in the LCD 260. The user can enter the default value, as indicated by the numeral 326, by depressing the "E" key. Alternatively, the user can change the diluent pickup volume $V_2$ to a desired volume by keying a number on the keyboard 255, as indicated by the numerals 624 and 327. Any number entered is assumed to be a new volume. The new volume $V_2$ flashes in the LCD 260. When the desired volume is flashing, the user depresses "E", as indicated by the step 326, and the new volume $V_2$ is stored. If an entry is out of range, an error message appears, a beep sounds, and the entry continues to flash until a valid volume is entered.

The sum of the solvent pickup volume $V_1$ plus the diluent pickup volume $V_2$ must be less than or equal to 101% of full scale. This allows dilutions of 100 to 1.

After the diluent pickup volume $V_2$ is set, as indicated by the step 326, the solvent pickup volume $V_1$ is displayed in the LCD 260, as indicated by the numeral 322. Upon pulling the trigger 230, as indicated by the numeral 276, an initial draw of the solvent volume $V_1$ occurs, as indicated by the numeral 278, including movement to provide the requisite offset for the beginning movement of solvent into the tip 22. Upon release of the trigger 230, as indicated by the numeral 280, and withdrawal of the tip 22 from the liquid, "Air" is displayed in the LCD 260, and the pipette 10 is ready for taking in air to create an air buffer or gap. The size of the air gap is preferably variable and is set dependent upon the full scale volume range of the attached displacement assembly 14. When the user again pulls the trigger 230, as indicated by the numeral 282, an air gap is placed within the tip 22, as indicated by the numeral 284. After the trigger 230 is released, as indicated by the numeral 285, the diluent pickup volume $V_2$ is displayed, as indicated by the numeral 274, and the tip 22 is immersed in the diluent to be taken in. Then the user pulls the trigger 230 again, and the diluent volume $V_2$ is taken in, as indicated by the numerals 286 and 287, respectively, including movement to provide the requisite offset for the beginning movement of diluent into the tip 22. After the trigger 230 is released, as indicated by the numeral 288, a beep sounds, and the total liquid volume (i.e., $V_1$ plus $V_2$) is displayed in the LCD 260. The liquids, separated by the air gap, are then transported to a discharge location. In response to pulling the trigger 230, as indicated by the numeral 289, the entire contents of the tip 22 are dispensed, as indicated by the numeral 290, including an initial movement providing an offset required for diluent movement to the point of discharge, and following expulsion of the air gap, a subsequent movement providing an offset required for solvent movement to the point of discharge. Assuming that the mixing mode is not enabled, as indicated by the numeral 358, a blowout cycle, as described above in connection with the pipette mode, then occurs, as indicated by the numerals 291, 294, 625, 296, and 297, corresponding to the respective steps 150, 152, 151, 153, and 154 (FIG. 8B).

Considered in more detail, initially the pipette 10 displays the solvent pickup volume $V_1$, and the "PICKUP" and "$V_1$" annunciators are on, indicating that the instrument is ready to pick up the first volume. When the trigger 230 is pulled, the piston 50 moves up the appropriate distance, beeps, turns off the "$V_1$" annunciator, and displays the message "Air", indicating that the instrument is ready for the air gap. When the trigger 230 is pulled, the piston 50 moves up the appropriate distance for the air gap, beeps, turns on the "$V_2$" annunciator, and displays the diluent pickup volume $V_2$. When the trigger 230 is pulled again, the pipette 10 picks up the volume $V_2$, beeps, turns off the "PICKUP" and "$V_2$" annunciators, turns on the "DISPENSE" annunciator, and displays the total volume (volume $V_1$ plus volume $V_2$). When the trigger 230 is pulled again, the pipette 10 proceeds through the dispense and blowout cycles described above.

Figure 13A:
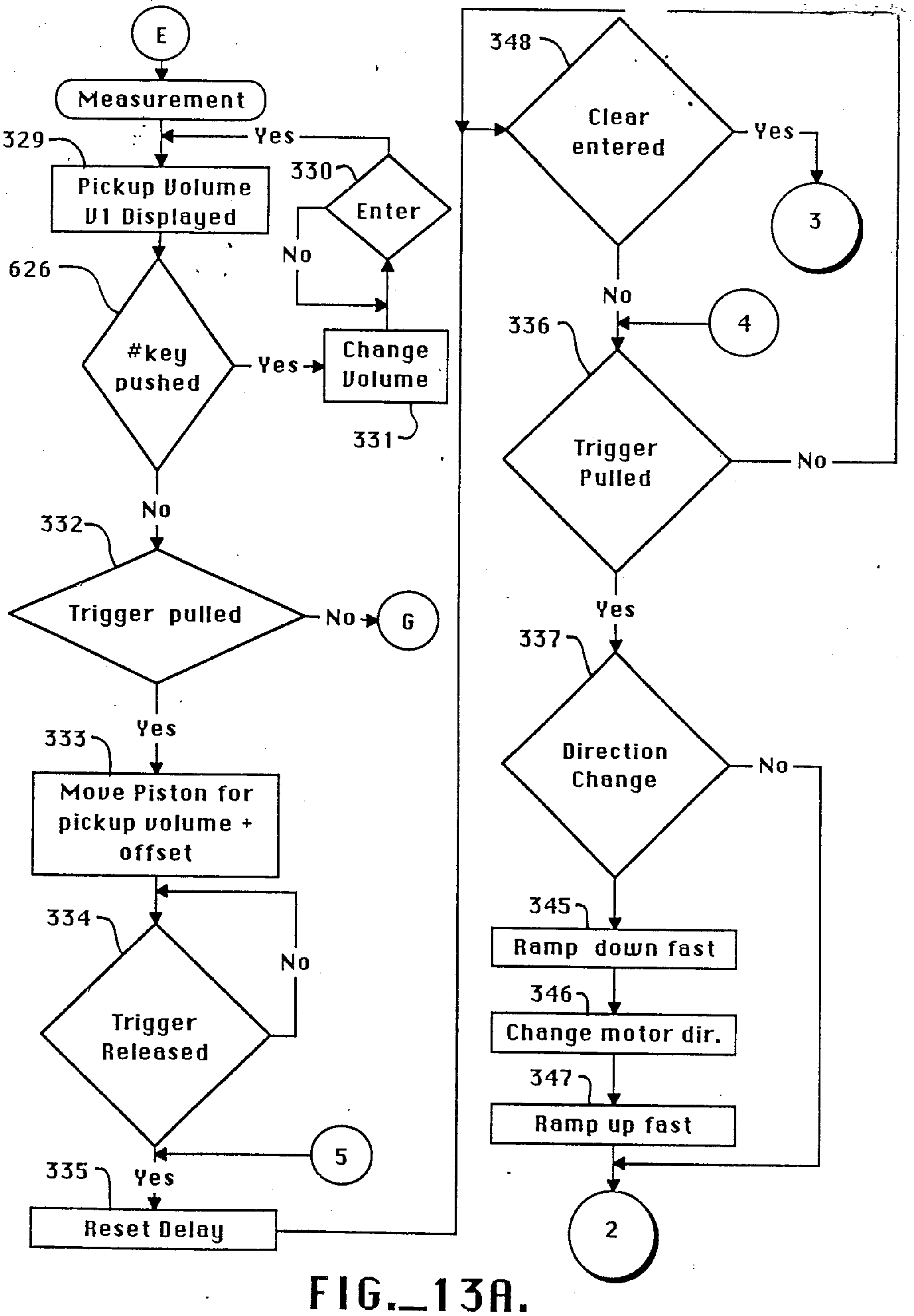
FIGS. 13A–13C, taken together illustrate a method for measuring in accordance with the invention.
Figure 13B:
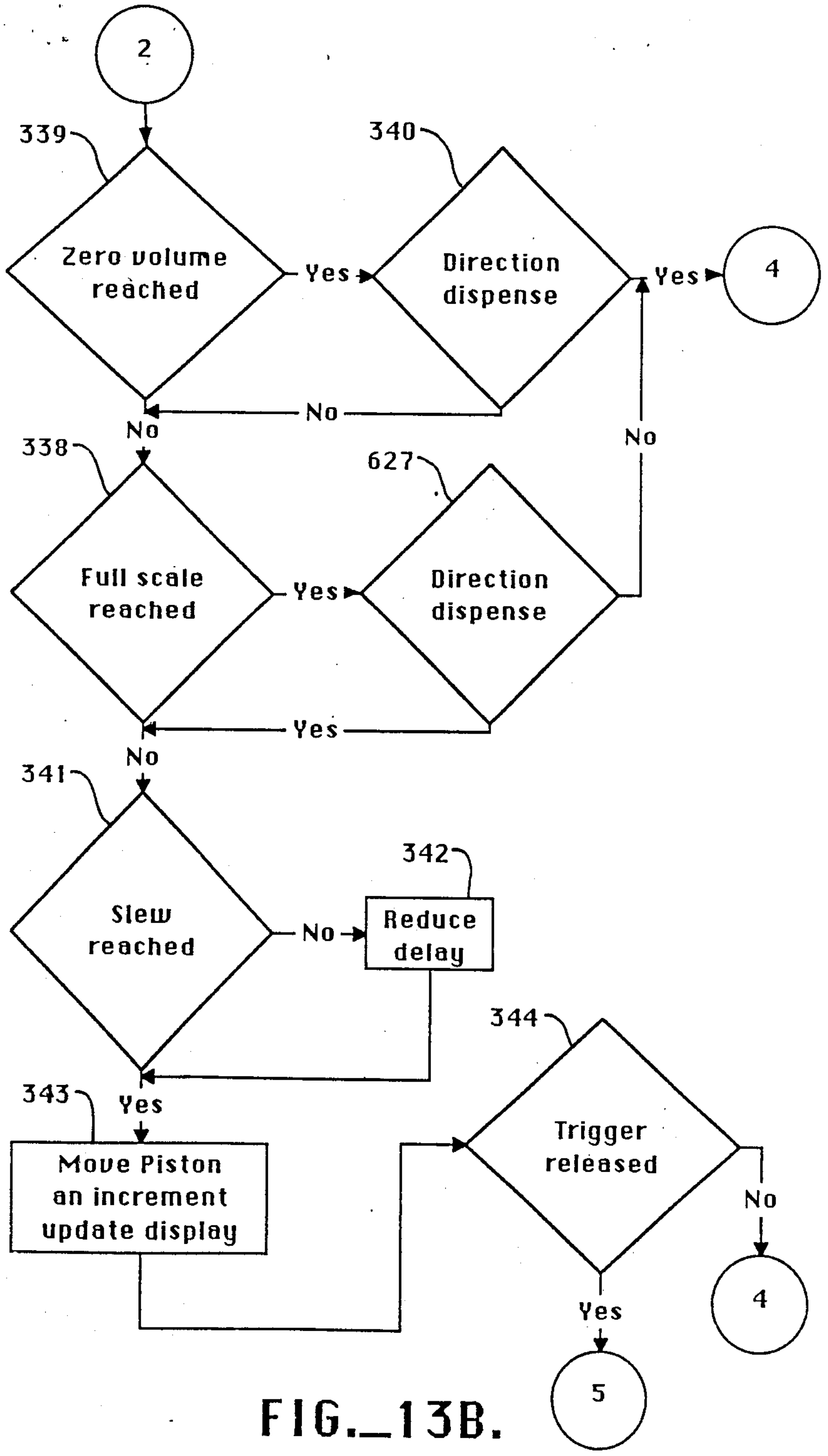
Figure 13C:
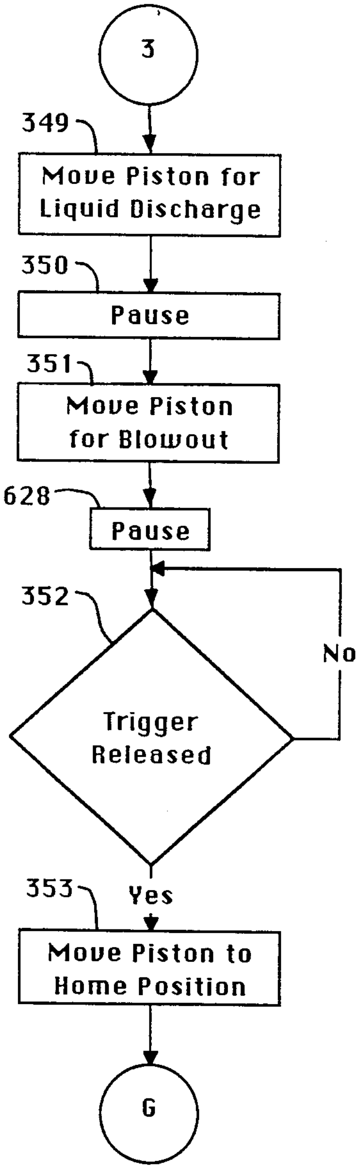

A measurement mode is also provided in accordance with the invention, as shown in FIGS. 13A–13C taken together. When the user enters the sequence "F,5", the pipette 10 enters the measurement mode, as determined by the step 328 (FIG. 5D), and the "MEASURE" annunciator is displayed in the LCD 260. The initial pickup volume $V_1$ is displayed in the LCD 260, as indicated by the numeral 329. Initially, the volume $V_1$ is the default value set during the calibration process shown in FIGS. 5A–5D, which is zero. The user can change the initial pickup volume $V_1$ to a greater desired value by keying a number on the keyboard 255, as indicated by the numerals 626 and 331. Any number entered is assumed to be a new volume. The new volume $V_1$ flashes in the LCD 260. When the desired volume is flashing, the user depresses "E", as determined by the step 330, and the new volume $V_1$ is stored. If an entry is out of range an error message appears, a beep sounds, and the entry continues to flash until a valid volume is entered.

Upon pulling the trigger 230, as indicated by the numeral 332, an initial draw of the liquid to be pipetted occurs, as indicated by the numeral 333, including movement to provide the requisite offset for the beginning movement of the initial pickup volume $V_1$ into the tip 22. Upon release of the trigger 230, as indicated by the numeral 334, a draw delay interval is reset, as indicated by the numeral 335, and the pipette 10 is fully readied for additional liquid intake. Thereafter, when the user pulls the trigger 230, as indicated by the numeral 336, liquid is incrementally drawn, with the time interval between drawn increments preferably being gradually decreased to provide an overall accelerated intake, as indicated by the numerals 337, 339, 338, 341, 342, 343, and 344. During the entire intake cycle, the LCD 260 displays the total volume drawn, as indicated by the step 343. These increments of intake cease their accelerating draw upon reaching a pipette speed determined by a speed select function, as determined by the step 341. Releasing the trigger 230, as determined by the step 344, causes intake to stop, and the intake delay interval is reset, as indicated by the step 335. Upon repulling the trigger 230, the described acceleration begins anew.

The user is responsible for not allowing an air bubble to interfere with the measured volume. If an air bubble is drawn into the tip 22, the user can depress the "0" key while the trigger 230 is activated to change direction, as determined by the step 337. The piston 50 decelerates quickly, changes direction, and accelerates quickly to the constant speed, as indicated by the numerals 345, 346, and 347, respectively, thereby pushing the air bubble out of the tip 22. Preferably, discharge of the air bubble concludes movement in the reverse direction. However, if reverse movement continues, liquid discharge occurs until the pipetted volume reaches zero, as determined by the step 339, whereupon the stepper motor 28 stops, a beep sounds, and only pickup as indicated by the step 340. Use of the "0" key is a momentary function, not a latching function. Once the "0" key is released, the direction change is not in effect. Therefore, release of the "0" key causes the piston 50 to decelerate quickly, reverse direction, and accelerate quickly to the constant speed (now picking up liquid). If at any time the trigger 230 is released, as determined by the step 344, the normal acceleration is used with the next trigger activation.

An alternative to the momentary "0" key is for the reverse function to be latched. This means that each time the "0" key is activated, the direction in which the piston 50 moves is reversed. The direction does not change until the next "0" key activation. This allows the user to manipulate one function at a time, which requires less dexterity. If an air bubble is encountered while the trigger 230 is activated, the "0" key is depressed. It does not have to be held down. The stepper motor 28 changes direction to push the air bubble out. Depressing the "0" key again (not held down) causes the pipette 10 to pick up liquid.

The displayed volume tracks the movement of the piston 50, either incrementing or decrementing as required. Display annunciators also track the direction of the movement. "PICKUP" indicates liquid being drawn into the tip 22. "DISPENSE" indicates liquid being expelled from the tip 22.

If, during a measurement cycle, the piston 50 has traveled full scale, as determined by the step 338, the pipette 10 stops, a beep sounds and only dispense is permitted, as indicated by the numeral 627. At this point, the user can enter "F,0". This clears the pipette 10, as indicated by the numeral 348. The liquid contents of the tip 22 are discharged, as indicated by the numeral 349, and a blowout cycle, as described above in connection with the pipette mode, then occurs, as indicated by the numerals 350, 351, 628, 352, and 353, corresponding to the respective steps 150, 152, 151, 153, and 154 (FIG. 8B). This function is important if the unknown liquid is greater than the full-scale volume range of the pipette 10.

The concept of mixing with a pipette is actually the use of an oscillating motion of the piston to cause turbulence of the liquid (liquids) in the pipette tip and target container. In typical pipetting, this is helpful for adding a reagent to a solution. In diluting, it is helpful to mix the diluent with the analyte thoroughly.

Figure 14:
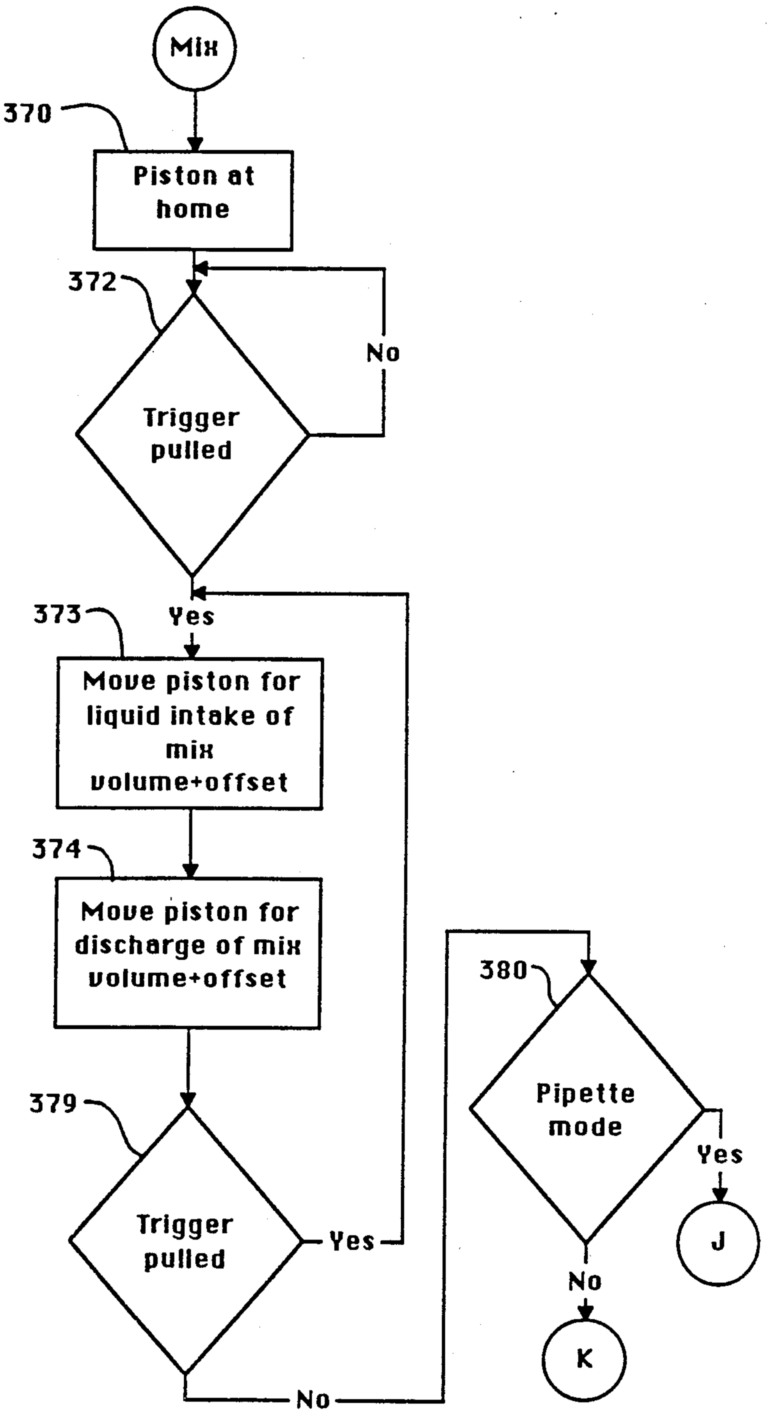
FIG. 14, illustrates a method for mixing in accordance with the invention.

In accordance with the invention, an automated mixing mode is preferably provided in the pipette and/or dilute modes, as shown in FIG. 14. When the user enters the sequence "F,6", the pipette 10 enters the mixing mode, as determined by the steps 358 and 359 (FIG. 5B). and the "MIX" annunciator is displayed in the LCD 260, The "F,6" function is a toggled or latched function. Entering "F,6" once enters the mixing mode. Entering, "F,6" again, as determined by the step 359 (FIG. 5B), turns the "MIX" annunciator off and exits the mixing mode, as indicated by the numeral 629 (FIG. 5B). This allows normal operation of the pipette or dilute mode (i.e., without mixing).

A mix volume is displayed in the LCD 260, as indicated by the numerals 630 and 360 (FIG. 5B). Initially, the volume is the default value set during the calibration process shown in FIG. 5A–5D, which is the nominal full-scale volume range of the attached displacement assembly 14. This volume flashes in the LCD 260. The user can enter the default value, as indicated by the numeral 361, by depressing the "E" key. Alternatively, the user can change the initial mix volume to a lesser desired value by keying a number on the keyboard 255, as indicated by the numeral 362. Any number entered is assumed to be a new volume. The new volume flashes in the LCD 260. When the desired volume is flashing, the user depresses "E", as determined by the step 361, and the new mix volume is stored. If an entry is out of range, an error message appears, a beep sounds and the entry continues to flash until a valid volume is entered. Zero volume is an invalid entry.

The set mix volume is global. Once it is set, it controls mixing volume in all applicable modes (pipette and dilute modes).

After a valid volume is entered for the mix volume, as determined by the step 361, the "MIX" annunciator continues to appear and the appropriate mode (pipette or dilute) volume $V_1$ reappears.

In the mixing mode, after the dispense step 146 in the pipette mode (FIGS. 8A and 8B) or 290 in the dilute mode FIGS. 12A and 12B), as indicated by the numerals 147 (FIG. 8B) and 358 (FIG. 12B), respectively, the piston 50 stops at the home position indefinitely, as indicated by the numeral 370, rather than executing a blowout cycle, as shown in FIG. 14. When the user pulls the trigger 230, as indicated by the numeral 372, the piston 50 picks up the mix volume, as indicated by the numeral 373, preferably including movement to provide the requisite offset for the beginning movement of the mix volume into the tip 22. The mix volume is then dispensed, as indicated by the numeral 374, preferably including movement to provide the requisite offset for the beginning of discharge of the mix volume. If the trigger 230 is continuously activated, as determined by the 370, the piston 50 picks up and dispenses in a repetitive cyclic manner, as indicated by the numerals 373, 374, and 379. When the trigger 230 is released, as determined by the step 379, the piston 50 completes a mix cycle and then determines whether the pipette 10 is in the pipette mode or the dilute mode, as indicated by the numeral 380, and returns to step 150 (FIG. 8B) in the pipette mode or step 291, (FIG. 12B) in the dilute mode to execute a blowout cycle. In any event, there is a minimum of one mix cycle.

Entry of "F,0" overrides mixing at any time during the mixing mode. This function clears what is in the tip 22 and returns the piston 50 to the home position, bypassing the mix cycle.

Figure 15A:
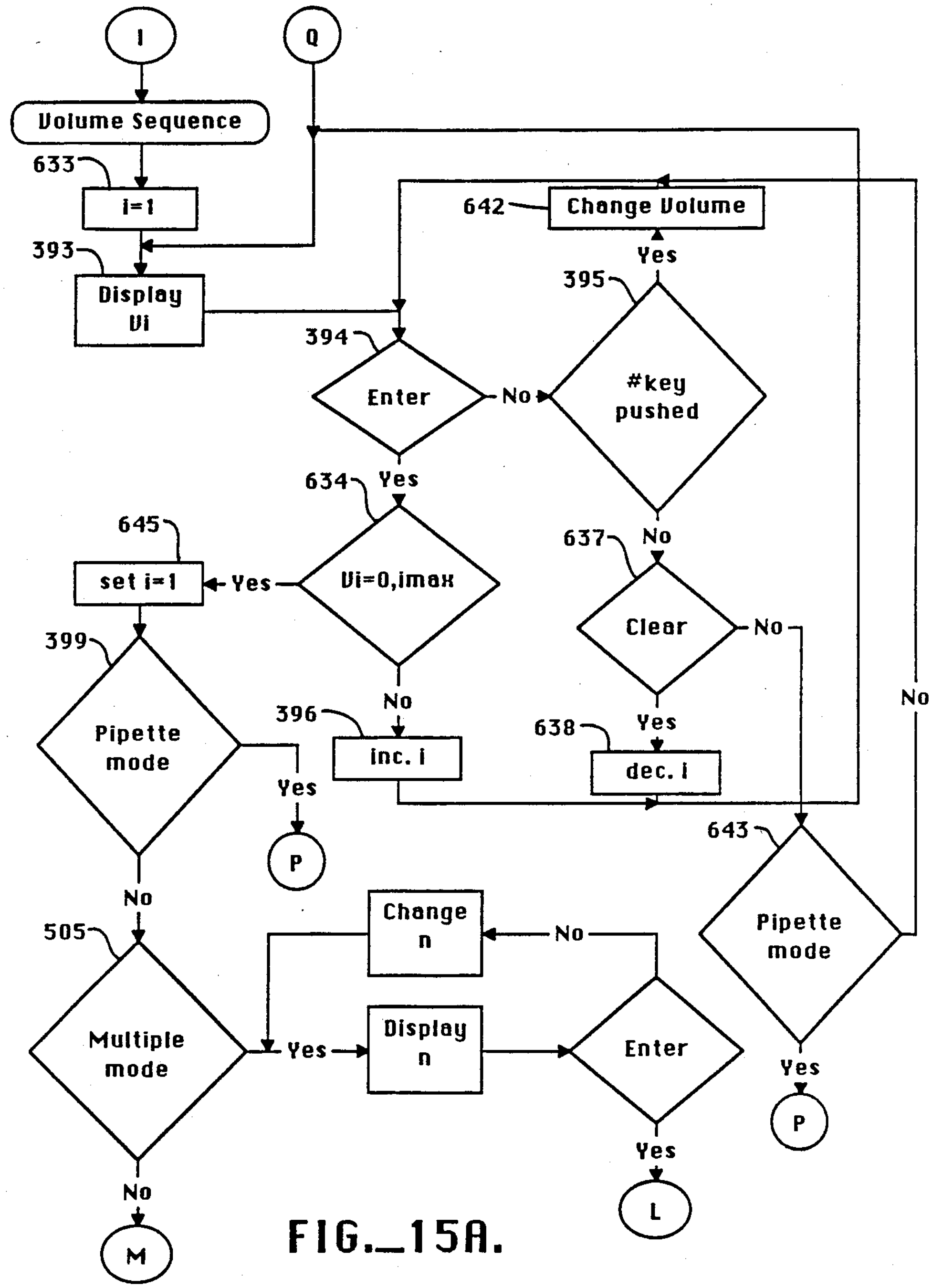
FIGS. 15A-15C, taken together illustrate a method for volume sequencing in accordance with the invention.
Figure 15B:
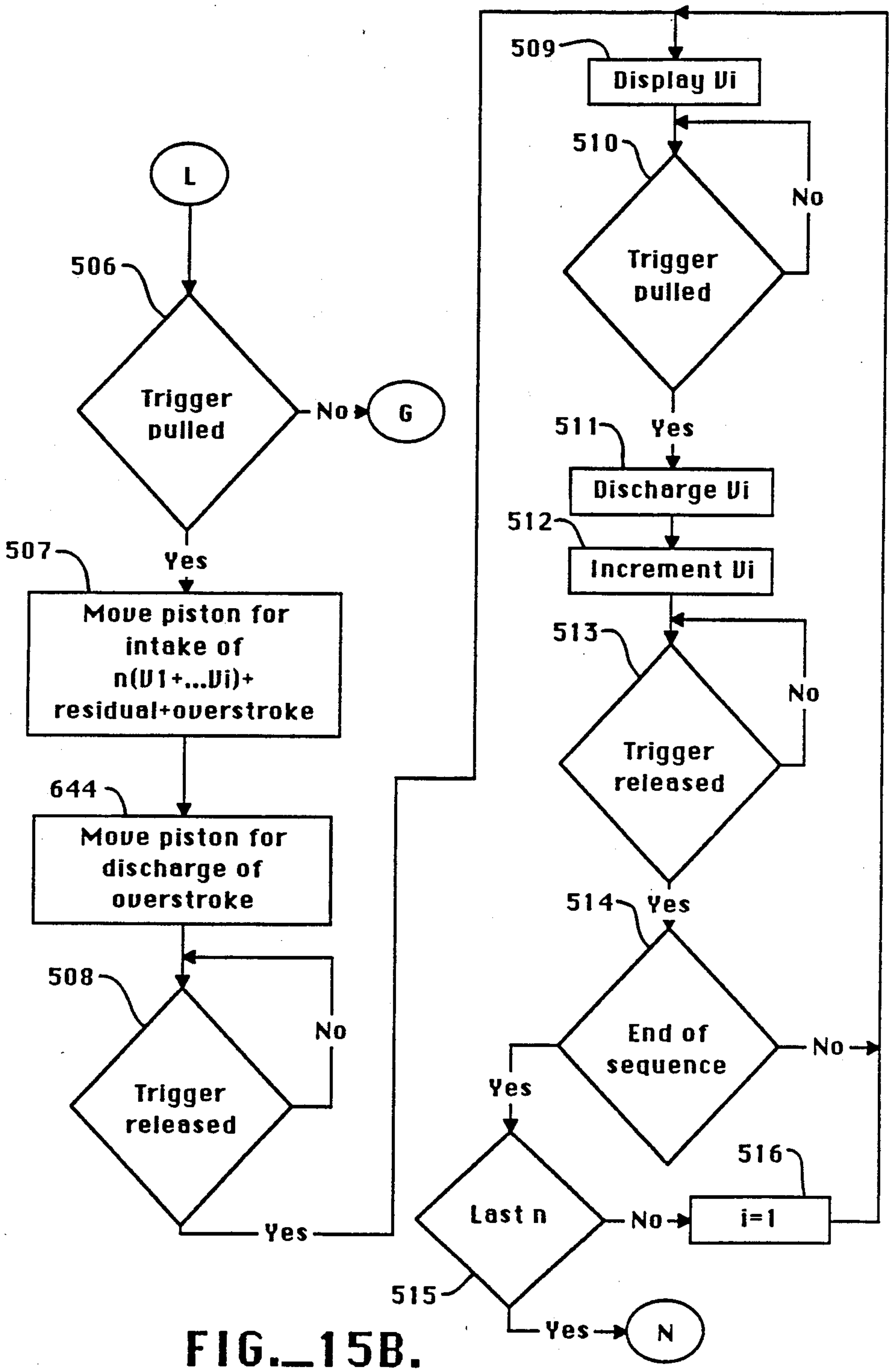
Figure 15C:
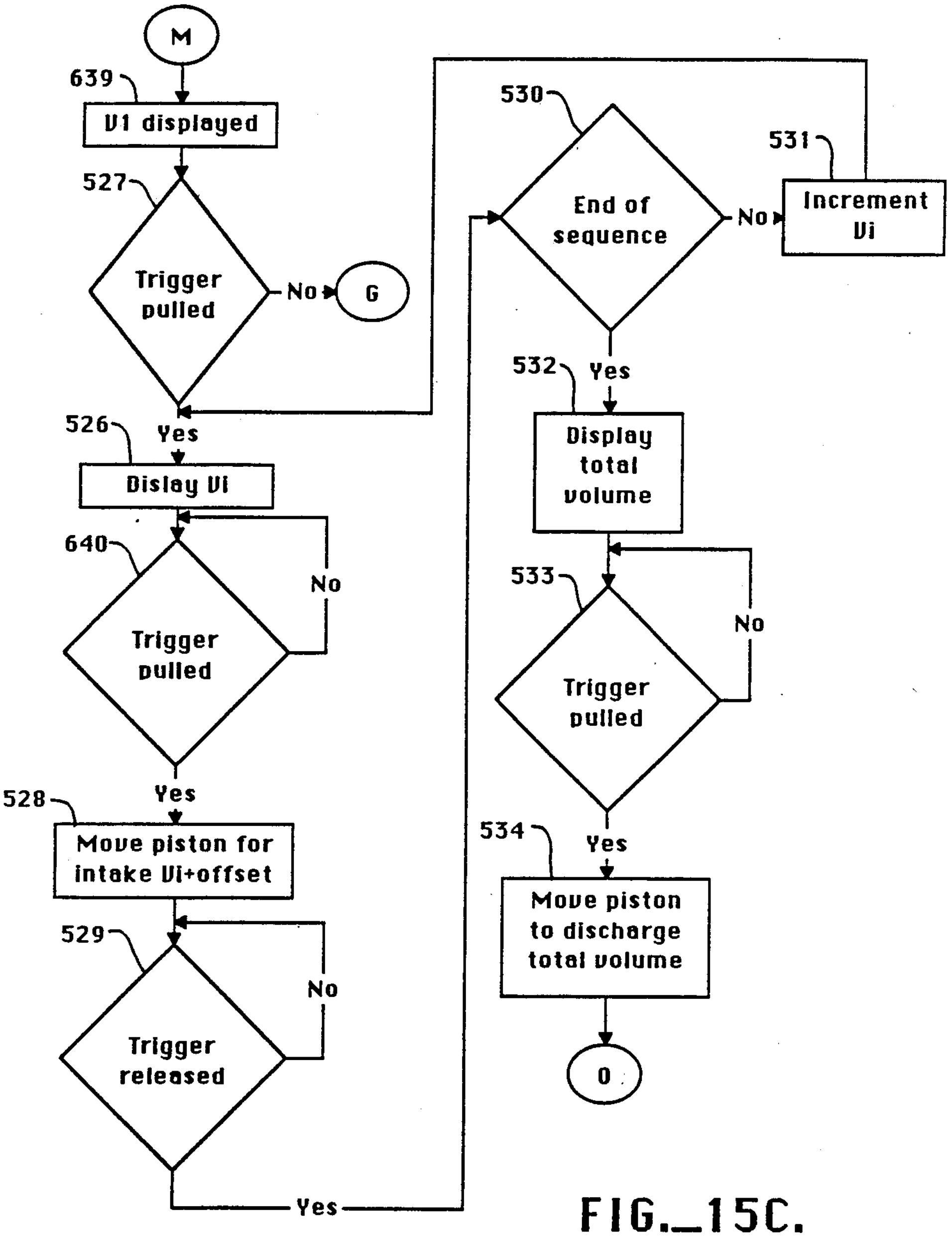

There are many applications which use a successive number of volumes of liquid for testing purposes. In accordance with the invention, a volume sequencing mode is preferably provided in the pipette, multiple dispense and/or dilute modes, as shown in FIGS. 15A–15C. When the user enters the sequence "F,7", the pipette 10 enters the volume sequencing mode, as determined by the steps 390, 391, and 392 (FIGS. 5C and 5D). The "F,7" function is a toggled or latched function. Entering "F,7" once enters the volume sequencing mode, as indicated by the numerals 631 and 632 (FIG. 5B). Entering "F,7" again, as determined by the step 631 (FIG. 5B), causes the volume sequencing mode to be exited, as indicated by the numeral 641 (FIG. 5B). This allows normal operation of the pipette, multiple dispense, or dilute mode (i.e., without volume sequencing).

The LCD 260 displays a sequence volume $V_{seq}$ (V) with a sub-number from 1 to C. Preferably, there are twelve sequenced volumes (1–9 and A, B, and C). These volumes are global in nature, used in all applicable modes (pipette, multiple dispense, and dilute). This enables multichannel pipette usage to be very flexible.

An index i is initially set equal to one, as indicated by the numeral 633. A first sequential volume is displayed in the LCD 260, as indicated by the numeral 393. Initially, the volume is the default value set during the calibration process shown in FIGS. 5A–5D, which is zero. This volume flashes in the LCD 260. The user can enter the default value, as indicated by the numeral 394, by depressing the "E" key. Alternatively, the user can change the initial sequential volume to a greater desired value by keying a number on the keyboard 255, as indicated by the numerals 395 and 642. Any number entered is assumed to be a new volume. The new volume flashes in the LCD 260. When the desired volume is flashing, the user depresses "E", as determined by the step 394, and the new sequential volume is stored. If the entry is out of range, an error message appears, a beep sounds, and the entry continues to flash until a valid volume is entered.

After a valid volume is entered for the first sequential volume, as determined by the step 394, the display updates to the next sequential volume, as indicated by the numerals 396, 634, and 393. As in the case of the first sequential volume, the next sequential volume flashes in the LCD 260 until entered, or until a valid change for this sequential volume is entered, as indicated by the steps 393, 394, 395, and 642. This process is repeated until as many as twelve sequential volumes are entered, as indicated by the numeral 634. If, however, the "E" key is depressed with a zero volume being flashed in the LCD 260, the pipette 10 truncates sequential volume entry, as indicated by the numeral 634.

The previously set sequential volumes are saved in memory. For example, one sequence is $V_{seql}$, $V_{seq2}$, . . . , $V_{seq8}$. A new sequence $V_{seql}$, $V_{seq2}$, and $V_{seq3}$ is then entered, and the entry sequence is truncated by setting $V_{seq4}$ equal to zero. By entering zero for $V_{seq4}$, however, $V_{seq5}$, $V_{seq6}$, $V_{seq7}$, and $V_{seq8}$ from the previous sequence are saved. Therefore, to return to the original sequence, only $V_{seql}$, $V_{seq2}$, $V_{seq3}$, and $V_{seq4}$ need to be re-entered.

If the pipette 10 is in the pipette mode and the volume sequencing mode is in use, as indicated by the numeral 399 or 643, the first sequential volume $V_{seql}$ is initially displayed in the LCD 260, as indicated by the numeral 393. When the user pulls the trigger 230, the steps 138, 140, and 142 of the pipette mode (FIG. 8A) are executed with the pickup volume $V_1$ equal to the first sequential volume $V_{seql}$. When the trigger is pulled a second time, the steps 144, 146, 150, 152, 151, 153, and 154 of the pipette mode (FIG. 8B) are executed with the pickup volume $V_1$ (equal to the first sequential volume $V_{seql}$) being dispensed, whereupon the index i is incremented, as indicated by the numeral 635 and 636, (FIG. 8), and a blowout cycle ensues with the piston 50 returning to the home position.

Thereafter the pickup volume $V_1$ is set equal to the next sequential volume $V_{seq2}$, and this volume is displayed in the LCD 260, as indicated by the numeral 393. Then the pipette mode shown in FIGS. 8A and 8B is executed with the sequential volume $V_{seq2}$ as the pickup and dispense volume. The next pickup and dispense cycle uses the sequential volume $V_{seq3}$.

The sequence continues until as many as twelve preset sequential volumes have been picked up and dispensed, as indicated by the numeral 634. If the next sequential volume is zero, as indicated by the numeral 634, the sequence is terminated, the first sequential volume $V_{seql}$ is displayed, as indicated by the numeral 393, and the series can begin anew.

Entry of "F,7" at any time returns the pipette 10 to the normal pipette mode with the pickup volume $V_1$ set for the pipette mode being displayed and used as the pickup and dispense volume. Exit from the volume sequencing mode by entering "F,7" can be accomplished at any time that the pipette 10 is conditioned to receive a keyboard entry. Upon subsequent return to the volume sequencing mode, the sequence begins with the pickup and dispense volume set equal to the first sequential volume $V_{seql}$.

While in the volume sequencing mode, entry of "F,0" (clear) preferably affects operation differently at two levels in the pipette mode. If the pipette 10 is at a $V_{seq}$ volume and the liquid has been picked up and is ready to be dispensed, entry of "F,0" dispenses the liquid, and the piston 50 returns to the home position. $V_{seq}$ does not increment to $V_{seq+1}$. Therefore, in case of a mistake the sequence is not lost. If the pipette 10 is at a $V_{seq}$ volume, and the piston 50 is at the home position (ready to pick up), however, "F,0" (clear) causes the display to decrement to the previous sequential volume $V_{seq-1}$, as indicated by the numerals 637 and 638. The pipette 10 is then ready to start a pickup at the point in the sequence beginning with the sequential volume $V_{seq-1}$. This clear effects no piston motion.

"F,0" is also a recognized function in the sequence. In case an error is made in the sequence, entering "F,0" decrements one sequential volume at a time.

If the pipette 10 is in the multiple dispense mode and the volume sequencing mode is in use, as indicated by the numeral 505, with $V_{seq}$ volumes previously defined, two events occur. First, a dispense aliquot volume is calculated as:

$$V_2 = \sum_{seq=1}^{i} V_{seqi}$$

where $V_{seqi}$ are the preset sequential volumes, 1 to i, and $V_2$ is the total of these volumes. Then n times $V_2$ becomes the pickup volume $V_1$ in accordance with the constraints on the range of this volume described earlier in connection with the multiple dispense mode.

When the user pulls the trigger 230, as indicated by the numeral 506, the pipette 10 draws the pickup volume $V_1$, as indicated by the numeral 507, including movement to provide the requisite offset for the beginning movement of the pickup volume plus the residual volume $V_{res}$ into the tip 22. Also, there is an overstroke to draw excess liquid, as indicated by the step 507, which is subsequently discharged, as indicated by the numeral 644. The remaining volume equals n times the sum of the sequential volumes $V_{seql}$, $V_{seq2}$, . . . , $V_{seqi}$ plus the residual volume $V_{res}$ (i e., the aliquot volume $V_2$ associated with the multiple dispense mode equals the sum of the sequential volumes $V_{seqi}$). When the trigger 230 is released, as indicated by the numeral 508, the pipette 10 is ready to execute the multiple dispense mode with each aliquot volume broken down into a series of sequential volumes $V_{seql}$, $V_{seq2}$, $V_{seq3}$, etc.

The first sequential volume $V_{seql}$ appears in the LCD 260, as indicated by the numeral 509. When the user again pulls the trigger 230, as indicated by the numeral 510, the first sequential volume $V_{seql}$ is dispensed, as indicated by the numeral 511. Then the next sequential volume $V_{seq2}$ appears in the LCD 260, as indicated by the numeral 512. When the trigger 230 is released, as indicated by the numeral 513, the pipette 10 is ready to dispense this next sequential volume $V_{seq2}$. This occurs when the user pulls the trigger 230 again, as indicated by the step 510. This series continues with ensuing actuations of the trigger 230, until the last defined sequential volume $V_{seqi}$ has been dispensed, as indicated by the numeral 514. Then the sequence repeats, as indicated by the numeral 515, with the first sequential volume $V_{seql}$ (i.e., the first component of the second of n aliquot volumes $V_2$) being displayed in the LCD 260, as indicated by the numeral 516 and the step 509. There is an integral number n of $V_{seqi}$ dispense cycles in the multiple dispense mode.

Figure 10B:
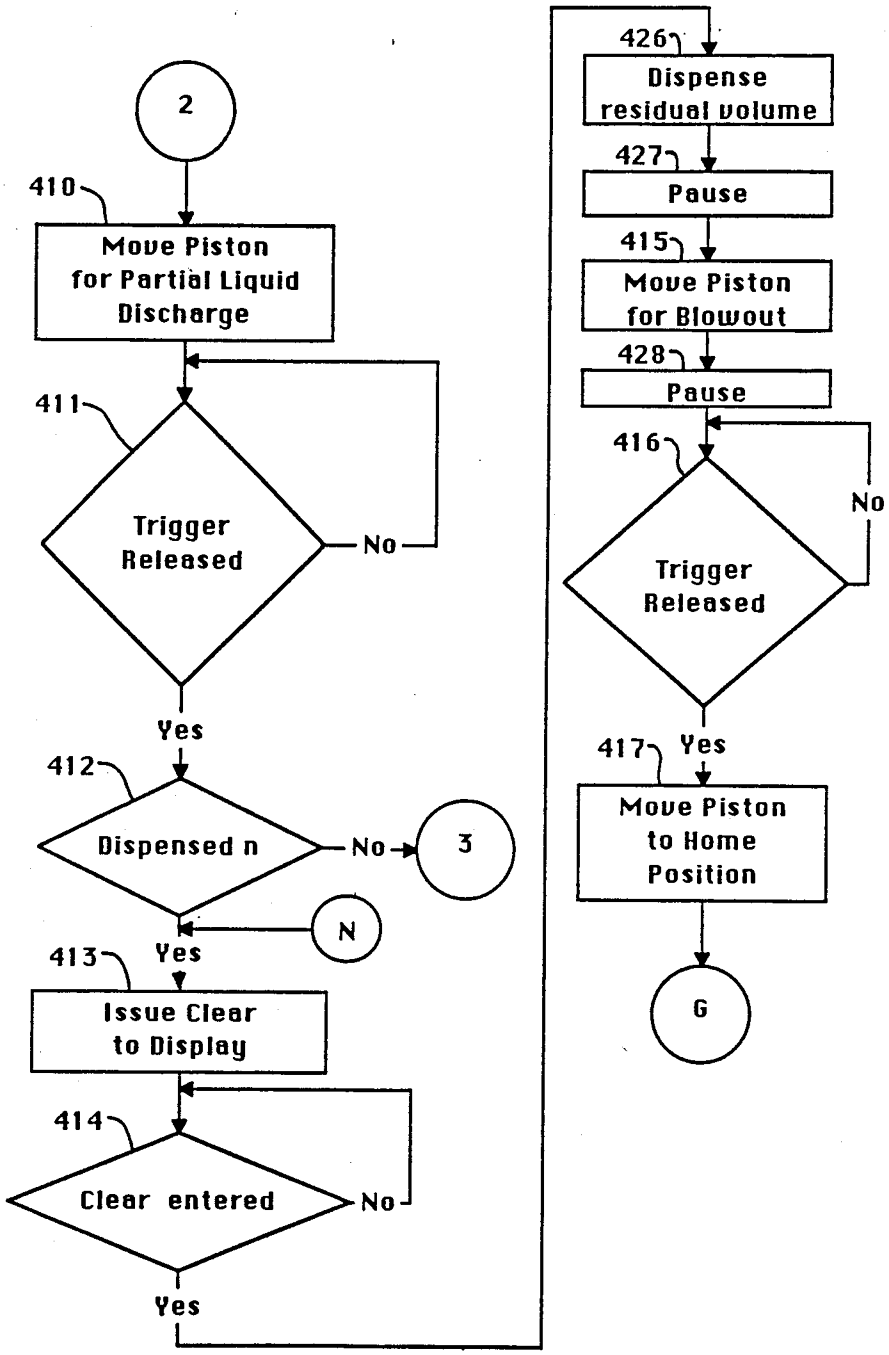

After the last dispense of the nth multiple dispense cycle, as indicated by the step 515, the "CLEAR" annunciator flashes in the LCD 260 as indicated by the numeral 413 (FIG. 10B), a beep sounds, and the pipette 10 awaits entry of "0". When the "0" key is depressed, as indicated by the numeral 414, FIG. 10B), the residual volume $V_{res}$ is dispensed and a blowout cycle occurs, as indicated by the steps 426, 427, 415, 428, and 416, followed by the piston 50 returning to the home position, as indicated by the step 417 (FIG. 10B). The pipette 10 is then ready to pick up the calculated volume again, and the volume sequencing mode can begin anew. This pickup volume is displayed in the LCD 260. If "F,0" is entered at any time during the dispense cycle, the pipette 10 is cleared and executes a blowout cycle, and the piston 50 returns to the home position.

If the pipette 10 is in the dilute mode and the volume sequencing mode is in use, as indicated by the numeral 392 (FIG. 5D), the first sequential volume $V_{seql}$ initially becomes the solvent intake volume $V_1$ and is flashed in the LCD 260, as indicated by the numeral 393. This volume can be entered, or another volume can be entered for the first sequential volume $V_{seql}$. Upon entry of the first sequential volume $V_{seql}$, the LCD 260 increments to the next sequential volume $V_{seq2}$, and so on. This allows the user to choose as many as twelve volumes of liquid, or six volumes of liquid with separating air gaps. An "err" annunciator is displayed in the LCD 260 if the total volume exceeds the nominal full-scale volume range of the attached displacement assembly 14. An "F,O" entry causes the volume sequence to decrement so as to allow the user to modify previous sequential volume entries.

After the sequential volumes $V_{seqi}$ have been entered, the LCD 260 displays the first sequential volume $V_{seql}$, as indicated by the numerals 645 and 639, and the user pulls the trigger 230, as indicated by the numeral 527. The first sequential volume $V_{seql}$ is drawn, as indicated by the numerals 640 and 528, including movement to provide the requisite offset for the beginning movement of liquid into the tip 22. Thereafter, the trigger 230 is released, as indicated by the numeral 529, and the LCD 260 is incremented to the next sequential volume $V_{seq2}$ (i.e., for liquid intake or creation of an air gap), as indicated by the numerals 530 and 531. This series continues with ensuing actuations of the trigger 230, until the last defined sequential volume $V_{seqi}$ (of liquid or air) has been drawn, as indicated by the step 530.

After the last draw of liquid or air, as indicated by the step 530, the LCD 260 displays the total volume, as indicated by the numeral 532. When the user pulls the trigger 230, as indicated by the numeral 533, the liquid(s) and air gap(s) are discharged, as indicated by the numeral 534, including movement(s) to provide the requisite offset(s) for the beginning of discharge of the liquid(s). A blowout cycle, as described above in connection with the dilute mode, then ensues, as indicated by the steps 291, 294, 625, 296, and 297 (FIG. 12).

The automated pipette mode and the dilute mode have the capability of having both the mixing mode and the volume sequencing mode simultaneously active. These modes are entirely independent of each other for programming purposes.

Figure 5A:
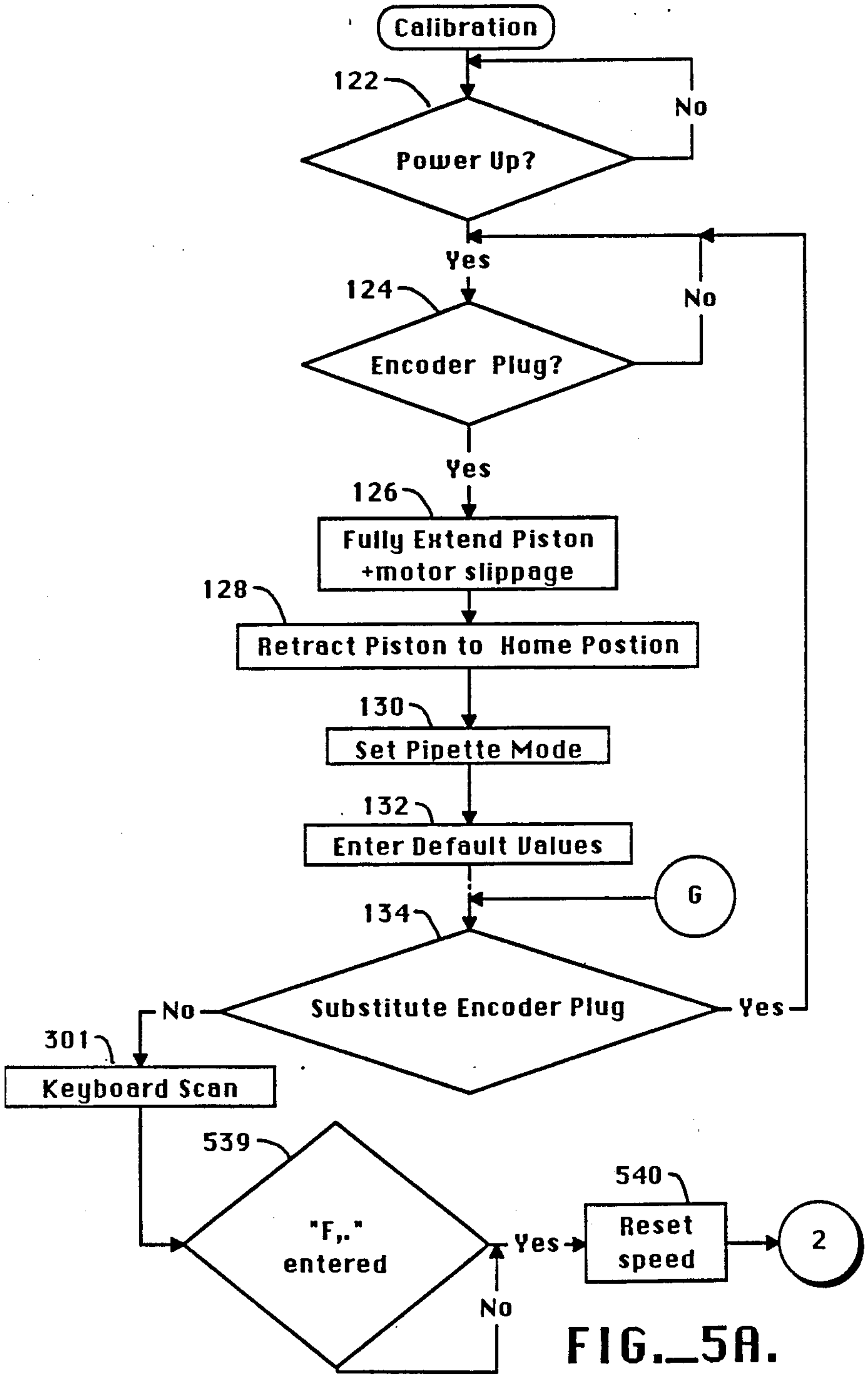
FIGS. 5A–5D, taken together illustrate a method for calibrating a pipette in accordance with the invention.
Figure 5B:
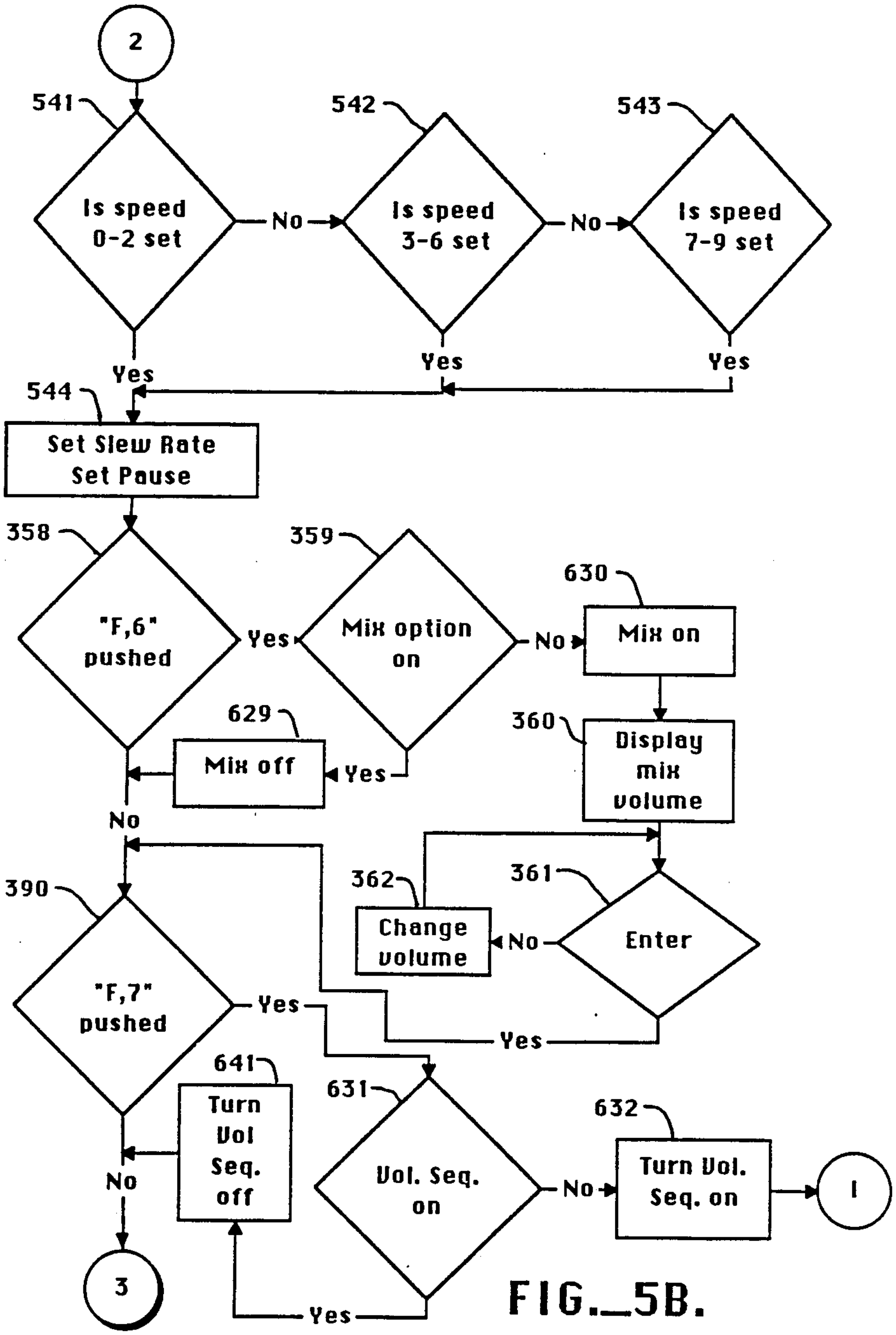
Figure 5C:
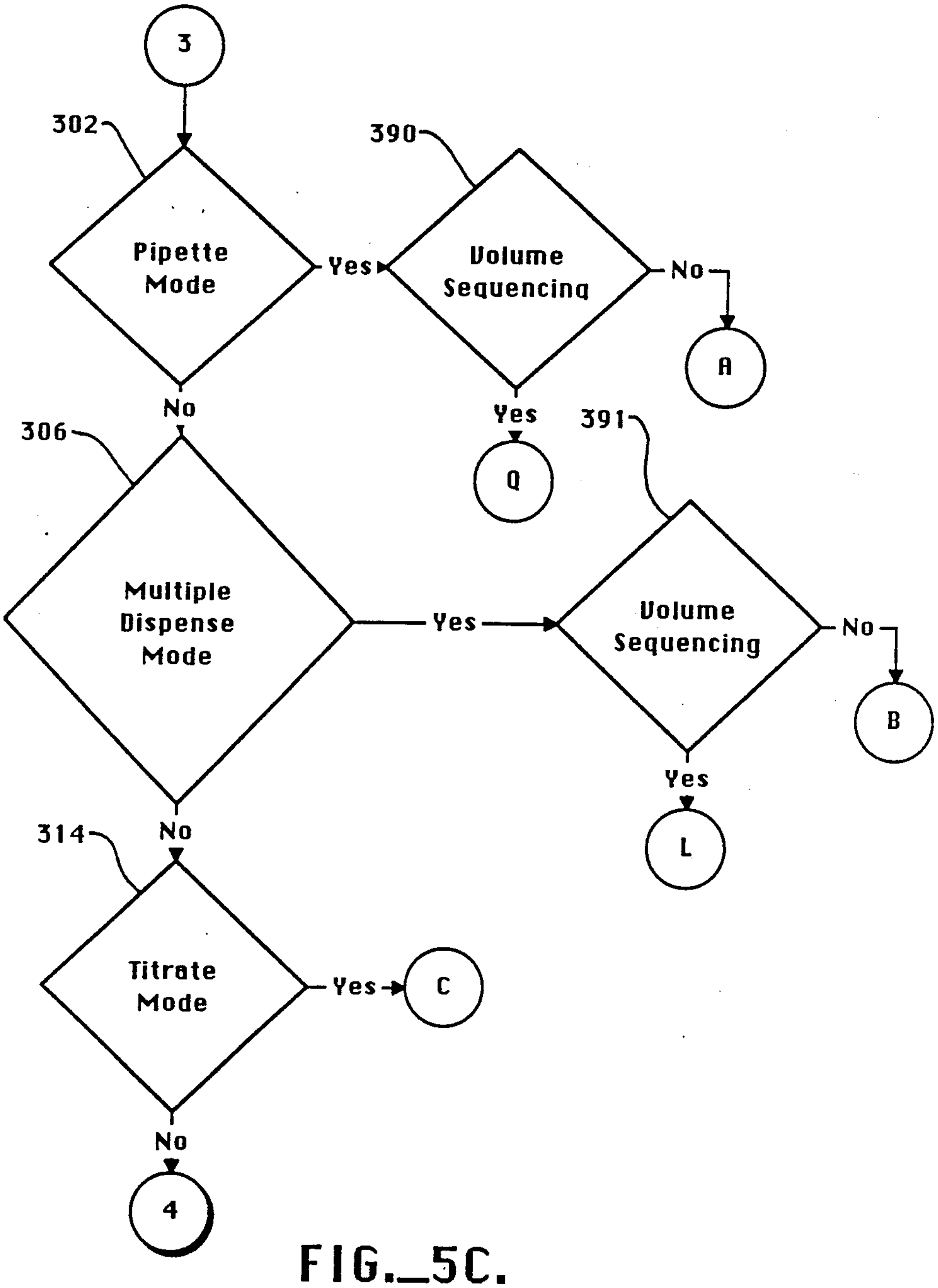
Figure 5D:
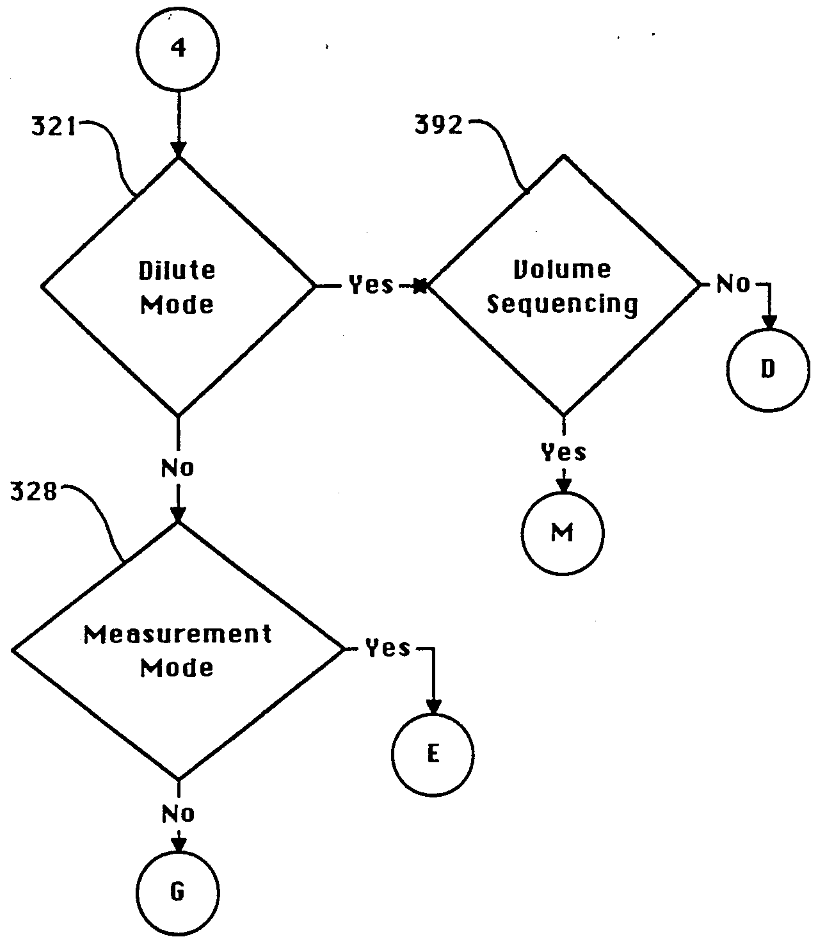

Preferably, the speed of pipetting is selectable for providing optimum intake and discharge rates for different viscosity liquids while maintaining accuracy as indicated by the numerals 539 and 540 in FIG. 5A. The user can choose one of ten speeds, 0 through 9, to select ten different overall times for full scale travel plus delay before blowout. The preferred one second dwell at the end of the blowout cycle is for tipping off and is not affected. The numbers 0 through 9 correspond to the following speeds:

| Speed | Full Scale | Time Delay Before Blowout | Overall[h] |
|---|---|---|---|
| 9 | 1.3 sec.[a] | 0.0 sec.[d] | 1.43 sec. |
| 8 | 1.3 sec. | 0.5 sec.[e] | 1.93 sec. |
| 7 | 1.3 sec. | 1.0 sec.[f] | 2.43 sec. |
| 6 | 2.2 sec.[b] | 0.5 sec. | 2.92 sec. |
| 5 | 2.2 sec. | 1.0 sec. | 3.42 sec. |
| 4 | 2.2 sec. | 1.5 sec. | 3.92 sec. |
| 3 | 2.2 sec. | 2.0 sec. | 4.42 sec. |
| 2 | 4.0 sec.[c] | 0.5 sec. | 4.90 sec. |
| 1 | 4.0 sec. | 1.0 sec. | 5.40 sec. |
| 0 | 4.0 sec. | 2.0 sec.[g] | 6.40 sec. |

[a]Fast Time
[b]Normal Time
[c]Viscous Liquids
[d]No Waiting
[e]Fast Time
[f]Normal
[g]Viscous Liquid
[h]Overall Time Equals Full Scale Plus Time Delay Before Blowout Plus 10% of Full Scale For Blowout.

Initially, the default value for the speed is 8. At the home position, under keyboard entry conditions, the speed can be changed. Upon entering "F,.", a digit flashes. The digit can be changed or left unchanged. Upon depressing the "E" key, the digit stops flashing, and the pipette 10 returns to displaying the volume in the mode it was in before a speed was selected. This is a global function which operates in all modes.

Overall times are approximately 0.5-second increments, and time delays are based on 0.5-second increments. This results in a linear speed profile.

The titration and measurement modes present a different set of circumstances for speed control. The time delay remains the same as defined above. As indicated by the numerals 541, 542, 543, and 544 in FIG. 5B, the overall slew rate is broken into three distinct rates as follows:

| Speed | Time Delay | Overall |
|---|---|---|
| 9 | 0.0 sec. | 16 sec. |
| 8 | 0.5 sec. | 16 sec. |
| 7 | 1.0 sec. | 16 sec. |
| 6 | 0.5 sec. | 24 sec. |
| 5 | 1.0 sec. | 24 sec. |
| 4 | 1.5 sec. | 24 sec. |
| 3 | 2.0 sec. | 24 sec. |
| 2 | 0.5 sec. | 43 sec. |
| 1 | 1.0 sec. | 43 sec. |
| 0 | 2.0 sec. | 43 sec. |

The approximate time to ramp up to the slew rate is six seconds. For faster times (speeds 7–9), the ramp takes a slightly longer time to get to a larger step rate. For slower times (speeds 0–2), the ramp takes slightly less time to get a smaller step rate.

Preferably, the pipette 10 includes a connector on the printed circuit assembly, accessible through the battery compartment which allows connection to an external control for the instrument. This connector furnishes power so that no battery is needed.

An interface circuit can be attached by a cable to the pipette 10. The interface can be microcomputer controlled and contain a standard RS-232 port. This interface can drive multiple pipettes 10. A computer software driver can be provided for the MacIntosh, Apple IIC, Apple IIE, and IBM PC to control the pipette 10. The format of this interface is command words equivalent to keyboard entries. A complete string of entries (mode, volume, speed) causes a status word to be issued by the pipette 10 at any time.

All stroking of the pipette in accordance with the invention can be conveniently commanded from a calculator like keyboard. Modes can be individually selected. Moreover, movement is in discrete increments with continuous visual readout through a liquid crystal display. Suitable acoustical prompts are provided through a piezoelectric device. Consequently, rapid learning in the use of the pipette in accordance with the invention results.

Although the invention has been described and illustrated in detail, it is to be clearly understood that the same is by way of illustration and example only and is not to be taken by way of limitation. Although the motor which operates the linear actuator is a stepper motor in the illustrated embodiments, one modification is to substitute a closed-loop servomotor for the stepper motor. Also, a pipette can be provided which operates in less than all of the modes described above. For example, a pipette can be provided which operates only in the pipette mode and the multiple dispense mode. This enables the microprocessor circuit 220 (FIG. 3B) to be a more economical type 7503 CMOS integrated circuit manufactured by NEC of Japan, which includes a built in LCD controller that obviates the need for the dual triplexed display drivers 251. Other modifications which are within the spirit of this invention will appear to persons skilled in the art. Consequently, the true scope of this invention is better ascertained by reference to the appended claims.

What is claimed is:

1. A handheld self-contained automated pipette, for portable operation comprising:
- a pipette drive means, including:
  - a motor:
  - an integral control circuit for supplying power to the motor; and
  - a shaft having a connection to the motor for moving in precise lengthwise increments in response to power being supplied to the motor; and
- a displacement assembly, including:
  - a displacement cylinder:
  - a displacing piston within the cylinder;
  - means for communicating linear translation of the shaft to the piston when the displacement assembly is mounted to the pipette drive means;
  - a displacement chamber within the cylinder having a first end in communication with the piston and having a second end with an aperture in communication with a tip for receiving liquid to be pipetted; and
  - interlocking means for releasably securing the piston and cylinder together in an assembly both when the displacement assembly is attached to the pipette drive means and when the displacement assembly is separated from the pipette drive means.

2. The pipette of claim 1, further comprising means for removably attaching the displacement assembly to the pipette drive means.

3. The pipette of claim 2 wherein:
- the displacement cylinder has a predetermined size correlated to a selected volume range; and
- the displacing piston within the cylinder has a predetermined size corresponding to the selected volume range;
- the cylinder, piston, and interlocking means being interlocked in an assembly for interchangeable removable attachment to the drive means.

4. The pipette of claim 1, further comprising encoder means connectable to the pipette drive means for correlating movement of the piston to a given fullscale volume range of the attached displacement assembly.

5. In a portable pipette having a motor and a linear actuator having an actuator shaft in engagement with the motor and connectable to a pipetting displacement assembly including a displacing piston penetrating a displacement cylinder for receiving and discharging pipetted liquid, the improvement comprising in combination:
- means interconnecting the displacing piston and the linear actuator for attaching the motor to the displacement assembly; and
- encoder means corresponding to the volume of the displacement assembly for automatically correlating movement of the piston to the size of the displacement assembly without energizing the motor.

6. The combination of:
- a linear actuator for connection to a pipetting displacement assembly having a displacing piston with a first limit of travel after the maximum intake of liquid and a second limit of travel after the discharge of liquid from the displacement assembly;
- a motor for driving the linear actuator; and
- a control circuit means for energizing the motor to (1) drive the piston to the second limit of travel and the motor to slip and (2) then to retract the piston a predetermined distance.

7. The combination of claim 6 corresponding to the volume of the displacement assembly wherein the control circuit means includes encoder means automatically for correlating movement of the displacing piston to the volume of the displacement assembly.

8. A handheld self-contained automated pipette for portable operation, comprising:
- an electrically operated linear actuator in a handholdable and portable housing;
- a pipetting displacement assembly having one of various sizes removably attached to and for actuation by the linear actuator and including a displacing piston in a displacement cylinder for drawing liquid into and dispensing liquid from a tip connected to the displacement assembly in fluid communication with the cylinder; and
- an operator actuatable control and display means in the portable housing to selectively allow for selecting one of various modes of operation for the pipette, for programming movement of the displacing piston in the displacement cylinder to optimize air interface volume, for neutralizing variations in vacuum pipette effects and for providing an accommodated stroke and readout for improved accuracy while pipetting and/or titrating different ranges of volume with the pipette, the control and display means including an operator programmable control circuit for selectively actuating and precisely driving the linear actuator in several different modes of pipette operation, a display in circuit with the programmable control circuit and carried by the portable housing for visually displaying the selected operating mode and liquid volume to be handled by the pipette, and a keyboard in circuit with the programmable control circuit and carried by the portable housing for actuation by the operator to select the mode of pipette operation and the liquid volume to be handled by the pipette during the selected mode of operation.

9. The pipette of claim 8 further including encoder means in circuit with the programmable control circuit for automatically scaling movement of the linear actuator in accordance with the size of the displacement assembly attached to the actuator.

10. A compact electronically programmable handheld self contained automated pipette for portable operation, comprising:

a linear actuator drive module including a motor supported in a hand-holdable housing for the drive module, a control circuit within the drive module housing for supplying power to and controlling operation of the motor in selective accordance with preset and/or operator actuated instructions, a shaft connected to the motor for moving in precise lengthwise increments in response to operation of the motor, a keyboard connected to the control circuit and carried by the drive module housing for actuation by an operator to deliver electronic instructions to the control circuit, and a display connected to the control circuit and carried by the drive module housing adjacent the keyboard for selectively displaying operating modes and/or the preset and operator actuated instructions for the pipette; and a pipette displacement assembly secured to the drive module in line with the shaft and including a displacement cylinder, a displacing piston within the cylinder, means for communicating linear translation of the shaft to the piston when the displacement assembly is secured to the drive module, and a displacement chamber within the cylinder having a first end in communication with the piston and having a second end with an aperture in communication with a tip for receiving liquid to be pipetted.

11. In a portable pipette having a motor and a linear actuator shaft in engagement with the motor and connectable to a pipetting displacement assembly including a displacing piston penetrating a displacement cylinder for receiving and discharging pipette liquid and a control circuit for regulating operation of the motor to drive the piston within the cylinder, the improvement comprising:

encoder means in circuit with the control circuit and corresponding to the volume of the displacement assembly for automatically correlating movement of the piston to the volume of the displacement assembly.

* * * * *